United States Patent
Ohashi et al.

(10) Patent No.: US 8,351,224 B2
(45) Date of Patent: Jan. 8, 2013

(54) POWER CONVERSION APPARATUS

(75) Inventors: Hiromichi Ohashi, Ibaraki (JP);
Kyungmin Sung, Ibaraki (JP); Masamu Kamaga, Ibaraki (JP); Mitsuaki Shimizu, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 616 days.

(21) Appl. No.: 12/506,535

(22) Filed: Jul. 21, 2009

(65) Prior Publication Data

US 2010/0067264 A1    Mar. 18, 2010

(30) Foreign Application Priority Data

Jul. 22, 2008  (JP) ................. 2008-188323

(51) Int. Cl.
*H02M 5/45* (2006.01)
*H02J 3/00* (2006.01)
(52) U.S. Cl. .......................................... 363/37; 363/34
(58) Field of Classification Search ................ 363/9, 10, 363/34, 36, 37, 118, 123, 140, 148, 149

See application file for complete search history.

(56) References Cited

U.S. PATENT DOCUMENTS

| | | | |
|---|---|---|---|
| 6,424,548 B2 * | 7/2002 | Pascu et al. | 363/78 |
| 6,690,593 B2 * | 2/2004 | Kimura et al. | 363/98 |
| 6,711,038 B2 * | 3/2004 | Ziegler et al. | 363/123 |
| 2009/0195068 A1 * | 8/2009 | Ohashi et al. | 307/18 |

* cited by examiner

*Primary Examiner* — Matthew Nguyen
(74) *Attorney, Agent, or Firm* — Wenderoth, Lind & Ponack, L.L.P.

(57) ABSTRACT

A power conversion apparatus includes a main circuit with switches, and performs power conversion to generate power to a three-phase AC load from a three- or single-phase AC power supply. Some of the switches are configured, using a bidirectional switch including a normally-on device that is turned OFF when a gate circuit is provided with a positive or negative voltage, and a normally-off device that is turned ON when the gate circuit is provided with a positive or negative voltage, to provide only a specific unidirectional current flow when the gate circuit is not activated, and when the gate circuit is activated, provide and control a bidirectional current flow to direct only in an arbitrary unidirectional way. By providing the power conversion apparatus with a capability of directing back, to a load (motor), any power coming therefrom, the conversion apparatus requires no direct-current link capacitor and a diode clamping circuit.

3 Claims, 61 Drawing Sheets

EXEMPLARY CONVENTIONAL BIDIRECTIONAL SWITCH

THYRISTOR OR GTO

EXEMPLARY CONVENTIONAL BIDIRECTIONAL SWITCH

IGBT

EXEMPLARY CONVENTIONAL BIDIRECTIONAL SWITCH

IGBT

EXEMPLARY CONVENTIONAL BIDIRECTIONAL SWITCH

IGBT

EXEMPLARY CONVENTIONAL BIDIRECTIONAL SWITCH

EXEMPLARY CONVENTIONAL BIDIRECTIONAL SWITCH

THREE-TERMINAL BIDIRECTIONAL SWITCH

THREE-TERMINAL BIDIRECTIONAL SWITCH

FOUR-TERMINAL BIDIRECTIONAL SWITCH

FOUR-TERMINAL BIDIRECTIONAL SWITCH

FIVE-TERMINAL BIDIRECTIONAL SWITCH

FIVE-TERMINAL BIDIRECTIONAL SWITCH

FOUR-TERMINAL SEMICONDUCTOR DEVICE

FIVE-TERMINAL SEMICONDUCTOR DEVICE

FIVE-TERMINAL LATERAL SEMICONDUCTOR DEVICE

FIVE-TERMINAL LATERAL SEMICONDUCTOR DEVICE

FIVE-TERMINAL VERTICAL SEMICONDUCTOR DEVICE

FOUR-TERMINAL SEMICONDUCTOR DEVICE

SWITCH OF MOSFET AND DIODE

SWITCH OF IGBT AND DIODE

BIDIRECTIONAL SWITCH

FIRST SOURCE

GATE

SECOND SOURCE

POWER CONVERSION APPARATUS

TECHNICAL FIELD

The present invention relates to a power conversion apparatus and, more particularly, to a power conversion apparatus configured by a plurality of switches being high in power density or capable of realizing a power integrated circuit.

BACKGROUND ART

The power consumption of motors has been increased in homes, industries, and transportation systems, for example, and reducing such a power consumption of motors is important considering the recent energy-saving-oriented society and the continuous increase of electric energy availability. For optimizing the energy for use in a motor, the motor is controlled in terms of output rotation speed using an AC-to-AC power conversion apparatus. The issue here is that, however, such a power conversion apparatus for use with a motor is hardly popular in the current market, and is expected to be more popular and widely used from this time forward. In order to encourage the use of the power conversion apparatus, there needs to achieve reduction of material by increasing the power density in the power conversion apparatus, and there also needs to implement a general-purpose power integrated circuit by designing the power conversion apparatus with a highly integrated design.

FIGS. 1 to 3 are each a circuit diagram of a conventional power conversion apparatus that performs power conversion into an AC load from an AC power supply via a DC section. Specifically, FIG. 1 shows an apparatus that performs power conversion into a three-phase AC load from a three-phase AC power supply via a three-phase full-bridge circuit 1, a DC link capacitor 2, and a three-phase full-bridge circuit 3. FIG. 2 shows an apparatus that performs power conversion into a three-phase AC load from a single-phase AC power supply via a single-phase full-bridge circuit 4, the DC link capacitor 2, and a three-phase full-bridge circuit 5. FIG. 3 shows an apparatus that performs power conversion into a three-phase AC load from a single-phase AC power supply via a single-phase full-bridge circuit 6, a composite chopper circuit 7, the DC link capacitor 2, and a three-phase full-bridge circuit 8.

FIGS. 4 to 7 are each a circuit diagram of a conventional power conversion apparatus that performs power conversion into an AC load from an AC power supply not via a DC section but directly. Specifically, FIG. 4 shows a direct power conversion apparatus of an indirect type, i.e., indirect matrix converter, that performs power conversion into a three-phase AC load from a three-phase AC power supply via two three-phase full-bridge circuits 9 and 10. FIG. 5 shows another direct power conversion apparatus of an indirect type, i.e., indirect matrix converter, that performs power conversion into a three-phase AC load from a single-phase AC power supply via a single-phase full-bridge circuit 12 and a three-phase full-bridge circuit 13. FIG. 6 shows an apparatus that performs power conversion into a three-phase AC load from a three-phase AC power supply via a direct power conversion circuit of a direct type, i.e., direct matrix converter, 14. FIG. 7 shows an apparatus that performs power conversion into a three-phase AC load from a single-phase AC power supply via a direct power conversion circuit of a direct type, i.e., direct matrix converter, 15.

FIGS. 8 to 13 each show a bidirectional switch for use in the power conversion apparatus described above for direct conversion from AC to AC. Specifically, FIG. 8 shows a bidirectional switch configured by a thyristor or a Gate Turn-Off thyristor (GTO) connected in reverse parallel with another. FIG. 9 shows a bidirectional switch configured by a diode bridge circuit connected with an Insulated Gate Bipolar Transistor (IGBT). FIG. 10 shows a bidirectional switch including an IGBT connected in reverse parallel with a diode, and the connecting structure is connected with another to face each other with the emitter side in shared use. FIG. 11 shows a bidirectional switch including an IGBT connected in reverse parallel with a diode, and the connecting structure is connected with another to face each other with the collector side in shared use. FIG. 12 shows a bidirectional switch including an IGBT connected in series with a diode, and the connecting structure is connected in reverse parallel with another. In FIG. 12 example, alternatively, the drift layer of the diode connected in series with the IGBT may be shared for use with another, and the resulting element piece, i.e., the reverse-blocking IGBT, may be connected in reverse parallel with another. FIG. 13 shows a bidirectional switch including a MOSFET connected with another to face each other with the source side in shared use.

In all the bidirectional switches of FIGS. 8 to 13, when any of a gate power supply, a control power supply, and a gate circuit is not activated, current flow is cut off bidirectionally.

The power conversion apparatuses of FIGS. 1 to 7 are each used as a power supply mainly for driving a motor. When the motor is driven thereby, the flow of power is directed in two directions, i.e., one is from the power supply to the motor (powering operation), and the other is from the motor to the power supply (regenerative operation). When such a flow of power is abruptly changed, the need arises to process the power of delay caused by controlling and switching inside of the power conversion apparatus. In consideration thereof, the apparatuses of FIGS. 1 to 3 are each provided with the DC link capacitor 2 of a large capacity for power processing, and the apparatuses of FIGS. 4 to 7 are each connected with a diode clamping circuit 11 for power processing.

FIG. 14 shows a specific example of the diode clamping circuit 11 for power conversion into a three-phase AC load from a three-phase AC power supply. FIG. 15 shows a specific example of the diode clamping circuit 11 for power conversion into a three-phase AC load from a single-phase AC power supply. In the diode clamping circuit, a capacitor 16 is used. The power from the load or the power supply is stored in the capacitor 16, and is discharged, as power loss, by a resistor 17 connected in parallel to the capacitor 16.

The power conversion apparatuses of FIGS. 4 to 7 have been implemented by using a semiconductor device with which the bidirectional current flow is allowed. With a conventional bidirectional switch typified by those of FIGS. 8 to 13, however, the flow of current cannot be controlled when a power failure occurs in the gate power supply, the control power supply, and the gate circuit. When the components in the power conversion apparatus, i.e., an input power supply, the gate power supply, the control power supply, and the gate circuit, suffer from sudden failures, momentary (short-time) power failures, and momentary voltage drop, or when a motor is with hard braking or is operated under light load, a diode clamping circuit is connected, and the DC link thereof is connected with a large-capacity capacitor and a discharge resistor, for processing the energy stored in the motor.

The problem here is that the DC link capacitor and the diode clamping circuit described above each occupy a large portion of volume of the power conversion apparatus, and this is the obstacle to achieve the high power density and highly integrated design of the power conversion apparatus.

DISCLOSURE OF INVENTION

Motors have been prevented from being energy saving because power conversion apparatuses for use to drive the motors are not yet high in power density or not yet designed with high integration. Especially motors of a low output capacity, i.e., equal to or lower than several kW, have been prevented from being energy saving.

In a power conversion apparatus for motor driving use, there is no room for the power to go when the motor is in the regenerative operation. As such, the power conversion apparatuses of FIGS. 1 to 3, i.e., apparatuses of DC link type, all require a large-capacity DC link capacitor. However, such a DC link capacitor is generally high in required resistance to pressure and large in capacity, thereby becoming an obstacle to achieve the high power density and highly integrated design.

Among the power conversion apparatuses for motor driving use, the power conversion apparatuses of FIGS. 4 to 7, those perform direct conversion from AC to AC do not include a DC link section and a large-capacity capacitor. Therefore, there needs to connect a diode clamping circuit on both input and output sides, and therebetween, to provide a circuit similar to a DC link capacitor. This configuration, however, prevents the high power density and highly integrated design because the capacitor provided in each of the diode clamping circuits is large in size, a resistor is required for discharging the energy stored in the capacitor, and a cooling apparatus is required due to heat generated via the resistor at the time of discharge of the energy.

For decreasing the power consumption of the motors making up the dominant portion of the entire amount, the power conversion apparatus being high in power density or highly integrated design has to be more popular and widely used. However, no technology is yet proposed to reduce the size of or eliminate the DC link capacitor and the diode clamping circuit, which occupy most of the volume of the power conversion apparatus.

Particularly, for reducing the size of or eliminating the DC link capacitor and the diode clamping circuit occupying most of the volume of the power conversion apparatus as such, any special design considerations are required not to store any regenerative power in the power conversion apparatus from a load such as motor, but no such technology is yet specifically proposed.

In the power conversion apparatuses of FIGS. 4 to 7, i.e., apparatuses of direct conversion from AC to AC with no DC section involved, the diode clamping circuit may be indeed not required any more if any regenerative power from a load such as motor can be put back thereto by providing a path specifically therefor other than the diode clamping circuit. However, the bidirectional switches of FIGS. 8 to 13 do not serve well enough to put back the regenerative power from the motor to the switch sections of FIGS. 4 to 7.

In consideration thereof, an object of the invention is to provide an AC-to-AC power conversion apparatus not including a DC link capacitor and a diode clamping circuit by providing a capability of directing back, to a load such as motor, any power coming therefrom when the flow of power is changed, i.e., when the load such as motor is changed from powering operation to regenerative operation, or when any of the components connected to a semiconductor device is not activated, i.e., a gate power supply, a control power supply, and a gate circuit.

In a power conversion apparatus of the invention, the main circuit includes a plurality of switches, and power conversion is performed to generate power for supply to an AC load from a three- or single-phase AC power supply. Using a bidirectional switch configured by a normally-on device and a normally-off device, at least some of the plurality of switches are configured to provide only a specific unidirectional current flow when a gate circuit is not activated, and when the gate circuit is activated, provide a bidirectional current flow and control the current flow to direct in an arbitrary unidirectional way. The normally-on device is the one that is turned OFF when the gate circuit is provided with either a positive or negative voltage, and the normally-off device is the one that is turned ON when the gate circuit is provided with either a positive or negative voltage. With such a configuration, without requiring a component element for storing the energy in the power conversion apparatus, the power from the load can be circulated between the power conversion apparatus and the load.

The bidirectional switches of FIGS. 16 to 18 are each a semiconductor device having capabilities of providing only a specific unidirectional current flow when the gate circuit including the gate power supply and the control power supply is not activated, and when such a gate circuit including the gate power supply and the control power supply is activated, providing a bidirectional current flow and controlling the current flow to direct in an arbitrary unidirectional way. By using such a semiconductor device in the AC-to-AC power conversion apparatus, the power conversion apparatus is provided with a capability of directing back, to a load such as motor, any power coming therefrom when the component connected to the semiconductor device is not activated, i.e., the gate circuit including the gate power supply and the control power supply. FIG. 16 shows a three-terminal switch, FIG. 17 shows a four-terminal switch, and FIG. 18 shows a five-terminal switch. These three-, four-, and five-terminal switches are specifically shown in FIGS. 19 and 20, FIGS. 21 and 22, and FIGS. 23 and 24, respectively.

The bidirectional switches of FIGS. 19 to 24 are each a semiconductor device in which a switch section is a combination of a normally-on device and a normally-off device. The normally-on device is the one that is turned OFF when a gate circuit is provided with either a positive or negative voltage, and the normally-off device is the one that is turned ON when the gate circuit is provided with either a positive or negative voltage. The bidirectional switches of FIGS. 19 to 24 are all capable of controlling a current flow to direct in an arbitrary unidirectional way only in response to an input signal coming from the gate circuit. When the gate circuit is not activated, a diode connected in parallel to the normally-off device forms a current path with the normally-on device, thereby being able to direct the current flow in a specific unidirectional way only. Specifically, the bidirectional switches of FIGS. 23 and 24 are each provided with a drain terminal between the normally-on device and the normally-off device, and this configuration allows a first or second source and the drain terminal to provide a bidirectional current flow when the gate circuit is not activated, or allows the first or second source and the drain terminal to provide only a specific unidirectional current flow. As such, the power conversion apparatus is provided with a capability of directing back, to a load such as motor, any power coming therefrom when the flow of current s changed, i.e., when the motor is changed from powering operation to regenerative operation, or when any of the components connected to the semiconductor device is not activated, i.e., the gate power supply, the control power supply, and the gate circuit.

With the AC-to-AC power conversion apparatus implemented as such without requiring a DC link capacitor and a diode clamping circuit, the resulting power conversion apparatus being high in power density or implementing a power integrated circuit is expected to be widely used specifically for motor driving use.

In order to solve the problems described above and achieve the object described above, an aspect of the invention is directed to a power conversion apparatus or a power integrated circuit that can deal with the flow of current from a motor in any case without requiring a DC link capacitor and a diode clamping circuit, e.g., when the flow of current is changed, i.e., when a motor is changed from powering operation to regenerative operation, when any of components connected to a semiconductor device is not activated, i.e., the gate circuit including the gate power supply and the control power supply, when an input power supply in the power conversion apparatus suffers from sudden failures, when a momentary (short-time) power failure occurs, and when a momentary voltage drop occurs, or when the motor is with hard braking or is operated under light load. Such a power conversion apparatus or a power integrated circuit can be provided using the semiconductor devices of FIGS. 16 to 18, each having a capability of providing only a specific unidirectional current flow when the gate circuit including the gate power supply and the control power supply is not activated, and when the gate circuit including the gate power supply and the control power supply is activated, providing a bidirectional current flow and controlling the current flow to direct only in an arbitrary unidirectional way.

Another aspect of the invention is directed to a power conversion apparatus or a power integrated circuit that performs power conversion into a three-phase AC from a three- or single-phase AC without including the DC link capacitor and the diode clamping circuit described above.

The invention implements a power conversion apparatus or a power integrated circuit that performs power conversion into a three-phase AC from a three- or single-phase AC, and the resulting power conversion apparatus can be used for motor driving use at low cost, thereby contributing to good energy efficiency of motors.

The invention implements a power conversion apparatus or a power integrated circuit being high in power density that performs power conversion into a three-phase AC from a single-phase AC. The invention provides the good energy efficiency of motors driven by a single-phase AC power supply especially for use in household appliances such as air conditioners, refrigerators, washing machines, and vacuum cleaners.

In a conventional power conversion apparatus, when the input power supply therein suffers from sudden failures, when a momentary (short-time) power failure occurs, and when a momentary voltage drop occurs, or when the motor is with hard braking or is operated under light load, a diode clamping circuit has been working to absorb the power so that the component elements have been protected from damage. On the other hand, in the AC direct power conversion apparatus of the invention, using a bidirectional switch of the invention favorably eliminates any abrupt change of power and current, thereby being able to protect component elements without using a diode clamping circuit.

PREFERRED EMBODIMENTS OF THE INVENTION

In the below, any load to be driven by a power conversion apparatus of the invention is denoted as a three-phase AC load. The three-phase AC load includes an inductive load and a resistive load, which are operated by a three-phase alternating current such as brushless DC motor, induction motor, and synchronous motor. Such a three-phase AC load is surely not the only application option, but the invention is applicable to any other types of AC load such as single-phase AC load.

Figure 25:
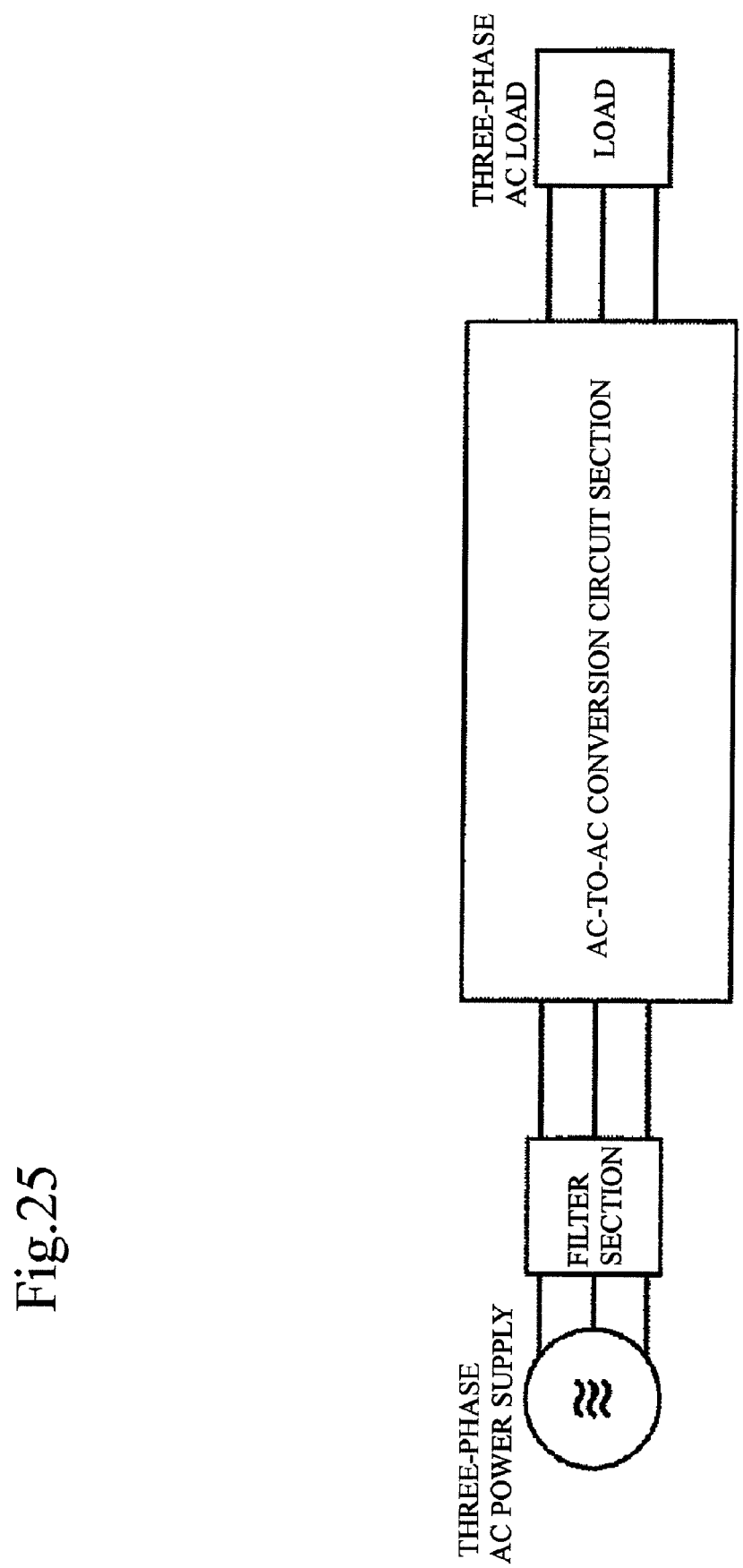
FIG. 25 shows a power conversion apparatus in which a diode clamping circuit is not required for direct conversion from a three-phase AC power supply to a three-phase AC load.

First Embodiment of Apparatus for Power Conversion from AC Power Supply to AC Load FIG. 25 shows a power conversion apparatus of the invention that drives a three-phase AC load from a three-phase AC power supply. To the side of the three-phase AC power supply, a filter section is connected. The filter section is configured by an inductor or a capacitor. An AC-to-AC conversion circuit section is provided with switches, which are partially or entirely any of the bidirectional switches of FIGS. 16 to 18 or a combination thereof, thereby implementing the power conversion apparatus not requiring a DC link capacitor and a diode clamping circuit.

Figure 1:
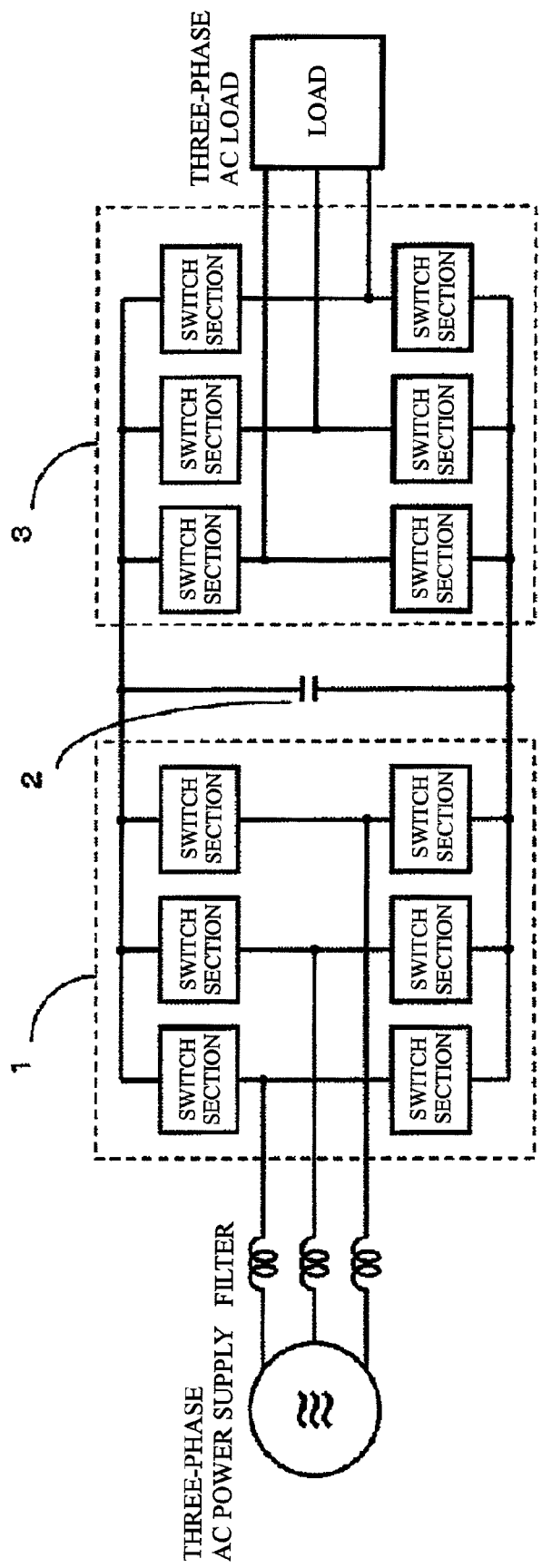
FIG. 1 shows a conventional power conversion apparatus for conversion from a three-phase AC power supply to a three-phase AC load using a direct-current DC link capacitor.
Figure 2:
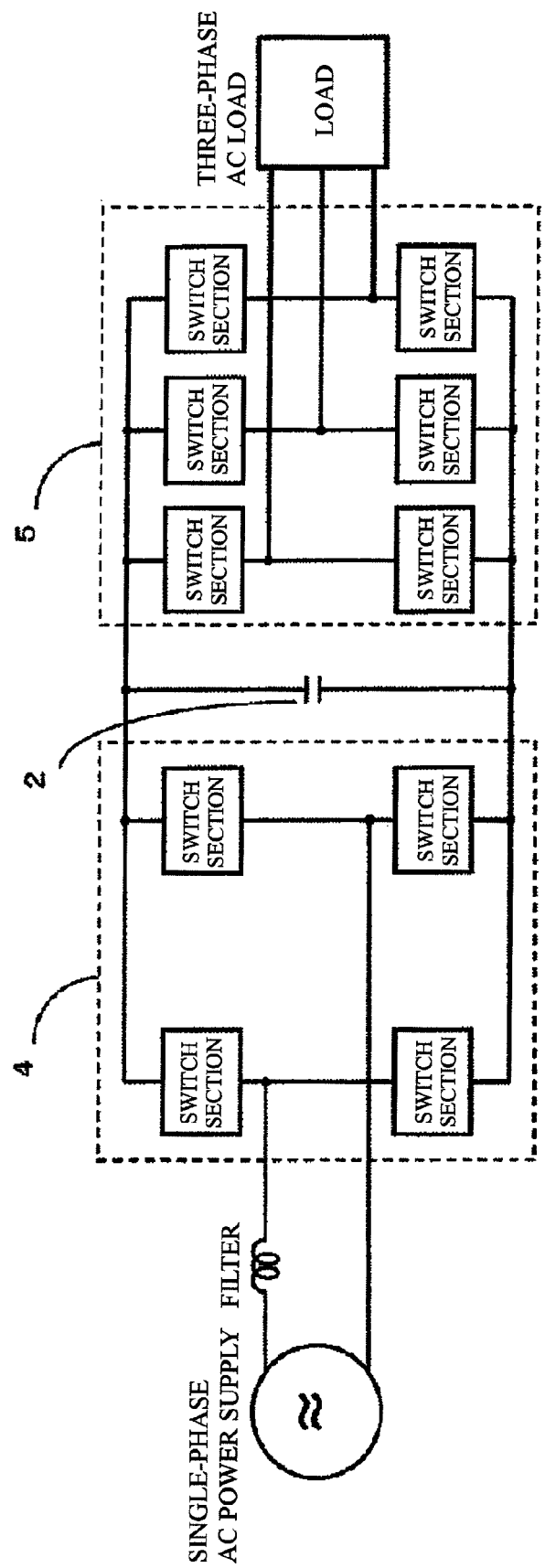
FIG. 2 shows another conventional power conversion apparatus for conversion from a single-phase AC power supply to a three-phase AC load using a DC link capacitor.
Figure 3:
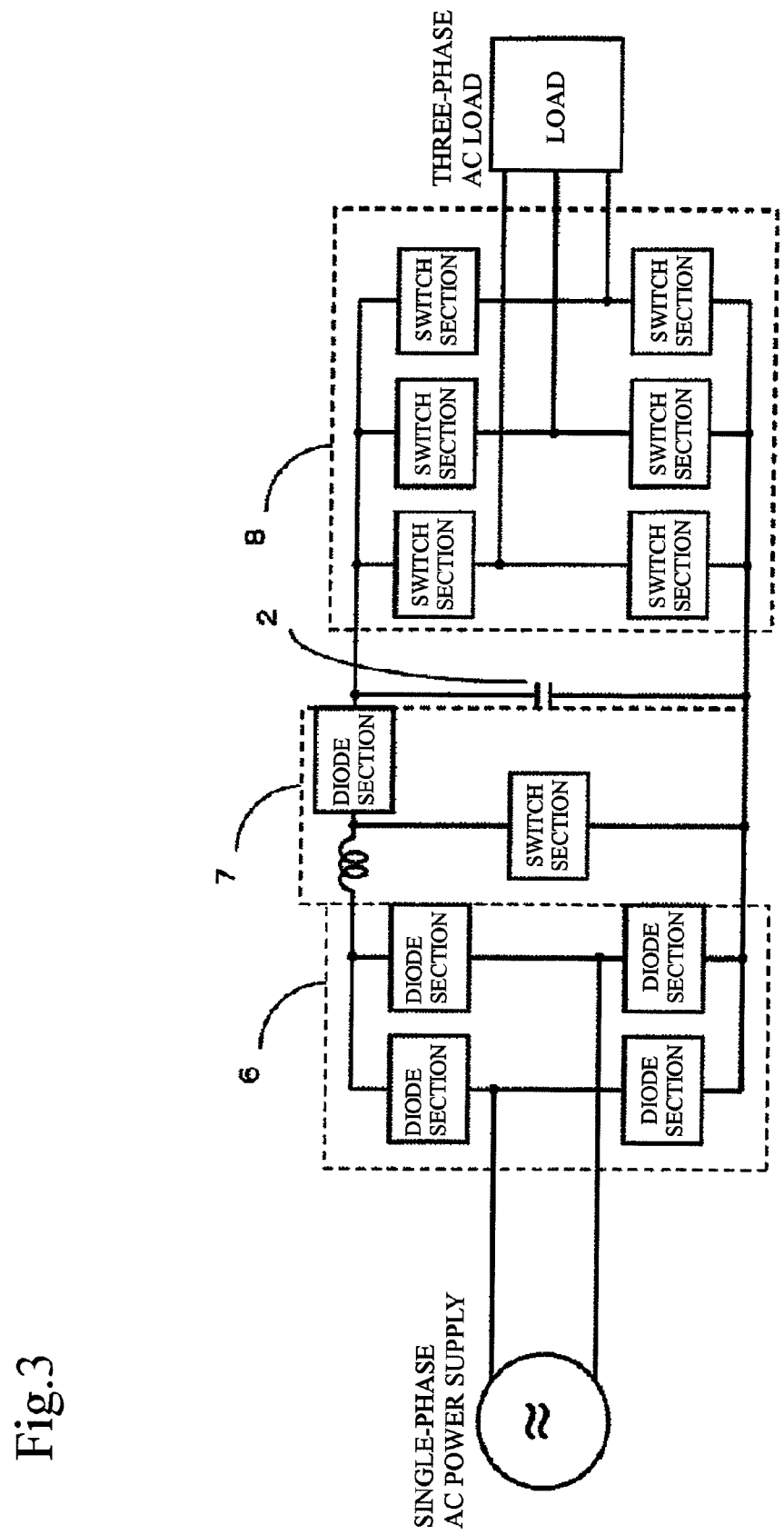
FIG. 3 shows still another conventional power conversion apparatus for conversion from a single-phase AC power supply to a three-phase AC load using a DC link capacitor and a composite chopper circuit.
Figure 4:
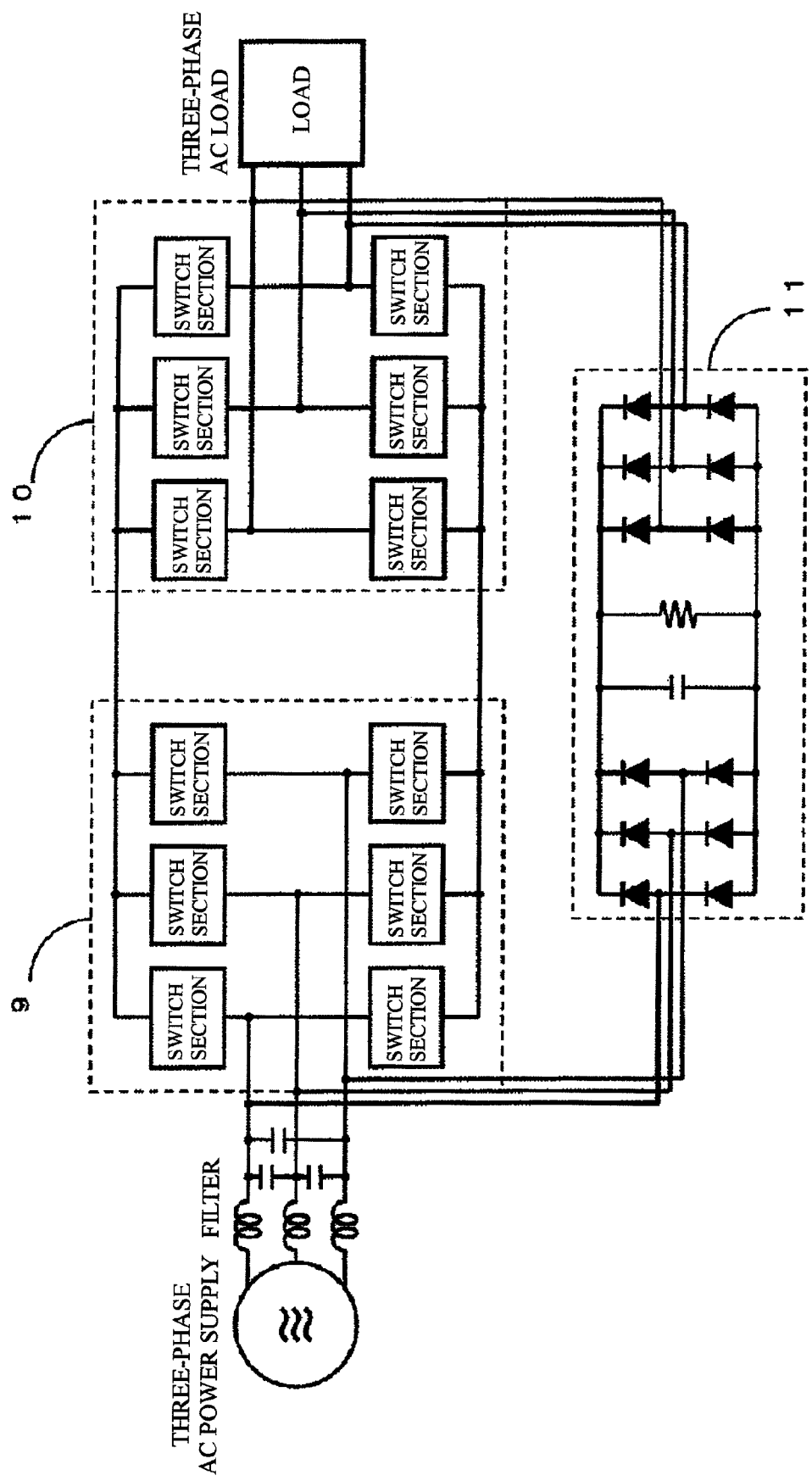
FIG. 4 shows a conventional power conversion apparatus for direct conversion from a three-phase AC power supply to a three-phase AC load connected with a diode clamping circuit.
Figure 6:
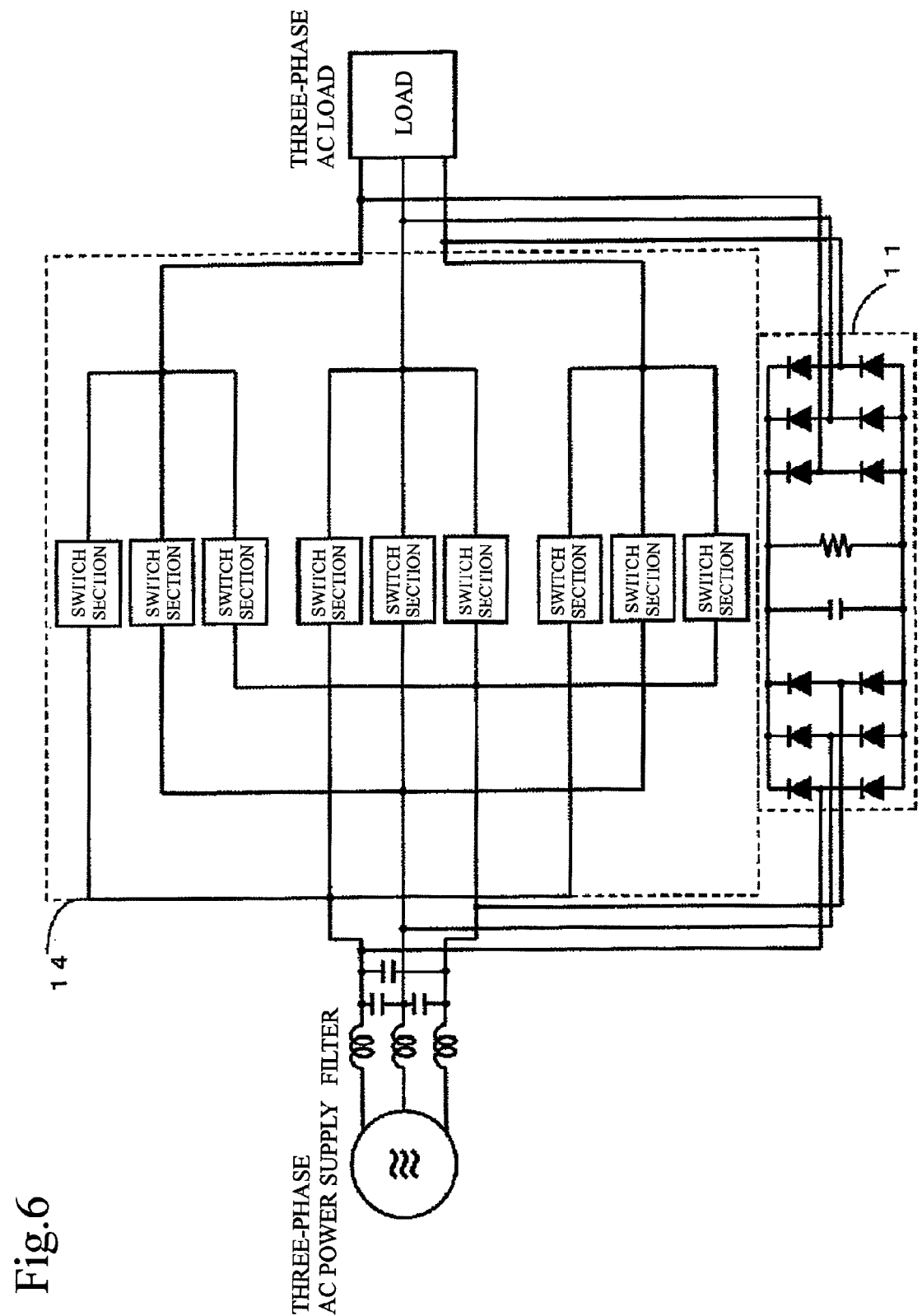
FIG. 6 shows still another conventional power conversion apparatus for direct conversion from a three-phase AC power supply to a three-phase AC load connected with a diode clamping circuit.

The AC-to-AC conversion circuit section of FIG. 25 is so configured as to perform power conversion without via a DC circuit and any component for storage of energy. Such an AC-to-AC conversion circuit section uses an AC direct power conversion circuit of an indirect type (matrix converter; refer to FIG. 4), or a direct power conversion circuit of a direct type (direct-type matrix converter; refer to FIG. 6). The indirect-type AC power conversion circuit is in the configuration that a three-phase full-bridge circuit on the power-supply side is connected with a three-phase full-bridge circuit on the load side. In the direct-type power conversion circuit, nine bidirectional switches are connected to input/output lines between a three-phase AC power supply and a three-phase AC load.

Figure 26:
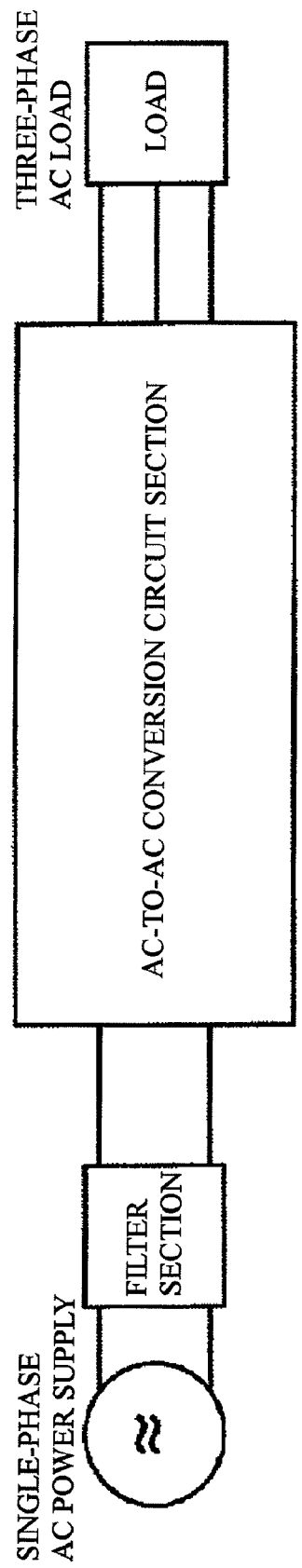
FIG. 26 shows another power conversion apparatus in which a diode clamping circuit is not required for direct conversion from a single-phase AC power supply to a three-phase AC load.

FIG. 26 shows another power conversion apparatus of the invention that drives a three-phase AC load from a single-phase AC power supply. To the side of the single-phase AC power supply, a filter section is connected. The filter section is configured by an inductor or a capacitor. An AC-to-AC conversion circuit section is provided with switches, which are partially or entirely any of the bidirectional switches of FIGS. 16 to 18 or a combination thereof, thereby implementing the power conversion apparatus not requiring a DC link capacitor and a diode clamping circuit.

Figure 5:
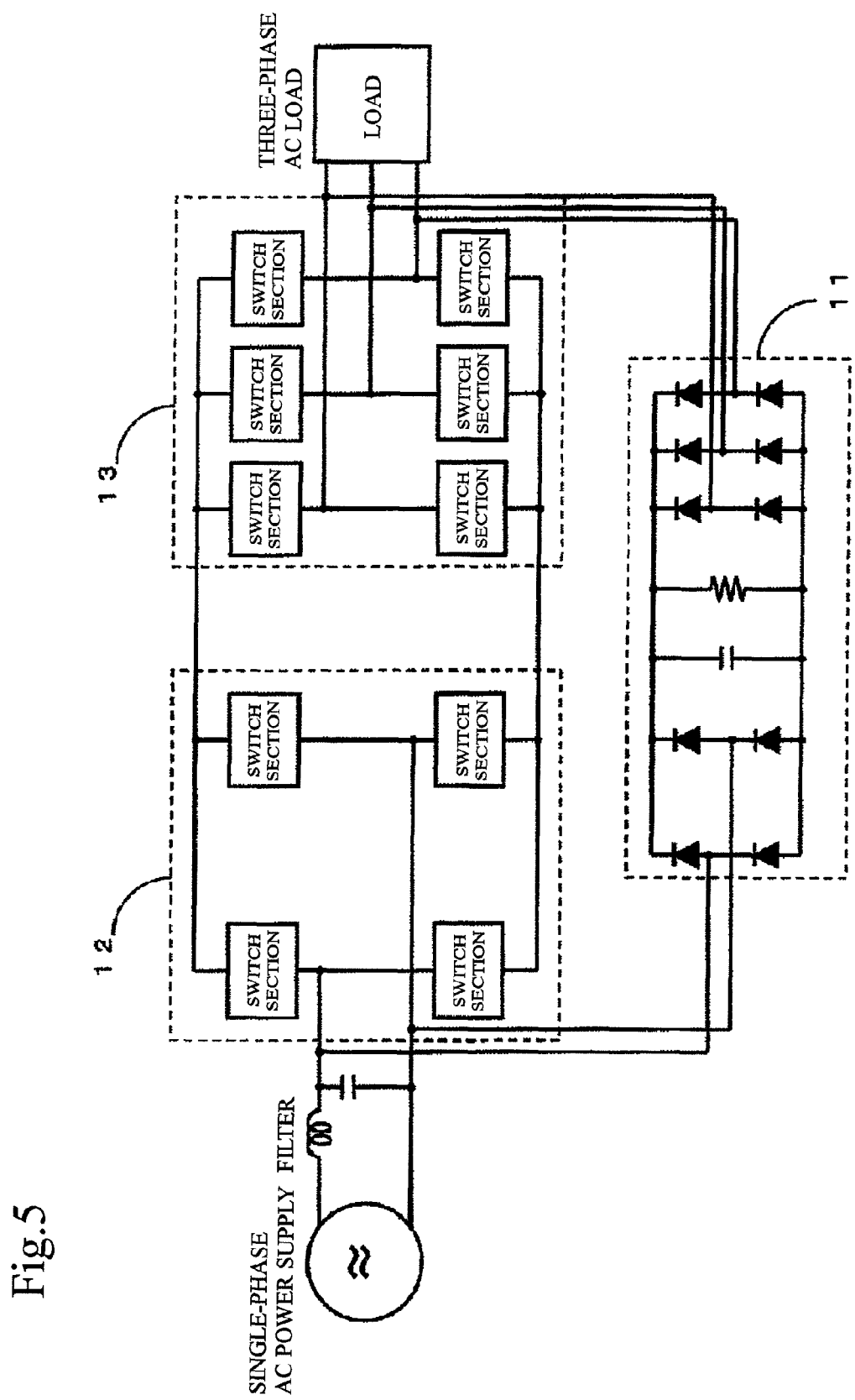
FIG. 5 shows another conventional power conversion apparatus for direct conversion from a single-phase AC power supply to a three-phase AC load connected with a diode clamping circuit.
Figure 7:
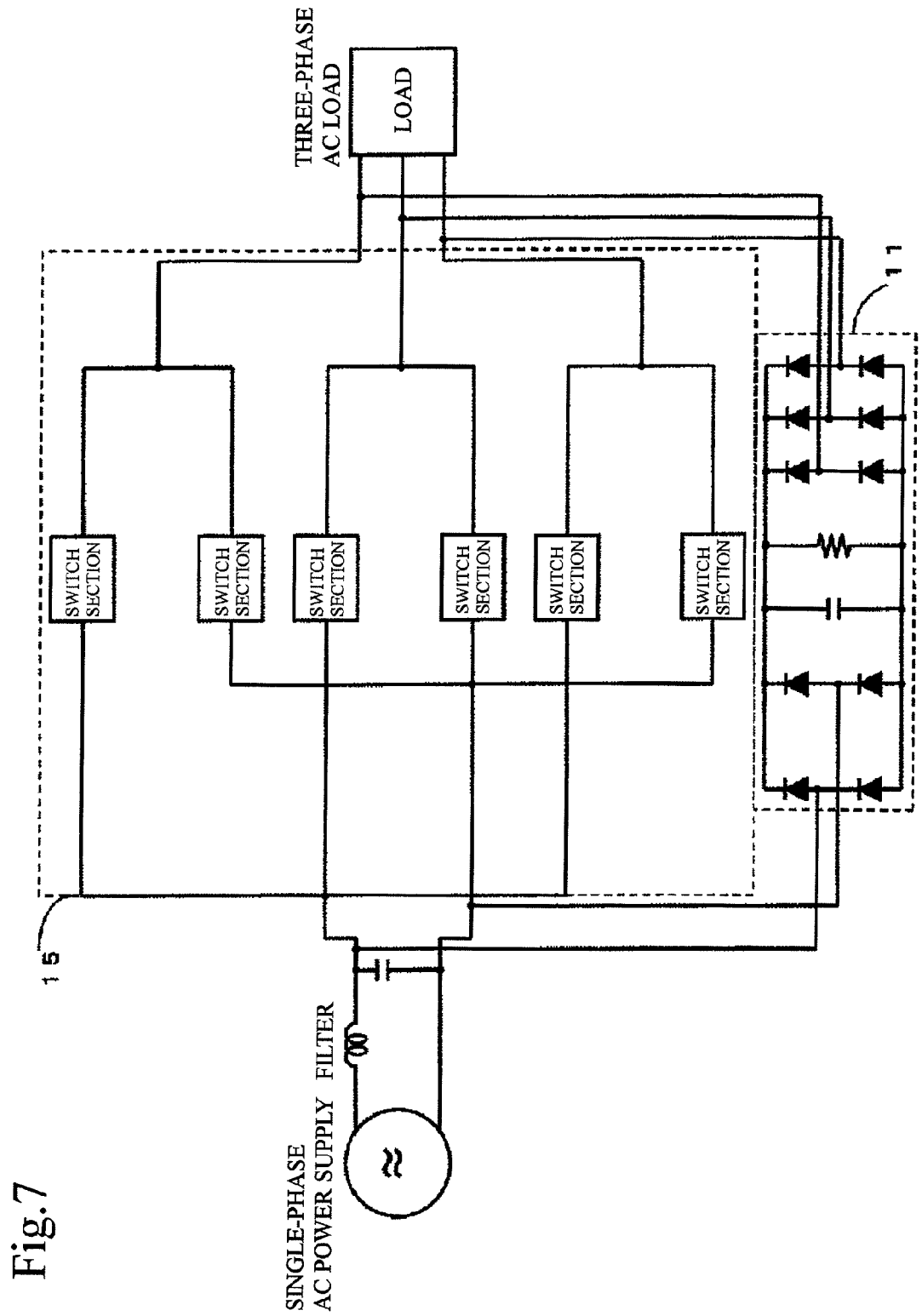
FIG. 7 shows still another conventional power conversion apparatus for direct conversion from a single-phase AC power supply to a three-phase AC load connected with a diode clamping circuit.
Figure 8:
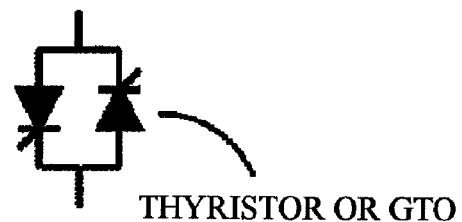
FIG. 8 shows a conventional bidirectional switch in which a thyristor or a GTO is connected in reverse parallel with another.
Figure 9:
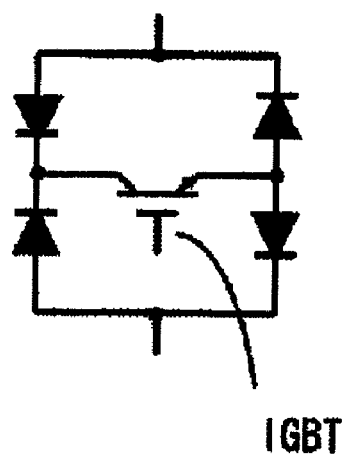
FIG. 9 shows another conventional bidirectional switch configured by an IGBT and diodes.
Figure 10:
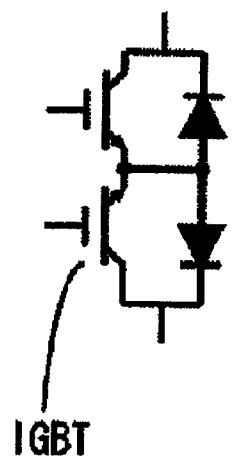
FIG. 10 shows still another conventional bidirectional switch also configured by IGBTs and diodes.
Figure 11:
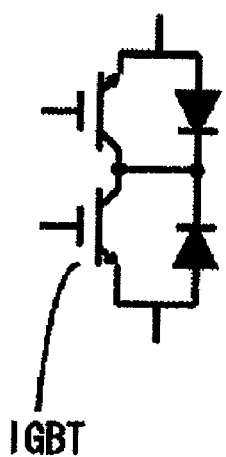
FIG. 11 shows still another conventional bidirectional switch also configured by IGBTs and diodes.

The AC-to-AC conversion circuit section of FIG. 26 is so configured as to perform power conversion without via a DC circuit and any component element for storage of energy. Such an AC-to-AC conversion circuit section uses a direct power conversion circuit of an indirect (matrix converter; refer to FIG. 5), or a direct power conversion circuit of a direct type (direct-type matrix converter; refer to FIG. 7). The indirect-type power conversion circuit is in an AC indirect conversion circuit in which a single-phase full-bridge circuit on the power-supply side is connected with a three-phase full-bridge circuit on the load side. In the direct power conversion circuit, six bidirectional switches are connected to input/output lines between the single-phase AC power supply and the three-phase AC load.

Figure 19:
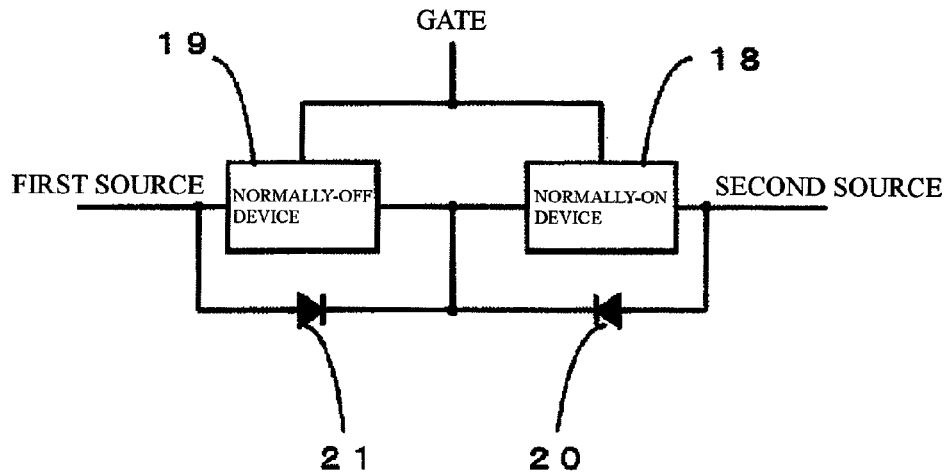
FIG. 19 shows a new three-terminal bidirectional switch in which a normally-on device and a normally-off device are combined together, and a gate terminal is solely provided.
Figure 20:
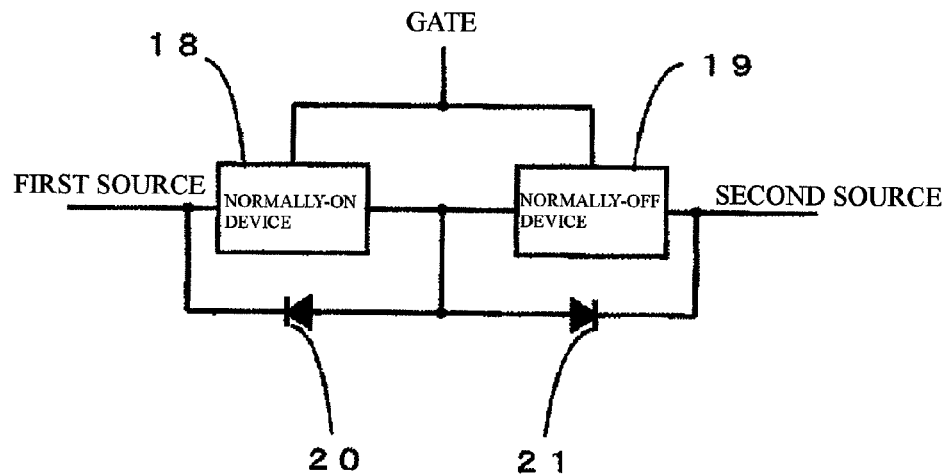
FIG. 20 shows another new three-terminal bidirectional switch in which a normally-on device and a normally-off device are combined together, and a gate terminal is solely provided.

FIGS. 19 and 20 each show a bidirectional switch, i.e., three-terminal semiconductor device, configured by a normally on device 18, a normally-off device 19, and diodes 20 and 21. The normally-on device 18 is turned OFF when a gate is provided with either a positive or negative voltage, and the normally-off device 19 is turned ON when the gate is provided with either a positive or negative voltage. The diodes 20 and 21 are connected in parallel to the normally-on and normally-off devices 18 and 19, respectively. Such a bidirectional switch serves to provide only a specific unidirectional current flow when any of the components connected thereto, i.e., semiconductor device, is not activated, i.e., a gate power supply, a control power supply, and a gate circuit. The bidirectional switch is provided with a gate section, and two current paths, i.e., first and second sources. The bidirectional switch has a capability of controlling a current flow to the first and second sources in the two, at the maximum, operation modes depending on the signal combination provided to the gate section.

Figure 21:
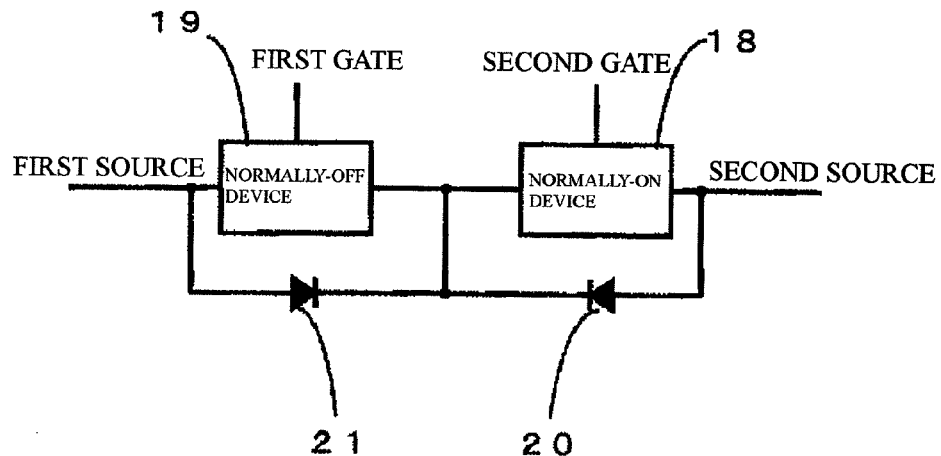
FIG. 21 shows a new four-terminal bidirectional switch in which a normally-on device and a normally-off device are combined together, and two gate terminals are provided.
Figure 22:
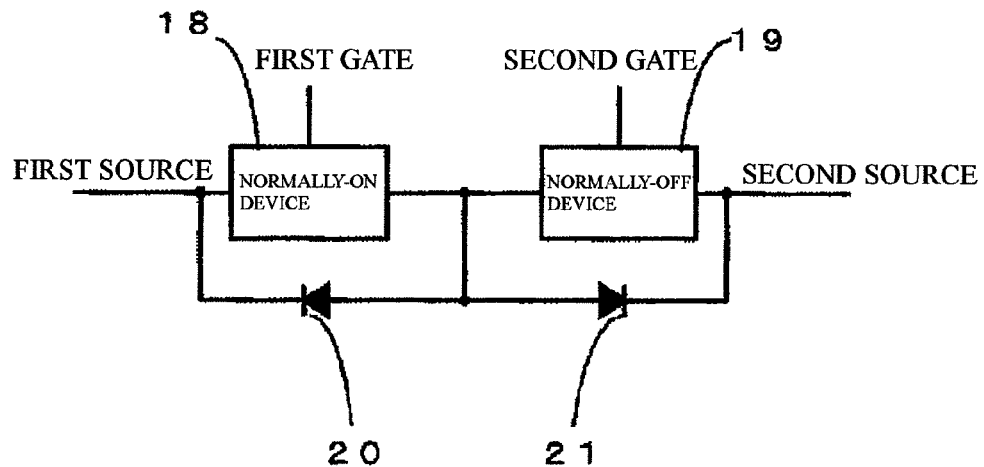
FIG. 22 shows another new four-terminal bidirectional switch in which a normally-on device and a normally-off device are combined together, and two gate terminals are provided.

FIGS. 21 and 22 each show a bidirectional switch, i.e., four-terminal semiconductor device, configured by the normally-on device 18, the normally-off device 19, and the diodes 20 and 21. The normally-on device 18 is turned OFF when a gate is provided with either a positive or negative voltage, and the normally-off device 19 is turned ON when the gate is provided with either a positive or negative voltage. The diodes 20 and 21 are connected in parallel to the normally-on and normally-off devices 18 and 19, respectively. Such a bidirectional switch serves to provide only a specific unidirectional current flow when any of the components connected thereto, i.e., semiconductor device, is not activated, i.e., a gate power supply, a control power supply, and a gate circuit. The bidirectional switch is provided with two gate sections, i.e., first and second gates, and two current paths, i.e., first and second sources. The bidirectional switch has a capability of controlling a current flow to the first and second sources in the four, at the maximum, operation modes depending on the signal combination provided to each of the gate sections.

Figure 23:
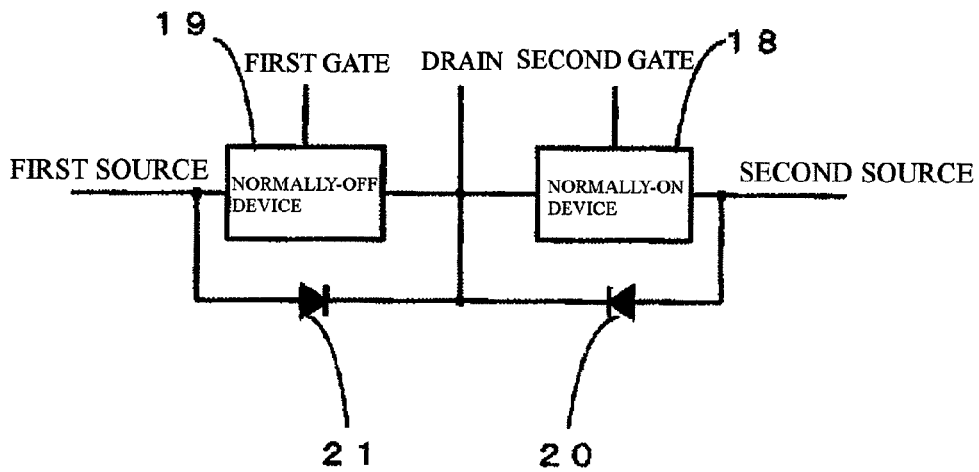
FIG. 23 shows a new five-terminal bidirectional switch in which a normally-on device and a normally-off device are combined together, and two gate terminals and a drain terminal are provided.
Figure 24:
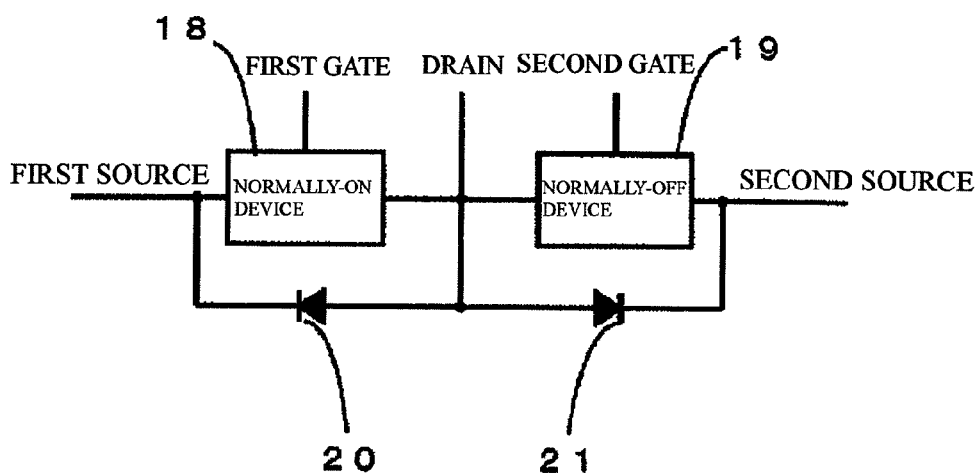
FIG. 24 shows another new five-terminal bidirectional switch in which a normally-on device and a normally-off device are combined together, and two gate terminals and a drain terminal are provided.

FIGS. 23 and 24 each show a bidirectional switch, i.e., five-terminal semiconductor device, configured by the normally-on device 18, the normally-off device 19, and the diodes 20 and 21. The normally-on device 18 is turned OFF when a gate is provided with either a positive or negative voltage, and the normally-off device 19 is turned ON when the gate is provided with either a positive or negative voltage. The diodes 20 and 21 are connected in parallel to the normally-on and normally-off devices 18 and 19, respectively. Such a bidirectional switch serves to provide only a specific unidirectional current flow when any of the components connected thereto, i.e., semiconductor device, is not activated, i.e., a gate power supply, a control power supply, and a gate circuit. The bidirectional switch is provided with two gate sections, i.e., first and second gates, and three current paths, i.e., first and second sources, and a drain. The bidirectional switch has a capability of controlling a current flow to the first and second sources in the four, at the maximum, operation modes depending on the signal combination provided to each of the gate sections. The drain terminal is provided between the normally-on device 18 and the normally-off device 19 so that another current flow is provided while a current flow to the first and second sources is being controlled.

FIGS. 27 to 32 each show a circuit symbol of a bidirectional switch, i.e., semiconductor device, that provides only a specific unidirectional current flow when any of the components connected thereto is not activated, i.e., a gate power supply, a control power supply, and a gate circuit.

Figure 16:
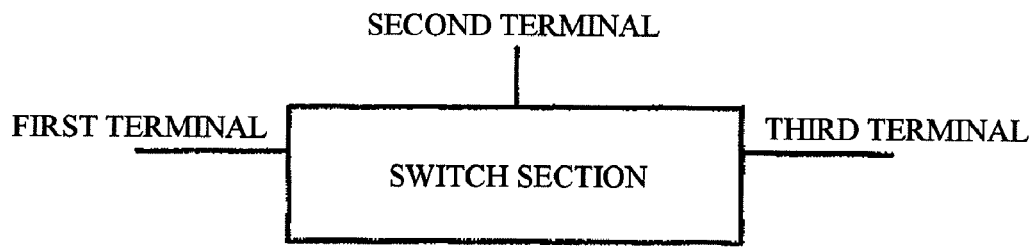
FIG. 16 shows a new three-terminal bidirectional switch.
Figure 27:
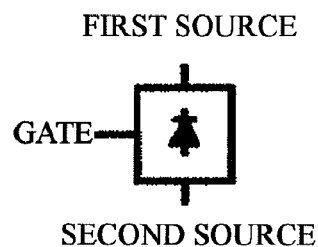
FIG. 27 shows a circuit symbol of a new three-terminal bidirectional switch.
Figure 28:
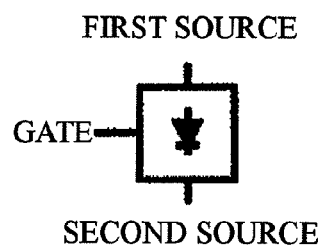
FIG. 28 shows another circuit symbol of a new three-terminal bidirectional switch.

Specifically, FIGS. 27 and 28 each show a circuit symbol of a three-terminal bidirectional switch that provides only a specific unidirectional current flow when any of the components connected thereto, i.e., semiconductor device of FIG. 16, is not activated, i.e., a gate power supply, a control power supply, and a gate circuit. FIG. 27 shows a circuit symbol of a semiconductor device that provides a unidirectional current flow from the second source to the first source when any of the components connected thereto is not activated, i.e., a gate power supply, a control power supply, and a gate circuit. FIG. 28 shows a circuit symbol of a semiconductor device that provides a unidirectional current flow from the first source to the second source when any of the components connected thereto is not activated, i.e., a gate power supply, a control power supply, and a gate circuit.

Figure 17:
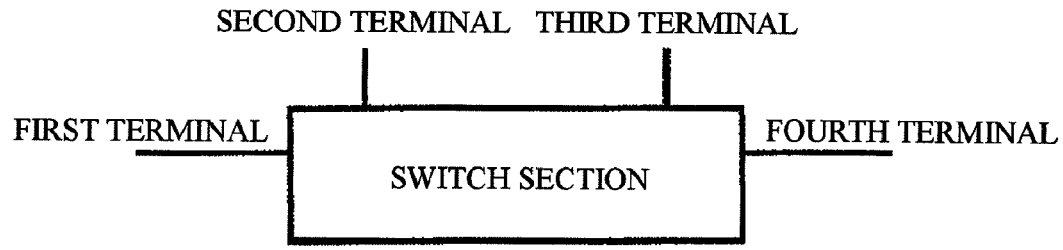
FIG. 17 shows a new four-terminal bidirectional switch.
Figure 29:
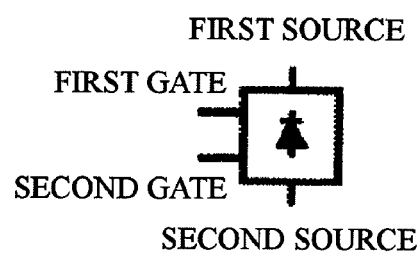
FIG. 29 shows a circuit symbol of a new four-terminal bidirectional switch.
Figure 30:
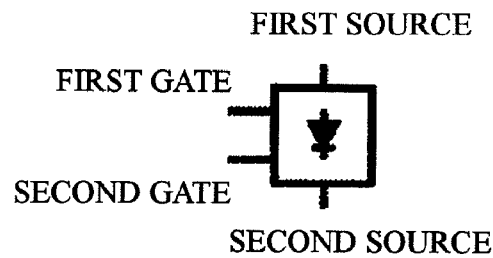
FIG. 30 shows another circuit symbol of a new four-terminal bidirectional switch.

FIGS. 29 and 30 each show a circuit symbol of a four-terminal bidirectional switch that provides only a specific unidirectional current flow when any of the components connected thereto, i.e., semiconductor device of FIG. 17, is not activated, i.e., a gate power supply, a control power supply, and a gate circuit. FIG. 29 shows a circuit symbol of a semiconductor device that provides a unidirectional current flow from the second source to the first source when any of the components connected thereto is not activated, i.e., a gate power supply, a control power supply, and a gate circuit. FIG. 30 shows a circuit symbol of a semiconductor device that provides a unidirectional current flow from the first source to the second source when any of the components connected thereto is not activated, i.e., a gate power supply, a control power supply, and a gate circuit.

Figure 18:
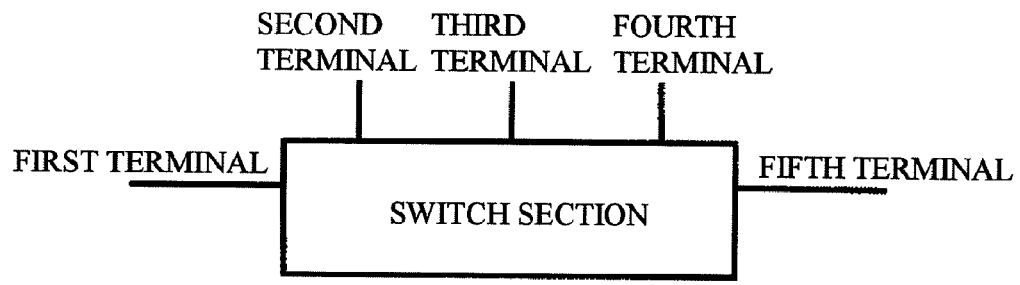
FIG. 18 shows a new five-terminal bidirectional switch.
Figure 31:
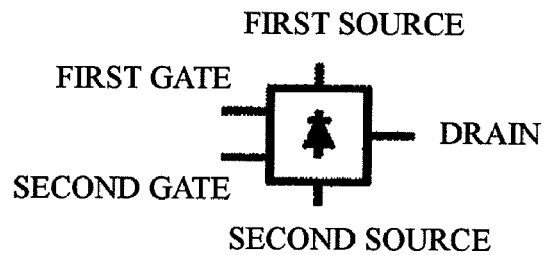
FIG. 31 shows a circuit symbol of a new five-terminal bidirectional switch.
Figure 32:
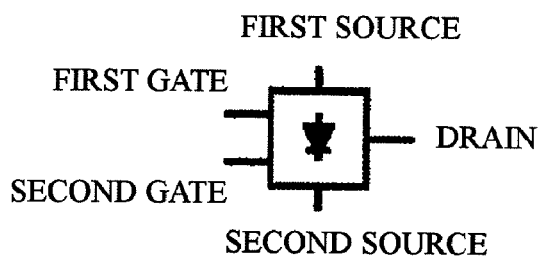
FIG. 32 shows another circuit symbol of a new five-terminal bidirectional switch.

FIGS. 31 and 32 each show a circuit symbol of a five-terminal bidirectional switch that provides only a specific unidirectional current flow when any of the components connected thereto, i.e., semiconductor device of FIG. 18, is not activated, i.e., a gate power supply, a control power supply, and a gate circuit. FIG. 31 shows a circuit symbol of a semiconductor device that provides a unidirectional current flow only from the second source to the first source when any of the components connected thereto is not activated, i.e., a gate power supply, a control power supply, and a gate circuit. FIG. 32 shows a circuit symbol of a semiconductor device that provides a unidirectional current flow only from the first source to the second source when any of the components connected thereto is not activated, i.e., a gate power supply, a control power supply, and a gate circuit.

FIGS. 33 to 51 each show a specific example of a bidirectional switch that provides only a specific unidirectional current flow when any of the components connected thereto, i.e., semiconductor device, is not activated, i.e., a gate power supply, a control power supply, and a gate circuit.

Figure 33:
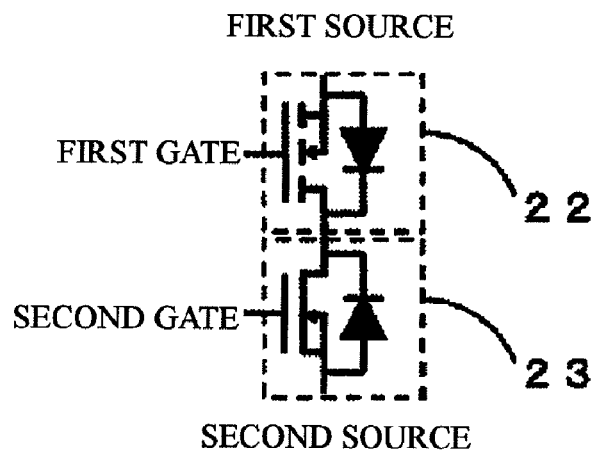
FIG. 33 shows a specific example of a new four-terminal bidirectional switch.
Figure 34:
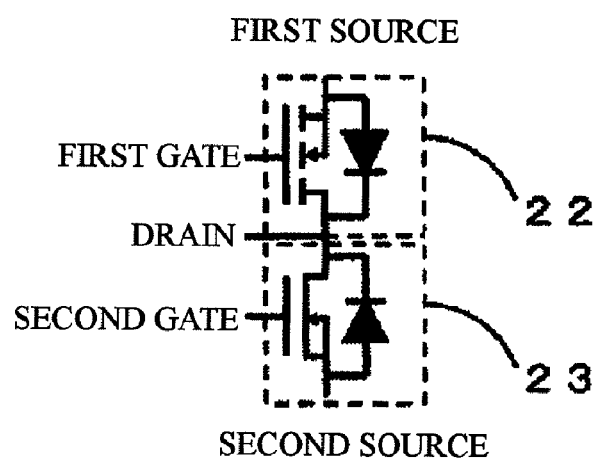
FIG. 34 shows a specific example of a new five-terminal bidirectional switch.

FIGS. 33 and 34 each show a semiconductor device configured by a first n-type MOSFET section 22, and a second n-type MOSFET section 23. The first n-type MOSFET section 22 provides a unidirectional current flow only from a first source when any of the components connected to the semiconductor device is not activated, i.e., a gate power supply, a control power supply, and a gate circuit. The second n-type MOSFET section 23 provides a bidirectional current flow when any of the components connected to the semiconductor device is not activated, i.e., a gate power supply, a control power supply, and a gate circuit. FIG. 33 shows a four-terminal semiconductor device, including two gate sections, i.e., first and second gates, and two current paths, i.e., first and second sources. FIG. 34 shows a five-terminal semiconductor device, including two gate sections, i.e., first and second gates, and three current paths, i.e., first and second sources, and a drain.

The first and second n-type MOSFET sections are each provided therein with a diode. The first n-type MOSFET sections of FIGS. 33 and 34 correspond to the components of FIGS. 19, 21, and 23, i.e., the normally-off device sections and the diode sections connected in parallel thereto, and the second n-type MOSFET sections correspond to the components of FIGS. 19, 21, and 23, i.e., the normally-on device sections and the diode sections connected in parallel thereto.

Figure 35:
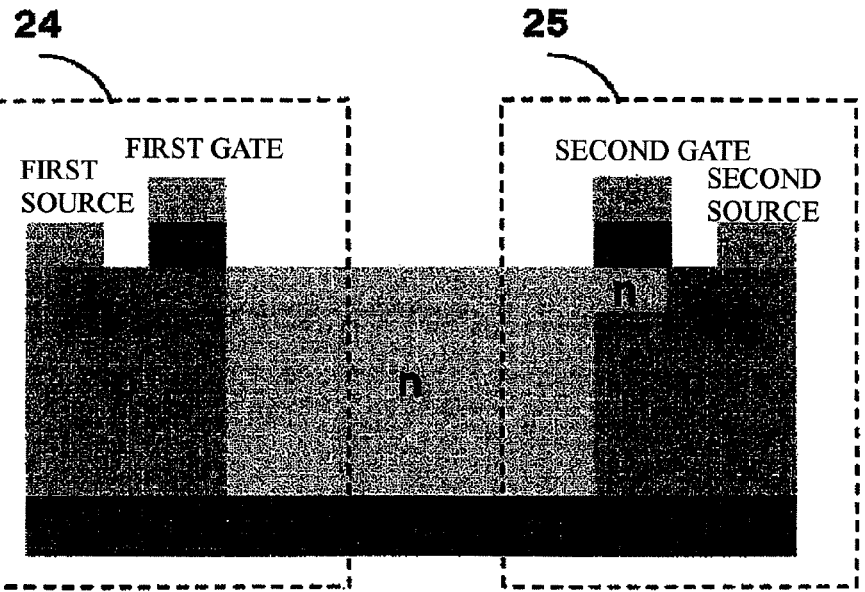
FIG. 35 shows another specific example of a new four-terminal bidirectional switch.

FIG. 35 shows a four-terminal semiconductor device of a lateral type configured by a first n-type MOSFET section 24, and a second n-type MOSFET section 25. The first n-type MOSFET section 24 provides a unidirectional current flow only from a first source when any of the components connected to the semiconductor device is not activated, i.e., a gate power supply, a control power supply, and a gate circuit. The second n-type MOSFET section 25 provides a bidirectional current flow when any of the components connected to the semiconductor device is not activated, i.e., a gate power supply, a control power supply, and a gate circuit.

Figure 36:
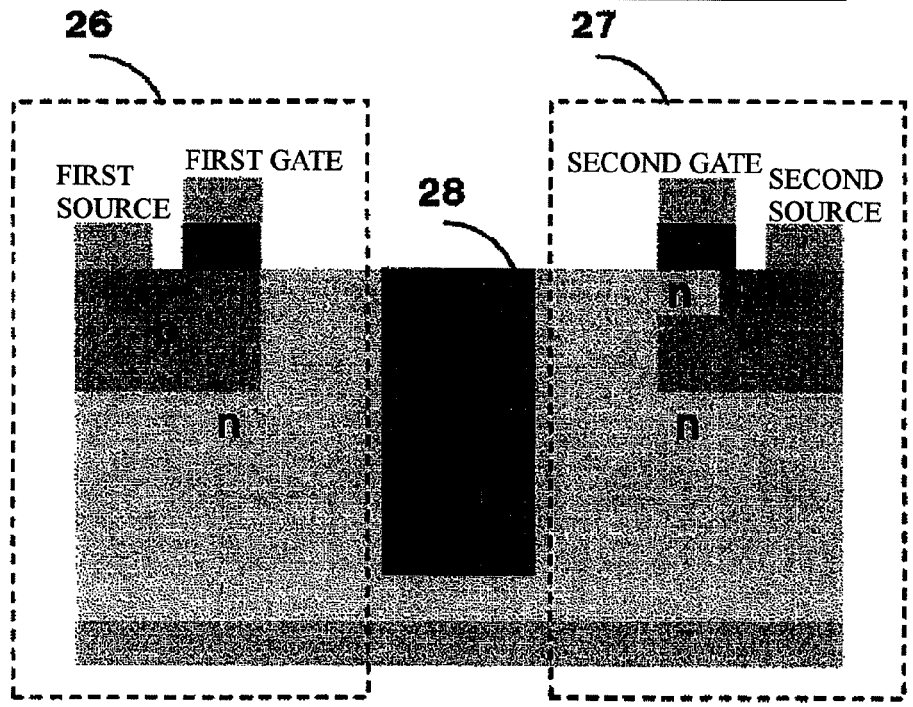
FIG. 36 shows still another specific example of a new four-terminal bidirectional switch.

FIG. 36 shows a four-terminal semiconductor device of a vertical type configured by a first n-type MOSFET section 26, and a second n-type MOSFET section 27. The first n-type MOSFET section 26 provides a unidirectional current flow only from a first source when any of the components connected to the semiconductor device is not activated, i.e., a gate power supply, a control power supply, and a gate circuit. The second n-type MOSFET section 27 provides a bidirectional current flow when any of the components connected to the semiconductor device is not activated, i.e., a gate power supply, a control power supply, and a gate circuit. The first n-type MOSFET section 26 is separated from the second n-type MOSFET section 27 by an insulator 28.

Figure 37:
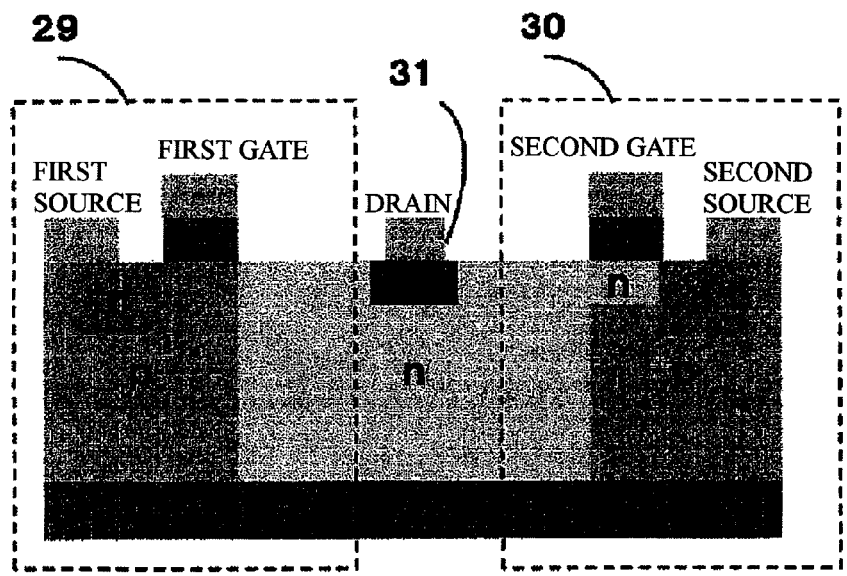
FIG. 37 shows another specific example of a new five-terminal bidirectional switch.

FIG. 37 shows a five-terminal semiconductor device of a lateral type configured by a first n-type MOSFET section 29, and a second n-type MOSFET section 30. The first n-type MOSFET section 29 provides a unidirectional current flow only from a first source when any of the components connected to the semiconductor device is not activated, i.e., a gate power supply, a control power supply, and a gate circuit. The second n-type MOSFET section 30 provides a bidirectional current flow when any of the components connected to the semiconductor device is not activated, i.e., a gate power supply, a control power supply, and a gate circuit. Between the first and second n-type MOSFET sections 29 and 30, a drain terminal 31 is disposed.

Figure 38:
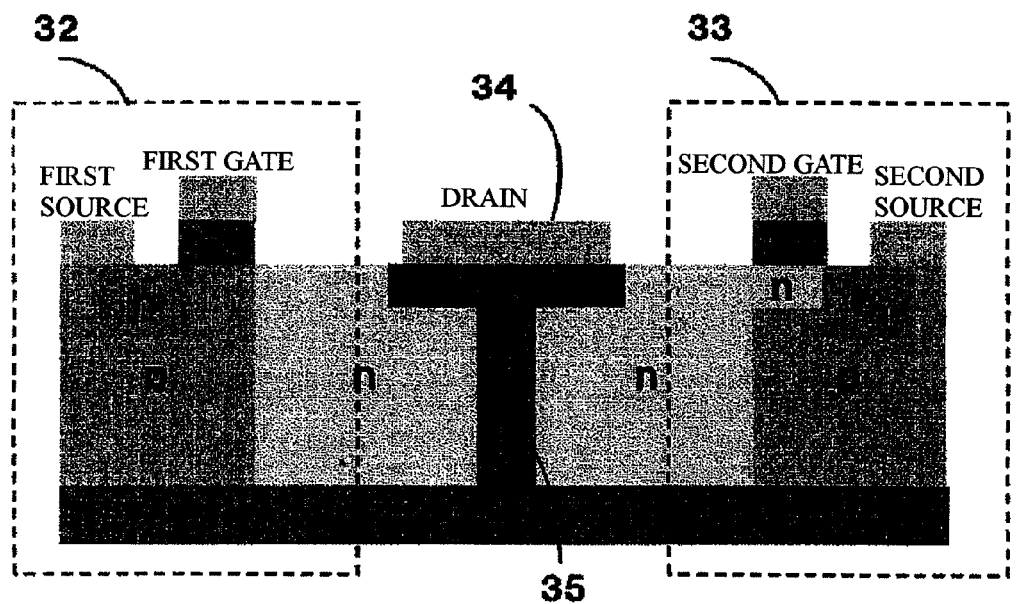
FIG. 38 shows still another specific example of a new five-terminal bidirectional switch.

FIG. 38 shows a five-terminal semiconductor device of a lateral type configured by a first n-type MOSFET section 32, and a second n-type MOSFET section 33. The first n-type MOSFET section 32 provides a unidirectional current flow only from a first source when any of the components connected to the semiconductor device is not activated, i.e., a gate power supply, a control power supply, and a gate circuit. The second n-type MOSFET section 33 provides a bidirectional current flow when any of the components connected to the semiconductor device is not activated, i.e., a gate power supply, a control power supply, and a gate circuit. Between the first and second n-type MOSFET sections 32 and 33, a drain terminal 34 is disposed. Moreover, the first n-type MOSFET section 32 is separated from the second n-type MOSFET section 33 by an insulator 35.

Figure 39:
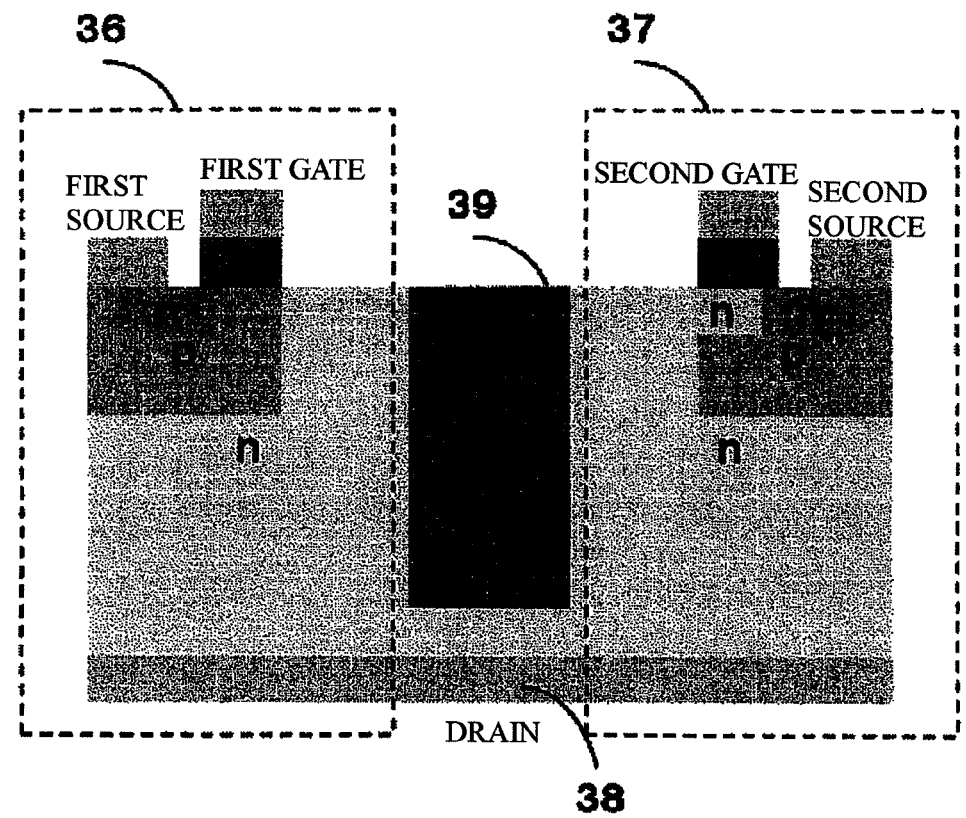
FIG. 39 shows still another specific example of a new five-terminal bidirectional switch.

FIG. 39 shows a five-terminal semiconductor device of a vertical type configured by a first n-type MOSFET section 36, and a second n-type MOSFET section 37. The first n-type MOSFET section 36 provides a unidirectional current flow only from a first source when any of the components connected to the semiconductor device is not activated, i.e., a gate power supply, a control power supply, and a gate circuit. The second n-type MOSFET section 37 provides a bidirectional current flow when any of the components connected to the semiconductor device is not activated, i.e., a gate power supply, a control power supply, and a gate circuit. Between the first and second n-type MOSFET sections 36 and 37, a drain terminal 38 is disposed. Moreover, the first n-type MOSFET section 36 is separated from the second n-type MOSFET section 37 by an insulator 39.

In the semiconductor devices of FIGS. 35 to 39, the first and second n-type MOSFET sections are each provided therein with a parasitic diode, or alternatively, are each externally connected with a diode.

With the semiconductor devices of FIGS. 33 to 39, the first n-type MOSFET section is allowed to open the n-channel through application of a positive voltage to the first gate with respect to the first source, thereby being able to provide a bidirectional current flow. Through application of a negative voltage to the second gate with respect to the second source, the second n-type MOSFET section is allowed to close the n-channel, thereby being able to provide a unidirectional current flow only from the second source.

If voltage application is not performed to both the first and second gates, a unidirectional current flow is allowed only from the first source to the second source. When a positive voltage is applied to the first gate with respect to the first source to open the n-channel in the first n-type MOSFET section, and when no voltage is applied to the second gate, a bidirectional current flow is allowed, i.e., from the first source to the second source, and from the second source to the first source. When no voltage is applied to the first gate, and when a negative voltage is applied to the second gate with respect to the second source to close the n-channel in the second n-type MOSFET section, a current flow is cut off bidirectionally in the semiconductor device. When a positive voltage is applied to the first gate with respect to the first source to open the n-channel in the first n-type MOSFET section, and when a negative voltage is applied to the second gate with respect to the second source to close the n-channel in the second n-type MOSFET section, a unidirectional current flow is allowed only from the second source to the first source.

Figure 40:
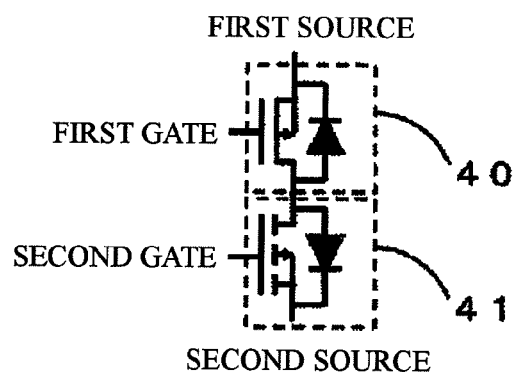
FIG. 40 shows still another specific example of a new four-terminal bidirectional switch.
Figure 41:
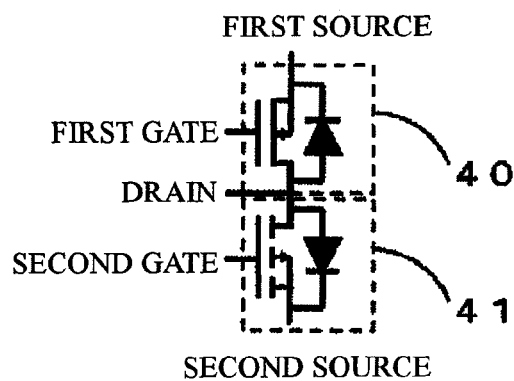
FIG. 41 shows still another specific example of a new five-terminal bidirectional switch.

FIGS. 40 and 41 each show a semiconductor device of a lateral type configured by a first p-type MOSFET section 40, and a second p-type MOSFET section 41. The first p-type MOSFET section 40 provides a bidirectional current flow when any of the components connected to the semiconductor device is not activated, i.e., a gate power supply, a control power supply, and a gate circuit. The second p-type MOSFET section 41 provides a unidirectional current flow directing only to the second source when any of the components connected to the semiconductor device is not activated, i.e., a gate power supply, a control power supply, and a gate circuit. FIG. 40 shows a four-terminal semiconductor device, including two gate sections, i.e., first and second gates, and two current paths, i.e., first and second sources. FIG. 41 shows a five-terminal semiconductor device, including two gate sections, i.e., first and second gates, and three current paths, i.e., first and second sources, and a drain.

The first and second p-type MOSFET sections are each provided therein with a diode. The first p-type MOSFET sections of FIGS. 40 and 41 correspond to the components of FIGS. 20, 22, and 24, i.e., the normally-on device sections and the diode sections connected in parallel thereto, and the second p-type MOSFET sections correspond to the components of FIGS. 20, 22, and 24, i.e., the normally-off device sections and the diode sections connected in parallel thereto.

Figure 42:
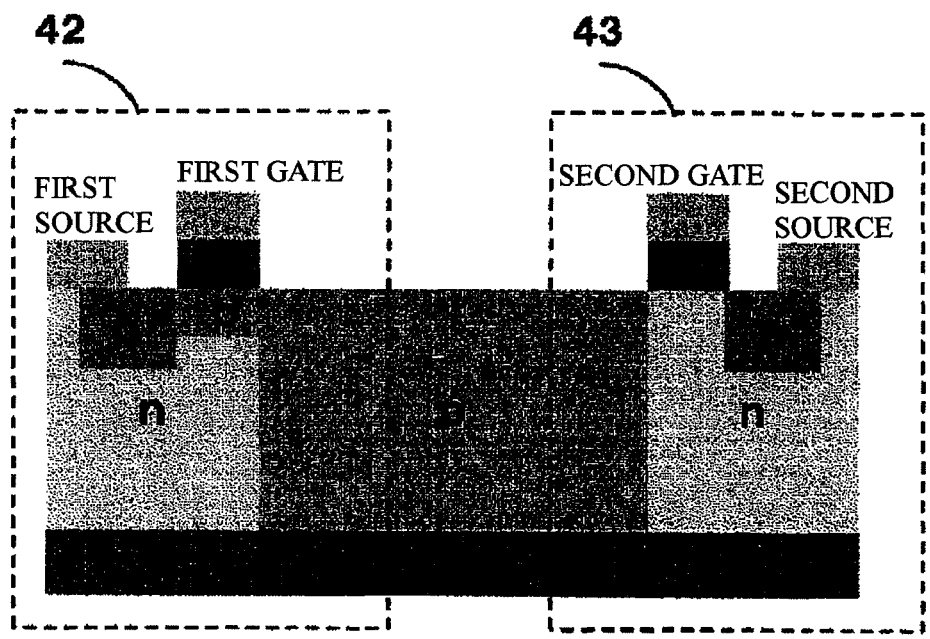
FIG. 42 shows still another specific example of a new four-terminal bidirectional switch.

FIG. 42 shows a semiconductor device of a lateral type configured by a first p-type MOSFET section 42, and a second p-type MOSFET section 43. The first p-type MOSFET section 42 provides a bidirectional current flow when any of the components connected to the semiconductor device is not activated, i.e., a gate power supply, a control power supply, and a gate circuit. The second p-type MOSFET section 43 provides a unidirectional current flow directing only to the second source when the components connected to the semiconductor device is not activated, i.e., a gate power supply, a control power supply, and a gate circuit.

Figure 43:
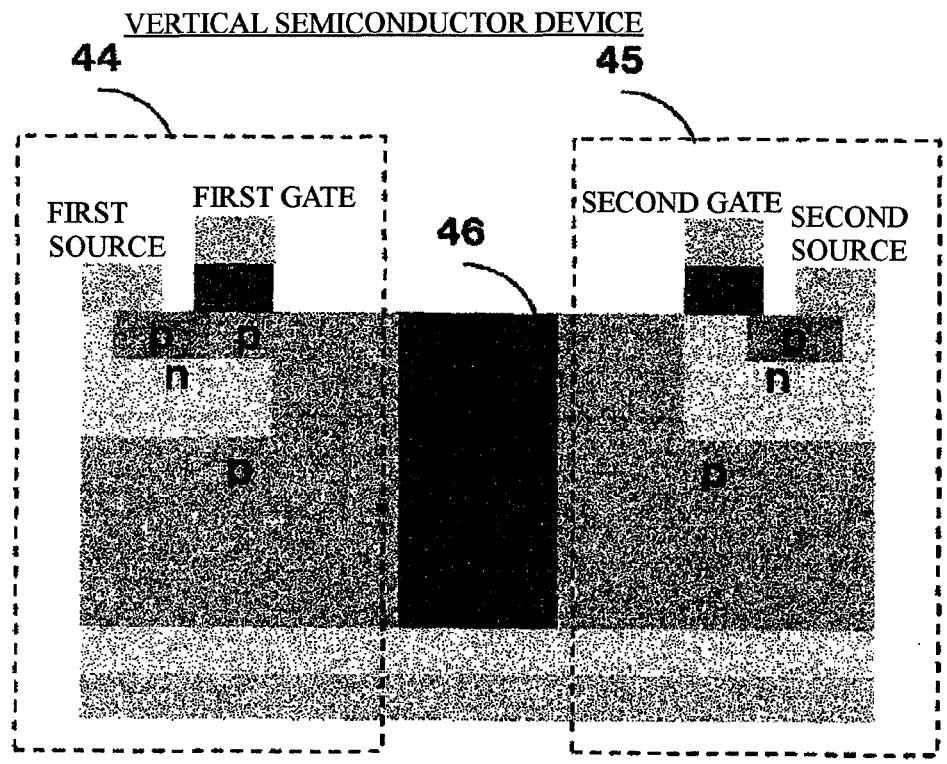
FIG. 43 shows still another specific example of a new four-terminal bidirectional switch.

FIG. 43 shows a semiconductor device of a vertical type configured by a first p-type MOSFET section 44, and a second p-type MOSFET section 45. The first p-type MOSFET section 44 provides a bidirectional current flow when any of the components connected to the semiconductor device is not activated, i.e., a gate power supply, a control power supply, and a gate circuit. The second p-type MOSFET section 45 provides a unidirectional current flow directing only to the second source when any of the components connected to the semiconductor device is not activated, i.e., a gate power supply, a control power supply, and a gate circuit. The first p-type MOSFET section 44 is separated from the second p-type MOSFET section 45 by an insulator 46.

Figure 44:
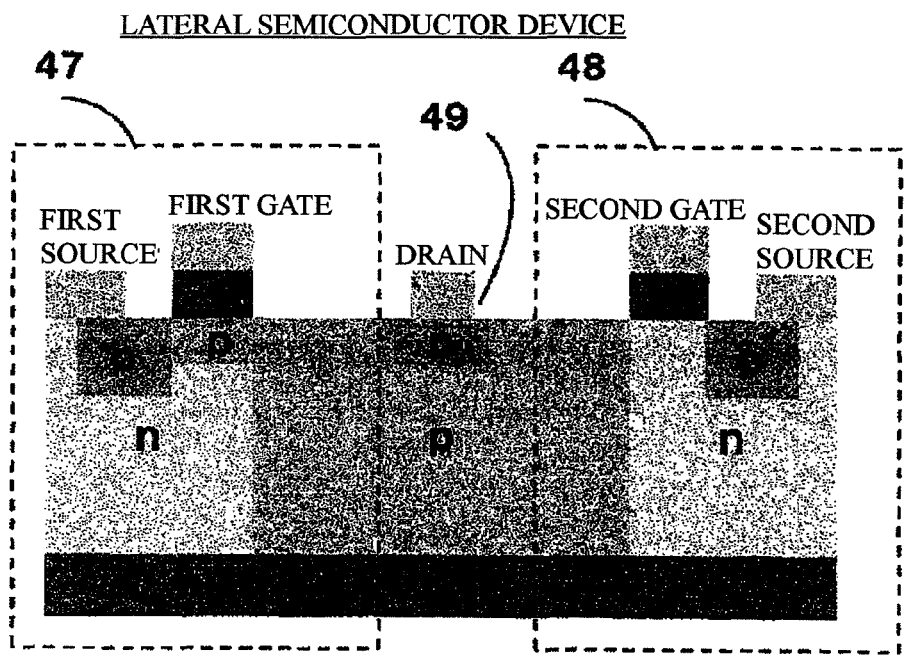
FIG. 44 shows still another specific example of a new five-terminal bidirectional switch.

FIG. 44 shows a semiconductor device of a lateral type configured by a first p-type MOSFET section 47, and a second p-type MOSFET section 48. The first p-type MOSFET section 47 provides a bidirectional current flow when any of the components connected to the semiconductor device is not activated, i.e., a gate power supply, a control power supply, and a gate circuit. The second p-type MOSFET section 48 provides a unidirectional current flow directing only to the second source when any of the components connected to the semiconductor device is not activated, i.e., a gate power supply, a control power supply, and a gate circuit. Between the first and second p-type MOSFET sections 47 and 48, a drain terminal 49 is disposed.

Figure 45:
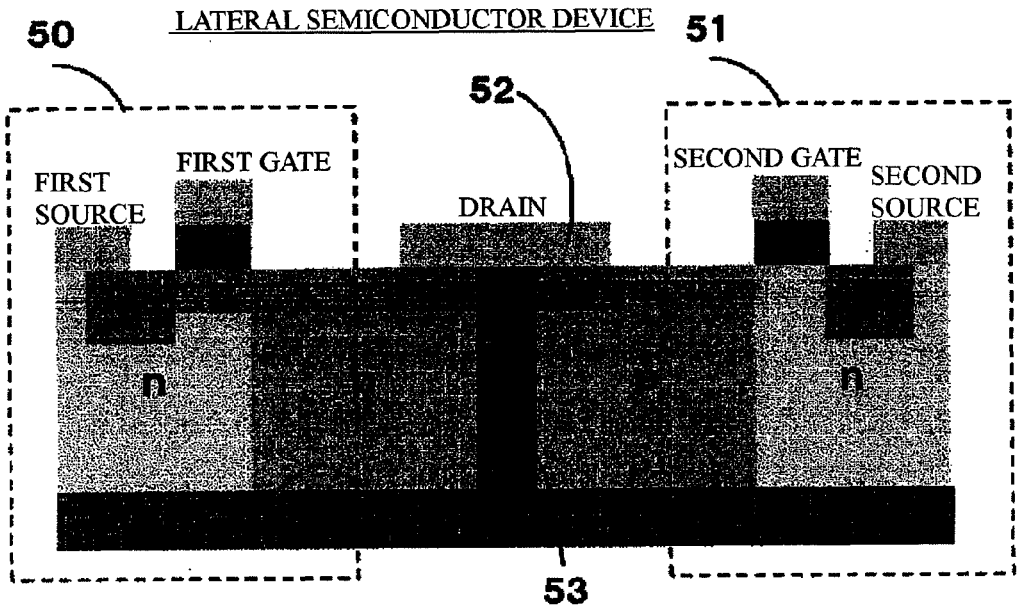
FIG. 45 shows still another specific example of a new five-terminal bidirectional switch.

FIG. 45 shows a semiconductor device of a lateral type configured by a first p-type MOSFET section 50, and a second p-type MOSFET section 51. The first p-type MOSFET section 50 provides a bidirectional current flow when any of the components connected to the semiconductor device is not activated, i.e., a gate power supply, a control power supply, and a gate circuit. The second p-type MOSFET section 51 provides a unidirectional current flow directing only to the second source when any of the components connected to the semiconductor device is not activated, i.e., a gate power supply, a control power supply, and a gate circuit. Between the first and second p-type MOSFET sections 50 and 51, a drain terminal 52 is disposed. Moreover, the first p-type MOSFET section 50 is separated from the second p-type MOSFET section 51 by an insulator 53.

Figure 46:
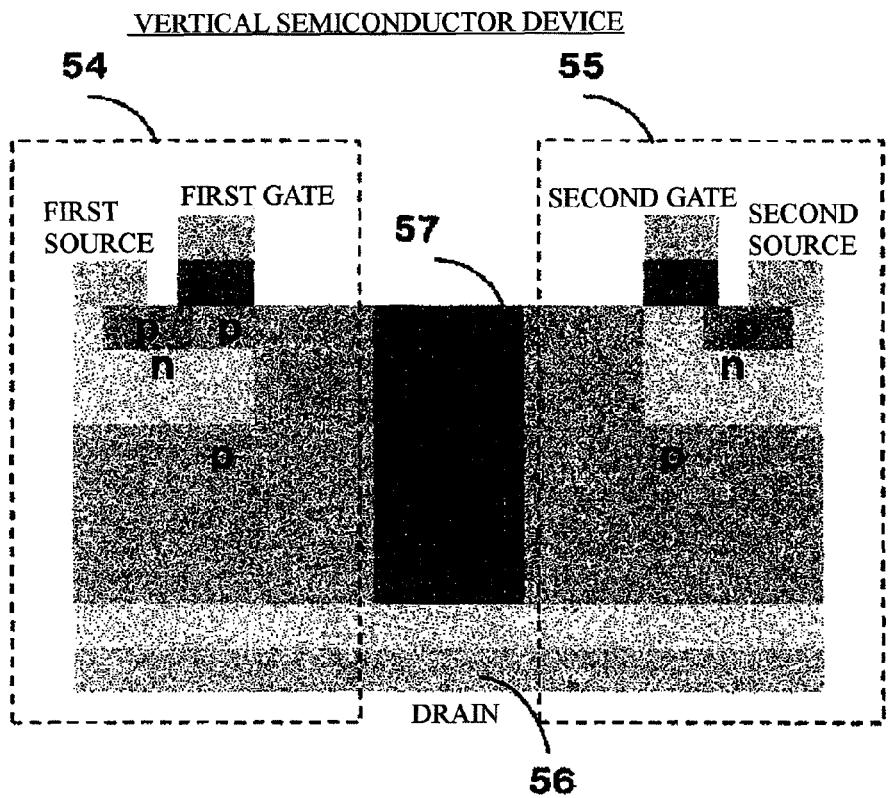
FIG. 46 shows still another specific example of a new five-terminal bidirectional switch.

FIG. 46 shows a semiconductor device of a vertical type configured by a first p-type MOSFET section 54, and a second p-type MOSFET section 55. The first p-type MOSFET section 54 provides a bidirectional current flow when any of the components connected to the semiconductor device is not activated, i.e., a gate power supply, a control power supply, and a gate circuit. The second p-type MOSFET section 55 provides a unidirectional current flow directing only to the second source when any of the components connected to the semiconductor device is not activated, i.e., a gate power supply, a control power supply, and a gate circuit. Between the first and second p-type MOSFET sections 54 and 55, a drain terminal 56 is disposed. Moreover, the first p-type MOSFET section 54 is separated from the second p-type MOSFET section 55 by an insulator 57.

In the semiconductor devices of FIGS. 42 to 46, the first and second p-type MOSFET sections are each provided therein with a parasitic diode, or alternatively, are each externally connected with a diode.

With the semiconductor devices of FIGS. 40 to 46, the first p-type MOSFET section is allowed to close the p-channel through application of a positive voltage to the first gate with respect to the first source, thereby being able to provide a unidirectional current flow only to the first source. Through application of a negative voltage to the second gate with respect to the second source, the second p-type MOSFET section is allowed to open the p-channel, thereby being able to provide a bidirectional current flow.

If voltage application is not performed to both the first and second gates, a current flow is allowed to direct only in unidirectional from the first source to the second source. When a positive voltage is applied to the first gate with respect to the first source to close the p-channel in the first p-type MOSFET section, and when no voltage is applied to the second gate, a current flow is cut off bidirectionally in the semiconductor device. When no voltage is applied to the first gate, and when a negative voltage is applied to the second gate with respect to the second source to open the p-channel in the second p-type MOSFET section, a bidirectional current flow is allowed from the first source to the second source, and from the second source to the first source. When a positive voltage is applied to the first gate with respect to the first source to close the p-channel in the first p-type MOSFET section, and when a negative voltage is applied to the second gate with respect to the second source to open the p-channel in the second p-type MOSFET section, a unidirectional current flow is allowed only from the second source to the first source.

Figure 47:
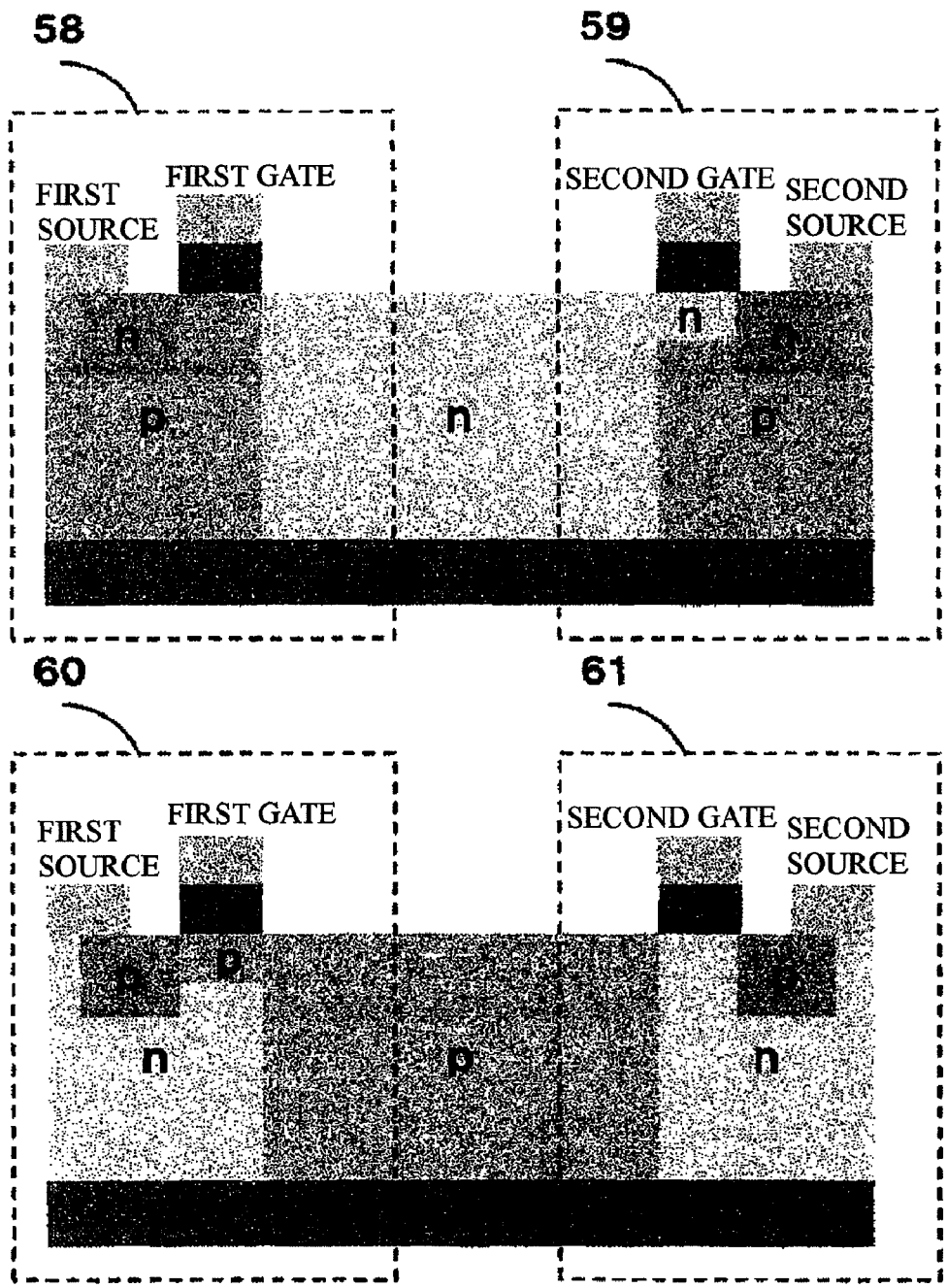
FIG. 47 shows still another specific example of a new four-terminal bidirectional switch.

FIG. 47 shows a lateral-type semiconductor device of the super junction structure, i.e., a combination of two semiconductor devices. One semiconductor device is the one configured by a first n-type MOSFET section 58, and a second n-type MOSFET section 59. The first n-type MOSFET section 58 provides a unidirectional current flow only from the first source when any of the components connected to the semiconductor device is not activated, i.e., a gate power supply, a control power supply, and a gate circuit. The second n-type MOSFET section 59 provides a bidirectional current flow when any of the components connected to the semiconductor device is not activated, i.e., a gate power supply, a control power supply, and a gate circuit. The other semiconductor device is the one configured by a first p-type MOSFET section 60, and a second p-type MOSFET section 61. The first p-type MOSFET section 60 provides a unidirectional current flow only from the first source when any of the components connected to the semiconductor device is not activated, i.e., a gate power supply, a control power supply, and a gate circuit. The second p-type MOSFET section 61 provides a bidirectional current flow when any of the components connected to the semiconductor device is not activated, i.e., a gate power supply, a control power supply, and a gate circuit.

In the semiconductor device of FIG. 47, the first and second n-type MOSFET sections, and the first and second p-type MOSFET sections are each provided therein with a parasitic diode, or alternatively, are each externally connected with a diode.

With the semiconductor device of FIG. 47, the first n-type MOSFET section is allowed to open the n-channel through application of a positive voltage to the first gate with respect to the first source, thereby being able to provide a bidirectional current flow. Through application of a negative voltage to the second gate with respect to the second source, the second p-type MOSFET section is allowed to open the p-channel, thereby being able to provide a bidirectional current flow.

If voltage application is not performed to both the first and second gates, a unidirectional current flow is allowed only from the first source to the second source. When a positive voltage is applied to the first gate with respect to the first source to open the n-channel in the first n-type MOSFET section, and when no voltage is applied to the second gate, a bidirectional current flow is allowed from the first source to the second source, and from the second source to the first source. When no voltage is applied to the first gate, and when a negative voltage is applied to the second gate with respect to the second source to open the p-channel in the second p-type MOSFET section, a bidirectional current flow is allowed from the first source to the second source, and from the second source to the first source. When a positive voltage is applied to the first gate with respect to the first source to open the n-channel in the first n-type MOSFET section and to close the p-channel in the first p-type MOSFET section, and when a negative voltage is applied to the second gate with respect to the second source to close the n-channel in the second n-type MOSFET section and to open the p-channel in the second p-type MOSFET section, a unidirectional current flow is allowed only from the second source to the first source.

Figure 48:
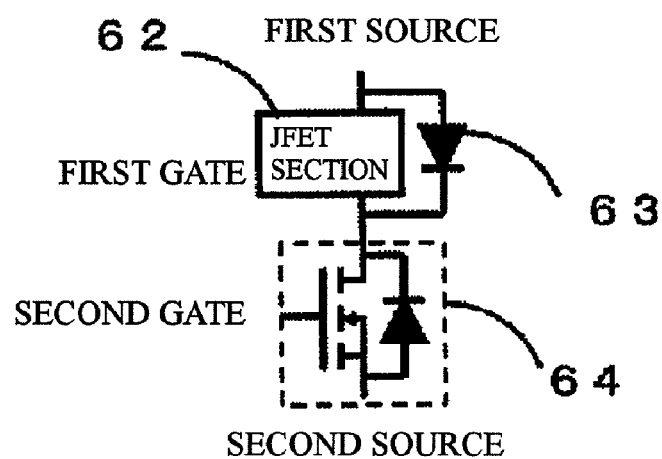
FIG. 48 shows still another specific example of a new four-terminal bidirectional switch.

FIG. 48 shows a semiconductor device configured by a JFET (Junction FET) section 62, a diode section 63, and an n-type MOSFET section 64. The JFET section 62 serves to provide a bidirectional current flow when any of the components connected to the semiconductor device is not activated, i.e., a gate power supply, a control power supply, and a gate circuit. The n-type MOSFET section 64 serves to provide a unidirectional current flow only from the second source when any of the components connected to the semiconductor device is not activated, i.e., a gate power supply, a control power supply, and a gate circuit.

In the semiconductor device of FIG. 48, the JFET section and the n-type MOSFET section are each provided therein with a parasitic diode, or alternatively, are each externally connected with a diode.

Especially when the components, i.e., JFET, MOSFET, and diode, are made of silicon carbide, the performance can be favorably improved.

With the semiconductor device of FIG. 48, the JFET section is allowed to close the n-channel through application of a negative voltage to the first gate with respect to the first source, thereby being able to cut off a bidirectional current flow. Through application of a positive voltage to the second gate with respect to the second source, the n-type MOSFET section is allowed to open the n-channel, thereby being able to provide a bidirectional current flow.

The JFET section of FIG. 48 corresponds to the normally-on device sections of FIGS. 19, 21, and 23, and the diode connected in parallel to the JFET section corresponds to the diodes connected in parallel to the normally-on device sections of FIGS. 19, 21, and 23. The n-type MOSFET section is provided therein with a diode, and the n-type MOSFET section of FIG. 48 corresponds to the components of FIGS. 19, 21, and 23, i.e., the normally-off device sections and the diode sections connected in parallel thereto.

If voltage application is not performed to both the first and second gates, a unidirectional current flow is allowed only from the second source to the first source. When a negative voltage is applied to the first gate with respect to the first source to close the n-channel in the JFET section, and when no voltage is applied to the second gate, a current flow is cut off bidirectionally. When no voltage is applied to the first gate, and when a positive voltage is applied to the second gate with respect to the second source to open the n-channel in the n-type MOSFET section, a bidirectional current flow is allowed from the first source to the second source, and from the second source to the first source. When a negative voltage is applied to the first gate with respect to the first source to close the n-channel in the JFET section, and when a positive voltage is applied to the second gate with respect to the second source to open the n-channel in the n-type MOSFET section, a unidirectional current flow is allowed only from the first source to the second source.

Figure 49:
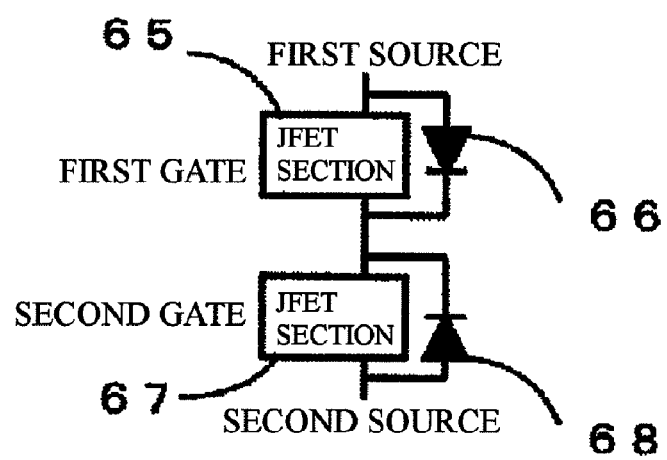
FIG. 49 shows still another specific example of a new four-terminal bidirectional switch.

FIG. 49 shows a semiconductor device configured by a first JFET section 65, a diode section 66, a second JFET section 67, and a diode section 68. The first JFET section 65 serves to provide a bidirectional current flow when any of the components connected to the semiconductor device is not activated, i.e., a gate power supply, a control power supply, and a gate circuit. The second JFET section 67 serves to provide a unidirectional current flow only from the second source when any of the components connected to the semiconductor device is not activated, i.e., a gate power supply, a control power supply, and a gate circuit.

The first JFET section of FIG. 49 corresponds to the normally-on device sections of FIGS. 19, 21, and 23, and the diode connected in parallel to the first JFET section corresponds to the diodes connected in parallel to the normally-on device sections of FIGS. 19, 21, and 23. The second JFET section corresponds to the normally-off device sections of FIGS. 19, 21, and 23, and the diode connected in parallel to the second JFET section corresponds to the diode sections connected in parallel to the normally-off device sections of FIGS. 19, 21, and 23.

In the semiconductor device of FIG. 49, the first and second JFET sections are each provided therein with a parasitic diode, or alternatively, are each externally connected with a diode.

Especially when the components, i.e., JFET, and diode, are made of silicon carbide, the performance can be favorably improved.

With the semiconductor device of FIG. 49, the first JFET section is allowed to close the n-channel through application of a negative voltage to the first gate with respect to the first source, thereby being able to cut off a current flow bidirectionally. Through application of a positive voltage to the second gate with respect to the second source, the second JFET section is allowed to open the n-channel, thereby being able to provide a bidirectional current flow.

If voltage application is not performed to both the first and second gates, a unidirectional current flow is allowed only from the second source to the first source. When a negative voltage is applied to the first gate with respect to the first source to close the n-channel in the first JFET section, and when no voltage is applied to the second gate, a current flow is cut off bidirectionally. When no voltage is applied to the first gate, and when a positive voltage is applied to the second gate with respect to the second source to open the n-channel in the second JFET section, a bidirectional current flow is allowed from the first source to the second source, and from the second source to the first source. When a negative voltage is applied to the first gate with respect to the first source to close the n-channel in the first JFET section, and when a positive voltage is applied to the second gate with respect to the second source to open the n-channel in the second JFET section, a unidirectional current flow is allowed only from the first source to the second source.

Figure 50:
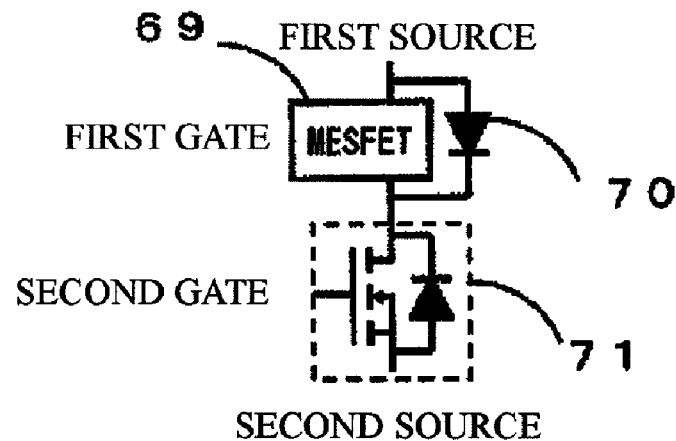
FIG. 50 shows still another specific example of a new four-terminal bidirectional switch.

FIG. 50 shows a semiconductor device configured by a MESFET (Metal Semiconductor FET) section 69, a diode section 70, and an n-type MOSFET section 71. The MESFET section 69 provides a bidirectional current flow when any of the components connected to the semiconductor device is not activated, i.e., a gate power supply, a control power supply, and a gate circuit. The n-type MOSFET section 71 provides a unidirectional current flow only from the second source when any of the components connected to the semiconductor device is not activated, i.e., a gate power supply, a control power supply, and a gate circuit.

The MESFET section of FIG. 50 corresponds to the normally-on device sections of FIGS. 19, 21, and 23, and the diode section connected in parallel to the MESFET section corresponds to the components of FIGS. 19, 21, and 23, i.e., the diode sections connected in parallel to the normally-on device sections. The n-type MOSFET section is provided therein with a diode, and the n-type MOSFET section of FIG. 50 corresponds to the components of FIGS. 19, 21, and 23, i.e., the normally-on device sections and the diode sections connected in parallel thereto.

In the semiconductor device of FIG. 50, the MESFET section and the n-type MOSFET section are each provided therein with a parasitic diode, or alternatively, are each externally connected with a diode.

Especially when the component, i.e., MESFET, diode, or MOSFET, is made of gallium nitride, the performance can be favorably improved.

With the semiconductor device of FIG. 50, the MESFET section is allowed to close the n-channel through application of a negative voltage to the first gate with respect to the first source, thereby cutting off a current flow bidirectionally. Through application of a positive voltage to the second gate with respect to the second source, the n-type MOSFET section is allowed to open the n-channel, thereby being able to provide a bidirectional current flow.

If voltage application is not performed to both the first and second gates, a unidirectional current flow is allowed only from the second source to the first source. When a negative voltage is applied to the first gate with respect to the first source to close the n-channel in the MESFET section, and when no voltage is applied to the second gate, a current flow is cut off bidirectionally. When no voltage is applied to the first gate, and when a positive voltage is applied to the second gate with respect to the second source to open the n-channel in the n-type MOSFET section, a bidirectional current flow is allowed from the first source to the second source, and from the second source to the first source. When a negative voltage is applied to the first gate with respect to the first source to close the n-channel in the MESFET section, and when a positive voltage is applied to the second gate with respect to the second source to open the n-channel in the n-type MOSFET section, a unidirectional current flow is allowed only from the first source to the second source.

Figure 51:
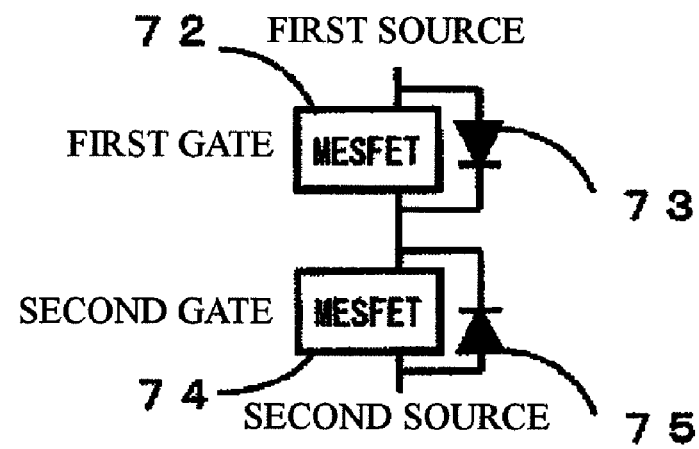
FIG. 51 shows still another specific example of a new four-terminal bidirectional switch.

FIG. 51 shows a semiconductor device configured by a first MESFET section 72, a diode section 73, a second MESFET section 74, and a diode section 75. The first MESFET section 72 serves to provide a bidirectional current flow when any of the components connected to the semiconductor device is not activated, i.e., a gate power supply, a control power supply, and a gate circuit. The second MESFET section 74 provides a unidirectional current flow only from the second source when any of the components connected to the semiconductor device is not activated, i.e., a gate power supply, a control power supply, and a gate circuit.

The first MESFET section of FIG. 51 corresponds to the normally-on device sections of FIGS. 19, 21, and 23, and the diode connected in parallel to the first MESFET section corresponds to the diodes connected in parallel to the normally-on device sections of FIGS. 19, 21, and 23. The second MESFET section corresponds to the normally-off device sections of FIGS. 19, 21, and 23, and the diode section connected in parallel to the second MESFET section corresponds to the diode sections connected in parallel to the normally-off device sections of FIGS. 19, 21, and 23.

In the semiconductor device of FIG. 51, the first and second MESFET sections are each provided therein with a parasitic diode, or alternatively, are each externally connected with a diode.

Especially when the components, i.e., MESFET, and diode, are made of gallium nitride, the performance can be favorably improved.

With the semiconductor device of FIG. 51, the first MESFET section is allowed to close the n-channel through application of a negative voltage to the first gate with respect to the first source, thereby cutting off a current flow bidirectionally. Through application of a positive voltage to the second gate with respect to the second source, the second MESFET section is allowed to open the n channel, thereby being able to provide a bidirectional current flow.

If voltage application is not performed to both the first and second gates, a unidirectional current flow is allowed only from the second source to the first source. When a negative voltage is applied to the first gate with respect to the first source to close the n-channel in the MESFET section, and when no voltage is applied to the second gate, a current flow is cut off bidirectionally. When no voltage is applied to the first gate, and when a positive voltage is applied to the second gate with respect to the second source to open the n-channel in the second MESFET section, a bidirectional current flow is allowed from the first source to the second source, and from the second source to the first source. When a negative voltage is applied to the first gate with respect to the first source to close the n-channel in the first MESFET section, and when a positive voltage is applied to the second gate with respect to the second source to open the n-channel in the second MESFET section, a unidirectional current flow is allowed only from the first source to the second source.

Figure 52:
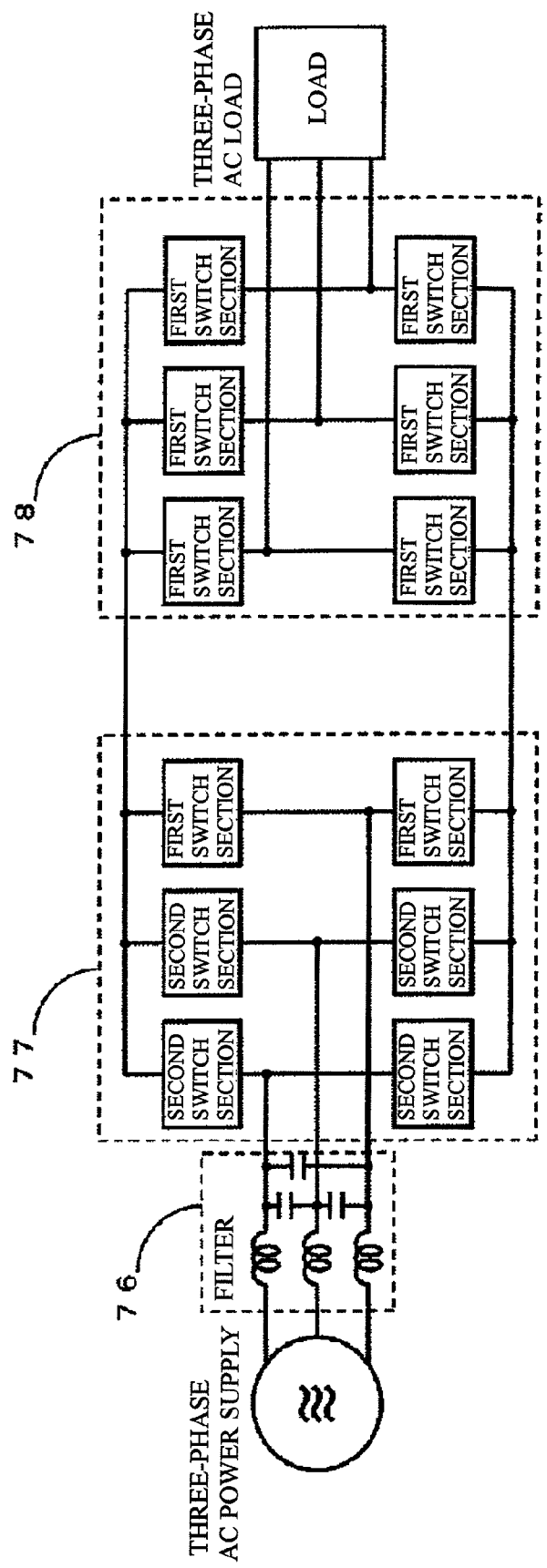
FIG. 52 shows still another power conversion apparatus in which a diode clamping circuit is not required for direct conversion from a three-phase AC power supply to a three-phase AC load.

Second Embodiment of Apparatus for Power Conversion from AC Power Supply to AC Load FIG. 52 shows a power conversion apparatus of the invention that drives a three-phase AC load from a three-phase AC power supply. The side of the three-phase AC power supply is connected with a filter 76, which is configured by an inductor and a capacitor. In a three-phase full-bridge circuit 77 on the side of the three-phase AC power supply, second switch sections provided in two legs are each a bidirectional switch that cuts off a current flow when any of components connected thereto, i.e., semiconductor device, is not activated, i.e., a gate power supply, a control power supply, and a gate circuit. Note here that the leg denotes a circuit constituting an AC phase in the power conversion apparatus, or a circuit inserted in parallel thereinto. The bidirectional switches of FIGS. 8 to 13 are each a specific example thereof, and any of or a combination of these bidirectional switches is used. In the three-phase full-bridge circuit 77 on the side of the three-phase AC power supply, first switch sections provided in one leg are each a bidirectional switch that provides only a specific unidirectional current flow when any of the components connected thereto, i.e., semiconductor device, is not activated, i.e., a gate power supply, a control power supply, and a gate circuit. This is applicable also to first switch sections provided in every leg in a three-phase full-bridge circuit 78 on the side of the three-phase AC load. Such bidirectional switches are each any of or a combination of the bidirectional switches of FIGS. 16 to 18. With such a configuration, the resulting power conversion apparatus does not require a DC link capacitor and a diode clamping circuit.

Figure 13:
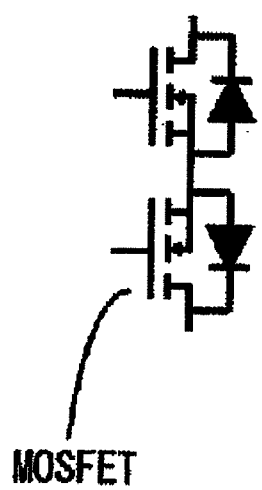
FIG. 13 shows still another conventional bidirectional switch configured by MOSFETs and diodes.
Figure 14:
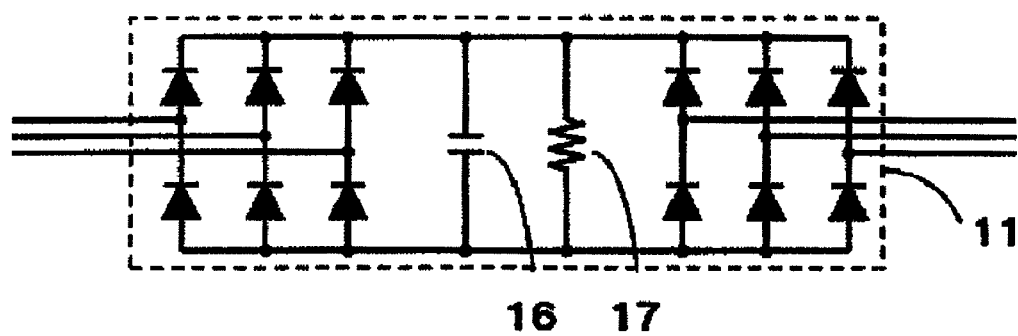
FIG. 14 shows a diode clamping circuit for use in a power conversion apparatus for direct conversion from a three-phase AC power supply to a three-phase AC load.
Figure 15:
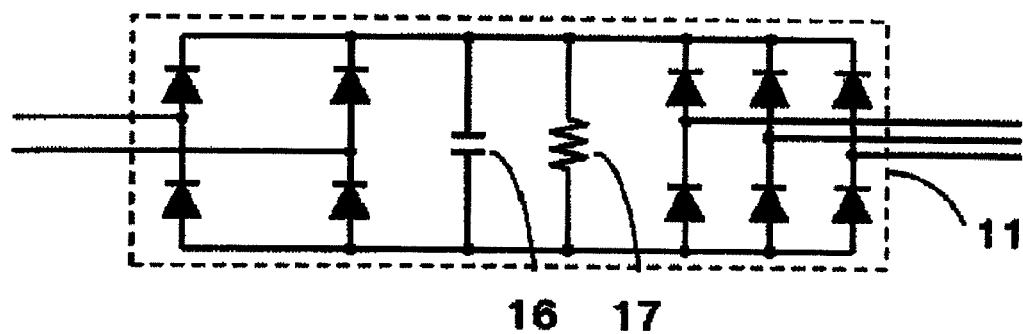
FIG. 15 shows a diode clamping circuit for use in a power conversion apparatus for direct conversion from a single-phase AC power supply to a three-phase AC load.
Figure 53:
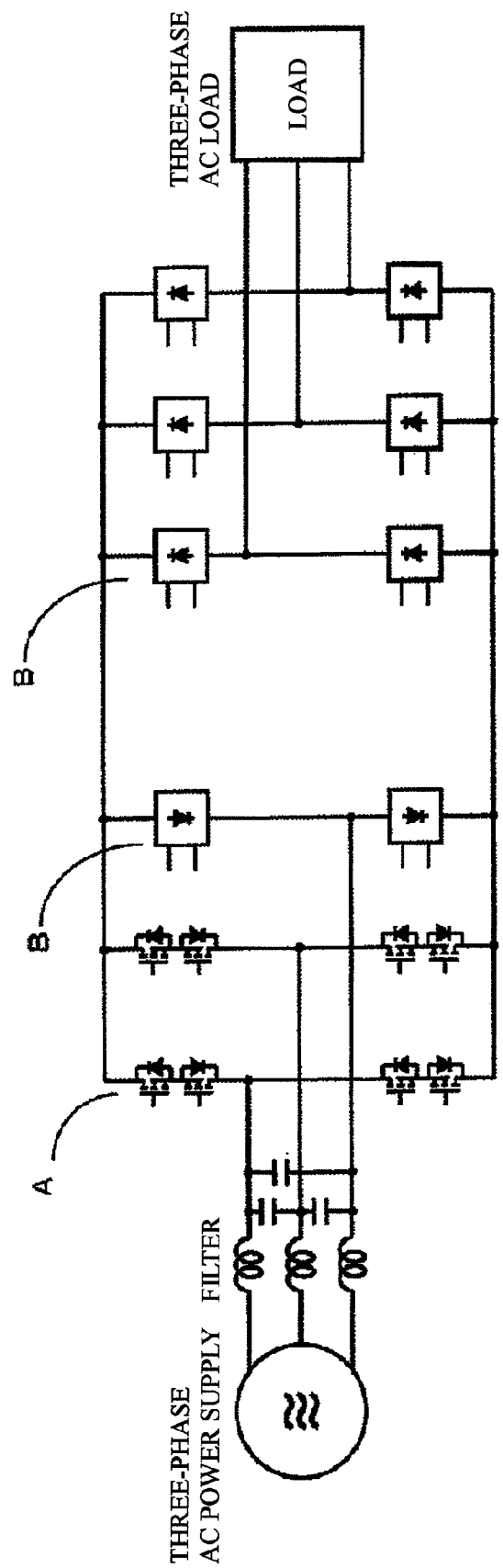
FIG. 53 shows still another power conversion apparatus in which a diode clamping circuit is not required for direct conversion from a three-phase AC power supply to a three-phase AC load.

FIG. 53 shows a power conversion apparatus similar to that of FIG. 52 but the switch sections provided in the two legs in the three-phase full-bridge circuit on the side of the three-phase AC power supply are each a semiconductor device A using the MOSFET of FIG. 13. The switch sections provided in one leg in the three-phase full-bridge circuit on the side of the three-phase AC power supply, and the switch sections provided in every leg in the three-phase full-bridge circuit on the side of the three-phase AC load are each a semiconductor device B. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, thereby not requiring a DC link capacitor and a diode clamping circuit. The semiconductor device here is the one providing regenerative power and circulating power only in one specific way from the three-phase AC load when any of the components connected thereto is not activated, i.e., a gate power supply, a control power supply, and a gate circuit, or when the three-phase AC power supply suffers from sudden failures, when a momentary (short-time) power failure occurs, and when a momentary voltage drop occurs, or when the motor is with hard braking or is operated under light load, and providing a current flow only in one specific way when any of the components connected thereto is not activated, i.e., a gate power supply, a control power supply, and a gate circuit.

Figure 12:
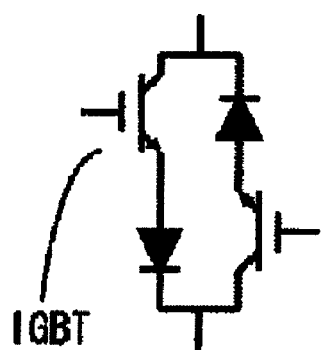
FIG. 12 shows still another conventional bidirectional switch also configured by IGBTs and diodes.
Figure 54:
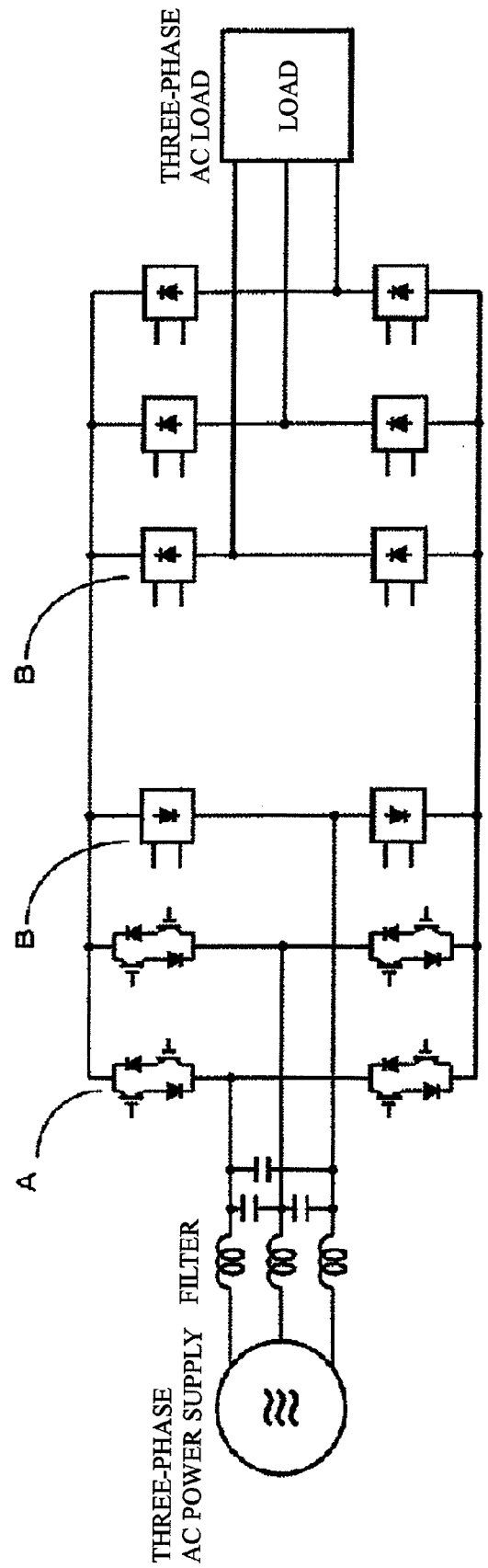
FIG. 54 shows still another power conversion apparatus in which a diode clamping circuit is not required for direct conversion from a three-phase AC power supply to a three-phase AC load.

FIG. 54 shows a power conversion apparatus similar to that of FIG. 52 but the switch sections provided in the two legs in the three-phase full-bridge circuit on the side of the three-phase AC power supply are each a semiconductor device A using the IGBT of FIG. 12. The switch sections provided in one leg in the three-phase full-bridge circuit on the side of the three-phase AC power supply, and the switch sections provided in every leg in the three-phase full-bridge circuit on the side of the three-phase AC load are each a semiconductor device B. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, thereby not requiring a DC link capacitor and a diode clamping circuit. The semiconductor device here is the one providing regenerative power and circulating power only in one specific way from the three-phase AC load when any of the components connected thereto is not activated, i.e., a gate power supply, a control power supply, and a gate circuit, or when the three-phase AC power supply suffers from sudden failures, when a momentary (short-time) power failure occurs, and when a momentary voltage drop occurs, or when the motor is with hard braking or is operated under light load, and providing a current flow only in one specific way when any of the components connected thereto is not activated, i.e., a gate power supply, a control power supply, and a gate circuit.

Figure 55:
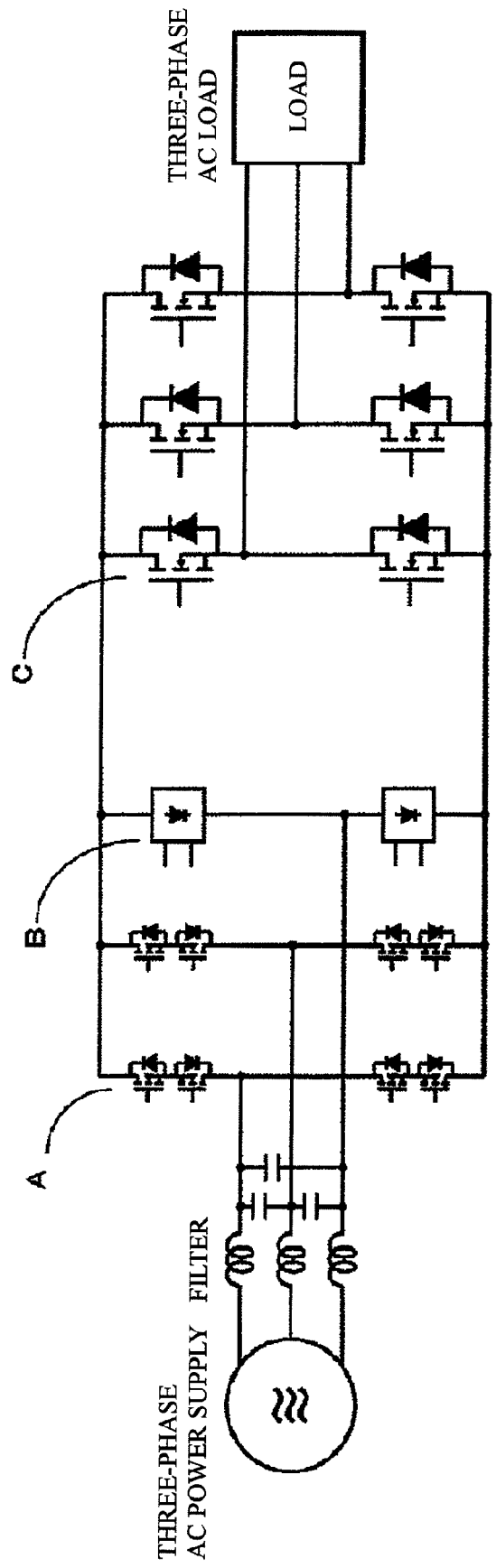
FIG. 55 shows still another power conversion apparatus in which a diode clamping circuit is not required for direct conversion from a three-phase AC power supply to a three-phase AC load.
Figure 56:
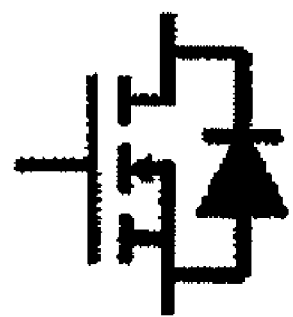
FIG. 56 shows a MOSFET and a diode connected thereto in reverse parallel.

FIG. 55 shows a power conversion apparatus similar to that of FIG. 52 but the switch sections provided in the two legs in the three-phase full-bridge circuit on the side of the three-phase AC power supply are each a semiconductor device A using the MOSFET of FIG. 13. The switch sections provided in one leg in the three-phase full-bridge circuit on the side of the three-phase AC power supply are each a semiconductor device B. The switch sections provided in every leg in the three-phase full-bridge circuit on the side of the three-phase AC load are each a switch C configured by a MOSFET and a diode of FIG. 56. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, thereby not requiring a DC link capacitor and a diode clamping circuit. The semiconductor device here is the one providing regenerative power and circulating power only in one specific way from the three-phase AC load when any of the components connected thereto is not activated, i.e., a gate power supply, a control power supply, and a gate circuit, or when the three-phase AC power supply suffers from sudden failures, when a momentary (short-time) power failure occurs, and when a momentary voltage drop occurs, or when the motor is with hard braking or is operated under light load, and providing a current flow only in one specific way when any of the components connected thereto is not activated, i.e., a gate power supply, a control power supply, and a gate circuit.

Figure 57:
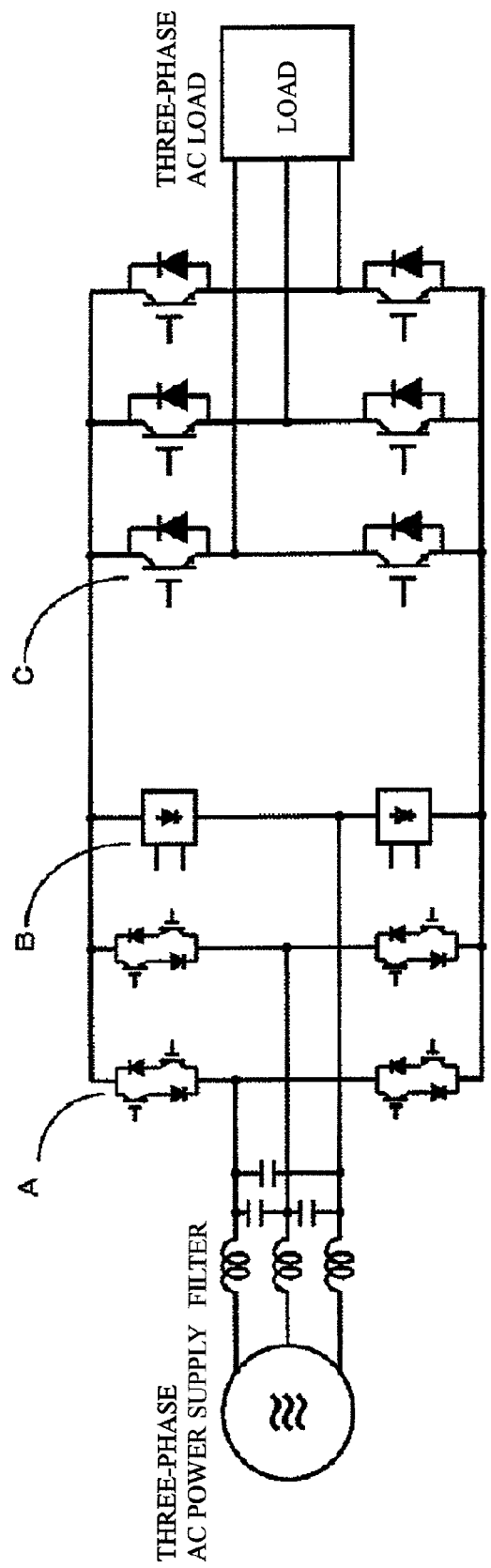
FIG. 57 shows still another power conversion apparatus in which a diode clamping circuit is not required for direct conversion from a three-phase AC power supply to a three-phase AC load.
Figure 58:
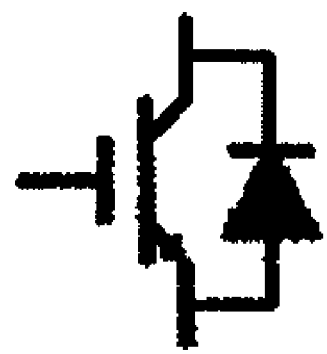
FIG. 58 shows an IGBT and a diode connected thereto in reverse parallel.

FIG. 57 shows a power conversion apparatus similar to that of FIG. 52 but the switch sections provided in the two legs in the three-phase full-bridge circuit on the side of the three-phase AC power supply are each a semiconductor device A using the IGBT of FIG. 12. The switch sections provided in one leg in the three-phase full-bridge circuit on the side of the three-phase AC power supply are each a semiconductor device B. The switch sections provided in every leg in the three-phase full-bridge circuit on the side of the three-phase AC load are each a switch C configured by an IGBT and a diode of FIG. 58. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, thereby not requiring a DC link capacitor and a diode clamping circuit. The semiconductor device here is the one providing regenerative power and circulating power only in one specific way from the three-phase AC load when any of the components connected thereto is not activated, i.e., a gate power supply, a control power supply, and a gate circuit, when the three-phase AC power supply suffers from sudden failures, when a momentary (short-time) power failure occurs, and when a momentary voltage drop occurs, or when the motor is with hard braking or is operated under light load, and providing a current flow only in one specific way when any of the components connected thereto is not activated, i.e., a gate power supply, a control power supply, and a gate circuit.

Figure 59:
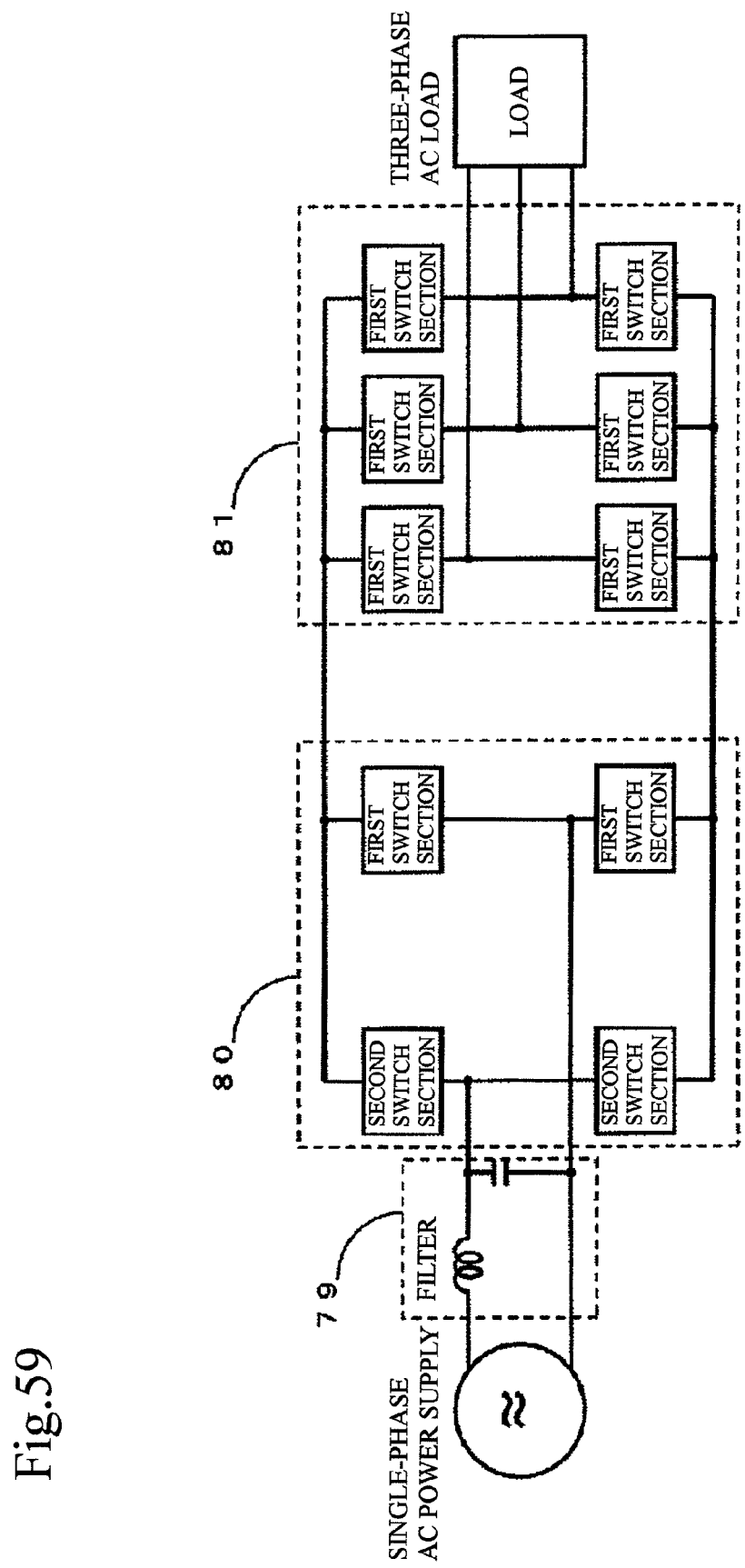
FIG. 59 shows still another power conversion apparatus in which a diode clamping circuit is not required for direct conversion from a single-phase AC power supply to a three-phase AC load.

Third Embodiment of Apparatus for Power
Conversion from AC Power Supply to AC Load FIG. 59 shows a power conversion apparatus of the invention that drives a three-phase AC load from a single-phase AC power supply. The side of the single-phase AC power supply is connected with a filter 79, which is configured by an inductor and a capacitor. In a single-phase full-bridge circuit 80 on the side of the single-phase AC power supply of FIG. 59, second switch sections provided in one leg are each a bidirectional switch that cuts off a current flow when any of components connected thereto, i.e., semiconductor device, is not activated, i.e., a gate power supply, a control power supply, and a gate circuit. The bidirectional switches are each any of or a combination of the conventional bidirectional switches of FIGS. 8 to 13. In the single-phase full-bridge circuit 80 on the side of the single-phase AC power supply, first switch sections provided in one leg are each a bidirectional switch that provides only a specific unidirectional current flow when any of the components connected thereto, i.e., semiconductor device, is not activated, i.e., a gate power supply, a control power supply, and a gate circuit. This is applicable also to first switch sections provided in every leg in a three-phase full-bridge circuit 81 on the side of the three-phase AC load. Such bidirectional switches are each any of or a combination of the bidirectional switches of FIGS. 16 to 18. With such a configuration, the resulting power conversion apparatus does not require a DC link capacitor and a diode clamping circuit.

Figure 60:
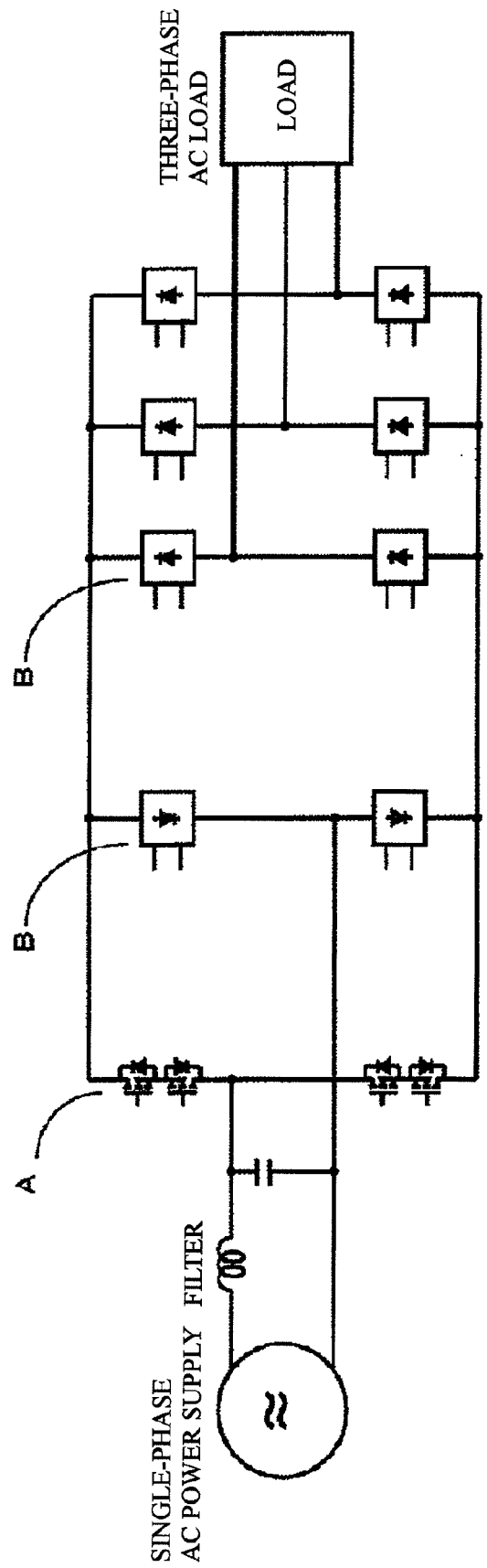
FIG. 60 shows still another power conversion apparatus in which a diode clamping circuit is not required for direct conversion from a single-phase AC power supply to a three-phase AC load.

FIG. 60 shows a power conversion apparatus similar to that of FIG. 59 but the switch sections provided in one leg in the single-phase full-bridge circuit on the side of the single-phase AC power supply are each a semiconductor device A using the MOSFET of FIG. 13. The switch sections provided in one leg in the single-phase full-bridge circuit on the side of the single-phase AC power supply, and the switch sections provided in every leg in the three-phase full-bridge circuit on the side of the three-phase AC load are each a semiconductor device B. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, thereby not requiring a DC link capacitor and a diode clamping circuit. The semiconductor device here is the one providing regenerative power and circulating power only in one specific way from the three-phase AC load when any of the components connected thereto is not activated, i.e., a gate power supply, a control power supply, and a gate circuit, or when the single-phase AC power supply suffers from sudden failures, when a momentary (short-time) power failure occurs, and when a momentary voltage drop occurs, or when the motor is with hard braking or is operated under light load, and providing a current flow only in one specific way when any of the components connected thereto is not activated, i.e., a gate power supply, a control power supply, and a gate circuit.

Figure 61:
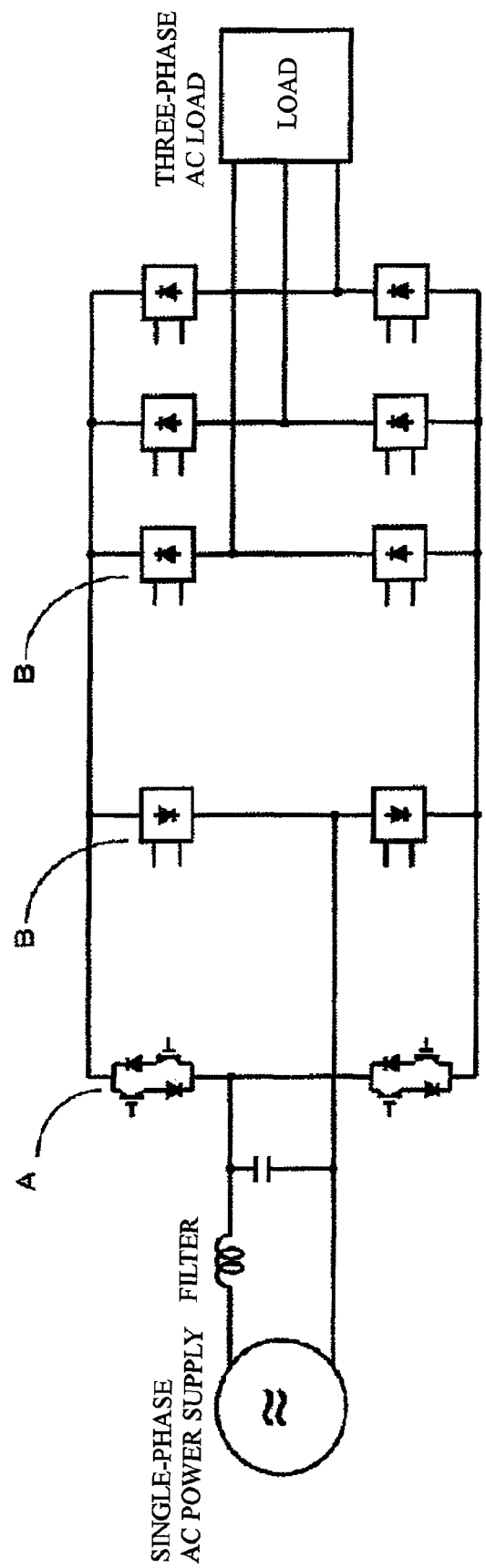
FIG. 61 shows still another power conversion apparatus in which a diode clamping circuit is not required for direct conversion from a single-phase AC power supply to a three-phase AC load.

FIG. 61 shows a power conversion apparatus similar to that of FIG. 59 but the switch sections provided in one leg in the single-phase full-bridge circuit on the side of the single-phase AC power supply are each a semiconductor device A using the IGBT of FIG. 12. The switch sections provided in one leg in the single-phase full-bridge circuit on the side of the single-phase AC power supply, and the switch sections provided in every leg in the three-phase full-bridge circuit on the side of the three-phase AC load are each a semiconductor device B. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, thereby not requiring a DC link capacitor and a diode clamping circuit. The semiconductor device here is the one providing regenerative power and circulating power only in one specific way from the three-phase AC load when any of the components connected thereto is not activated, i.e., a gate power supply, a control power supply, and a gate circuit, or when the single-phase AC power supply suffers from sudden failures, when a momentary (short-time) power failure occurs, and when a momentary voltage drop occurs, or when the motor is with hard braking or is operated under light load, and providing a current flow only in one specific way when any of the components connected thereto is not activated, i.e., a gate power supply, a control power supply, and a gate circuit.

Figure 62:
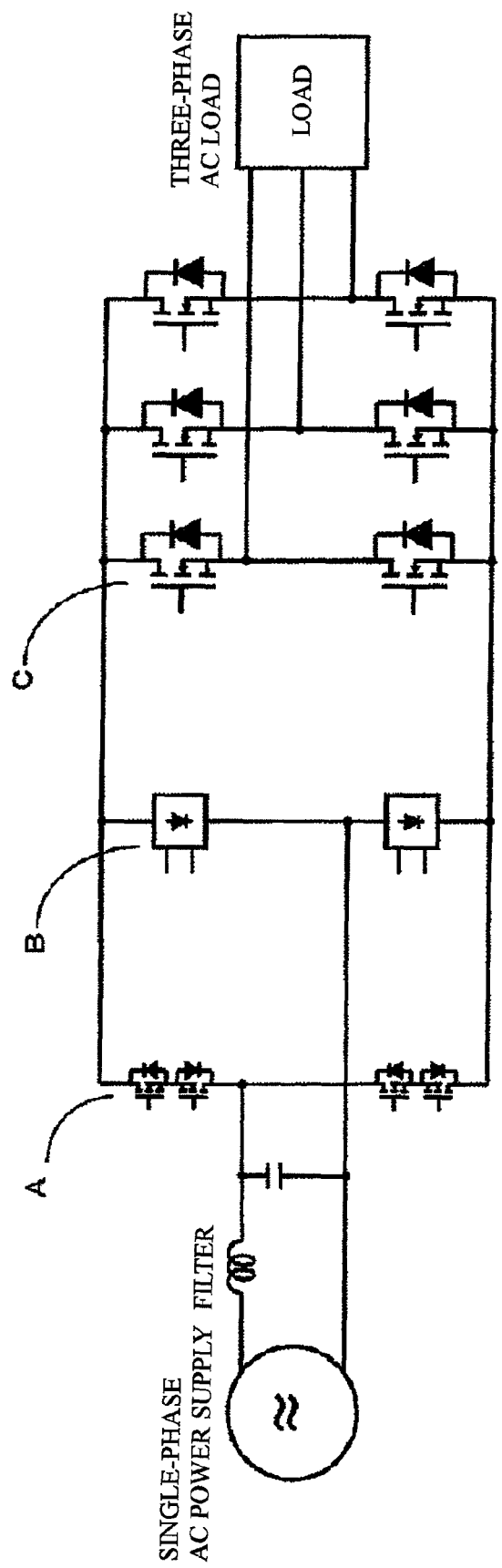
FIG. 62 shows still another power conversion apparatus in which a diode clamping circuit is not required for direct conversion from a single-phase AC power supply to a three-phase AC load.

FIG. 62 shows a power conversion apparatus similar to that of FIG. 59 but the switch sections provided in one leg in the single-phase full-bridge circuit on the side of the single-phase AC power supply are each a semiconductor device A using the MOSFET of FIG. 13. The switch sections provided in one leg in the single-phase full-bridge circuit on the side of the single-phase AC power supply are each a semiconductor device B. The switch sections provided in every leg in the three-phase full-bridge circuit on the side of the three-phase AC load are each a switch C configured by the MOSFET and the diode of FIG. 56. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, thereby not requiring a DC link capacitor and a diode clamping circuit. The semiconductor device here is the one providing regenerative power and circulating power only in one specific way from the three-phase AC load when any of the components connected thereto is not activated, i.e., a gate power supply, a control power supply, and a gate circuit, or when the single-phase AC power supply suffers from sudden failures, when a momentary (short-time) power failure occurs, and when a momentary voltage drop occurs, or when the motor is with hard braking or is operated under light load, and providing only a current flow only in one specific way when any of the components connected thereto is not activated, i.e., a gate power supply, a control power supply, and a gate circuit.

Figure 63:
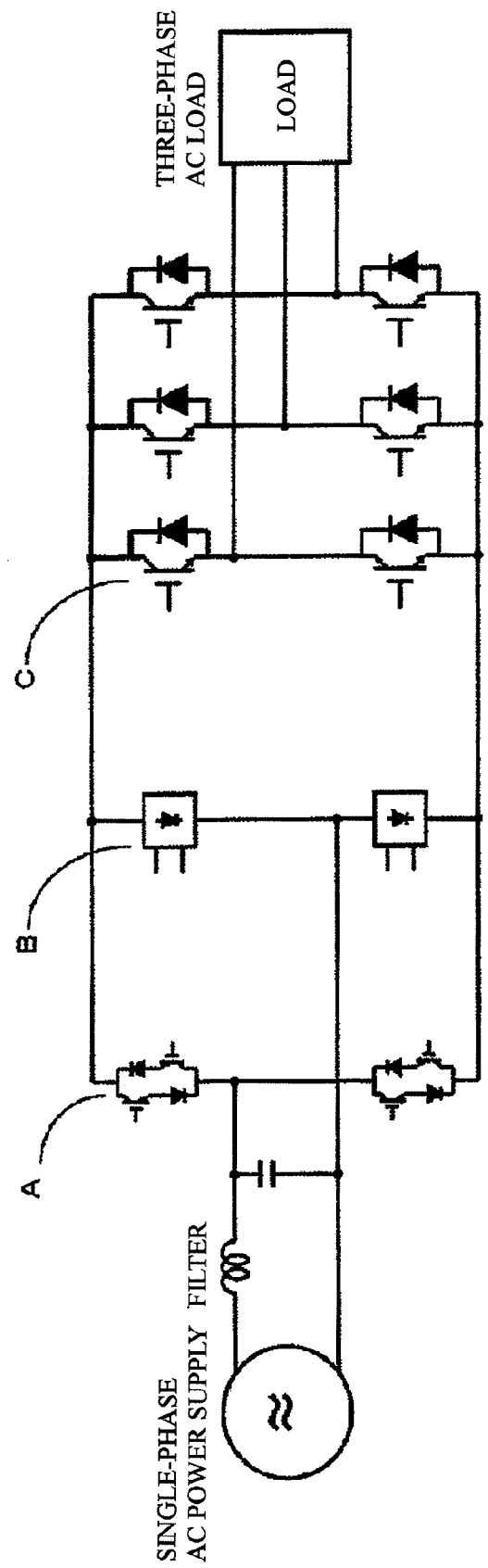
FIG. 63 shows still another power conversion apparatus in which a diode clamping circuit is not required for direct conversion from a single-phase AC power supply to a three-phase AC load.

FIG. 63 shows a power conversion apparatus similar to that of FIG. 59 but the switch sections provided in the two legs in the single-phase full-bridge circuit on the side of the single-phase AC power supply are each a semiconductor device A using the IGBT of FIG. 12. The switch sections provided in one leg in the single-phase full-bridge circuit on the side of the single-phase AC power supply are each a semiconductor device B. The switch sections provided in every leg in the three-phase full-bridge circuit on the side of the three-phase AC load are each a switch C configured by the IGBT and the diode of FIG. 58. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, thereby not requiring a DC link capacitor and a diode clamping circuit. The semiconductor device here is the one providing regenerative power and circulating power only in one specific way from the three-phase AC load when any of the components connected thereto is not activated, i.e., a gate power supply, a control power supply, and a gate circuit, or when the three-phase AC power supply suffers from sudden failures, when a momentary (short-time) power failure occurs, and when a momentary voltage drop occurs, or when the motor is with hard braking or is operated under light load, and providing only a current flow only in one specific way when any of the components connected thereto is not activated, i.e., a gate power supply, a control power supply, and a gate circuit.

Figure 64:
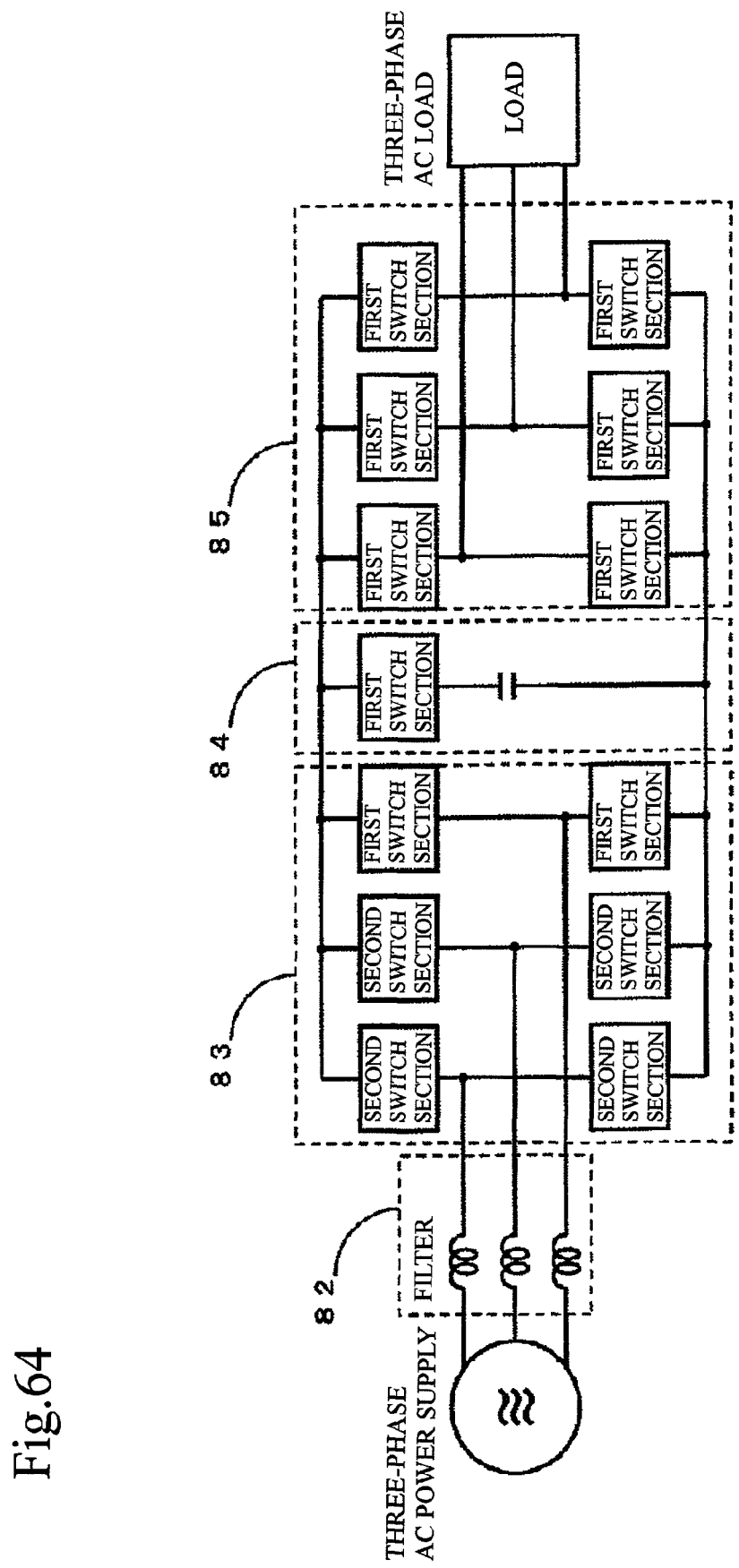
FIG. 64 shows still another power conversion apparatus in which a diode clamping circuit is not required for direct conversion from a three-phase AC power supply to a three-phase AC load.

Fourth Embodiment of Apparatus for Power Conversion from AC Power Supply to AC Load FIG. 64 shows a power conversion apparatus of the invention that drives a three-phase AC load from a three-phase AC power supply. The side of the three-phase AC power supply is connected with a filter 82, which is configured by an inductor. A three-phase full-bridge circuit 83 on the power-supply side is connected with a three-phase full-bridge circuit 85 on the load side via a leg 84 configured by first switch sections and a capacitor. The capacitor here is extremely small in capacity compared with a conventional one because it is not for the conventional use, i.e., storage of power, but for absorbing any surge voltage to be generated at the time of switching of semiconductor device. In the three-phase full-bridge circuit 83 on the side of the three-phase AC power supply, second switch sections provided in one leg are each a bidirectional switch that cuts off a current flow when any of components connected thereto, i.e., semiconductor device, is not activated, i.e., a gate power supply, a control power supply, and a gate circuit. The bidirectional switches are each any of or a combination of the conventional bidirectional switches of FIGS. 8 to 13. In the three-phase full-bridge circuit 83 on the side of the three-phase AC power supply, first switch sections provided in one leg are each a bidirectional switch that provides only a specific unidirectional current flow when any of the components connected thereto, i.e., semiconductor device, is not activated, i.e., a gate power supply, a control power supply, and a gate circuit. This is applicable also to first switch sections provided in every leg in a three-phase full-bridge circuit 85 on the side of the three-phase AC load, and to first switch sections provided in the leg 84 between the two three-phase full-bridge circuits. Such bidirectional switches are each any of or a combination of the bidirectional switches of FIGS. 16 to 18. With such a configuration, the resulting power conversion apparatus does not require a DC link capacitor and a diode clamping circuit for storage of power as they have been conventionally used.

Figure 65:
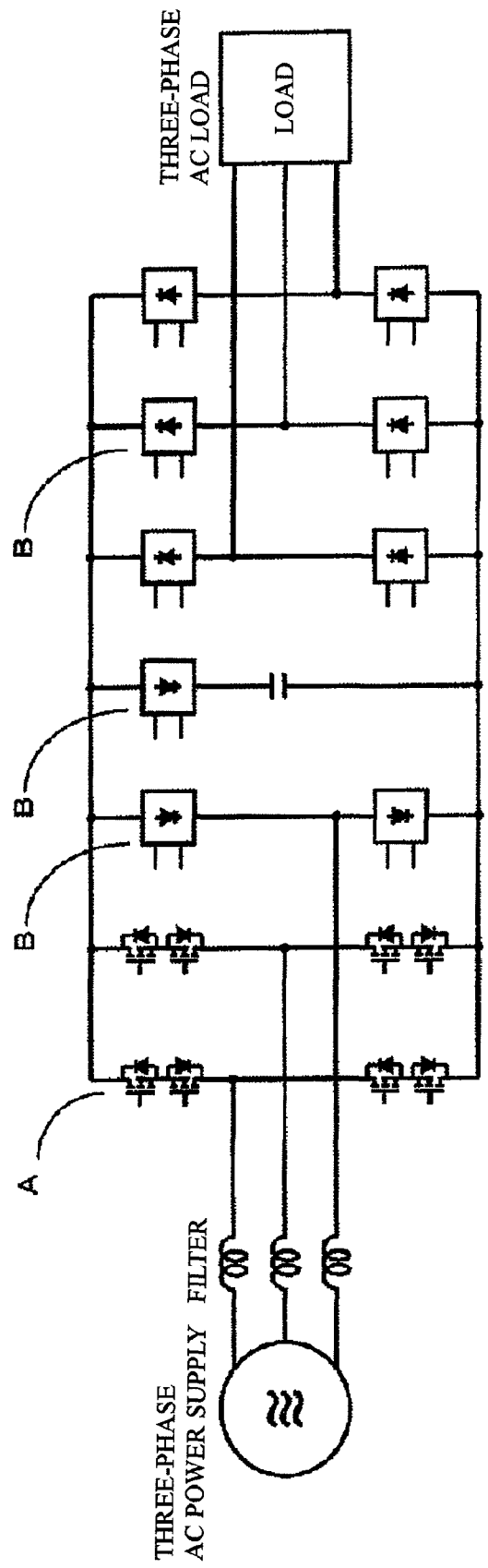
FIG. 65 shows still another power conversion apparatus in which a diode clamping circuit is not required for direct conversion from a three-phase AC power supply to a three-phase AC load.

FIG. 65 shows a power conversion apparatus similar to that of FIG. 64 but the switch sections provided in the two legs in the three-phase full-bridge circuit on the side of the three-phase AC power supply are each a semiconductor device A using the MOSFET of FIG. 13. The switch sections provided in one leg in the three-phase full-bridge circuit on the side of the three-phase AC power supply, the switch sections provided in every leg in the three-phase full-bridge circuit on the side of the three-phase AC load and the switch sections disposed between the two three-phase full-bridge circuits are each a semiconductor device B. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, and prevent any short circuit of a capacitor by the switch thereof cutting off a current flow, thereby not requiring a DC link capacitor and a diode clamping circuit for storage of power as they have been conventionally used. The semiconductor device here is the one providing regenerative power and circulating power only in one specific way from the three-phase AC load when any of the components connected thereto is not activated, i.e., a gate power supply, a control power supply, and a gate circuit, or when the three-phase AC power supply suffers from sudden failures, when a momentary (short-time) power failure occurs, and when a momentary voltage drop occurs, or when the motor is with hard braking or is operated under light load, and providing a current flow only in one specific way when any of the components connected thereto is not activated, i.e., a gate power supply, a control power supply, and a gate circuit.

Figure 66:
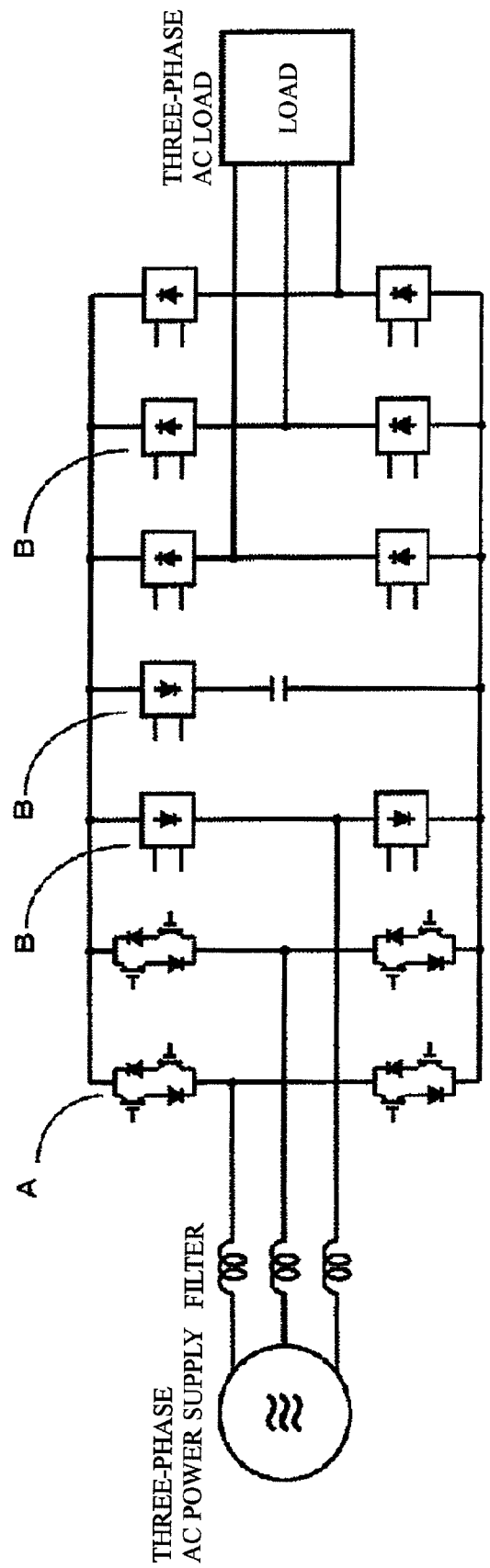
FIG. 66 shows still another power conversion apparatus in which a diode clamping circuit is not required for direct conversion from a three-phase AC power supply to a three-phase AC load.

FIG. 66 shows a power conversion apparatus similar to that of FIG. 64 but the switch sections provided in the two legs in the three-phase full-bridge circuit on the side of the three-phase AC power supply are each a semiconductor device A using the IGBT of FIG. 12. The switch sections provided in one leg in the three-phase full-bridge circuit on the side of the three-phase AC power supply, the switch sections provided in every leg in the three-phase full-bridge circuit on the side of the three-phase AC load, and the switch sections disposed between the two three-phase full-bridge circuits are each a semiconductor device B. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, and prevent any short circuit of a capacitor by the switch thereof cutting off a current flow, thereby not requiring a DC link capacitor and a diode clamping circuit for storage of power as they have been conventionally used. The semiconductor device here is the one providing regenerative power and circulating power only in one specific way from the three-phase AC load when any of the components connected thereto is not activated, i.e., a gate power supply, a control power supply, and a gate circuit, or when the three-phase AC power supply suffers from sudden failures, when a momentary (short-time) power failure occurs, and when a momentary voltage drop occurs, or when the motor is with hard braking or is operated under light load, and providing a current flow only in one specific way when any of the components connected thereto is not activated, i.e., a gate power supply, a control power supply, and a gate circuit.

Figure 67:
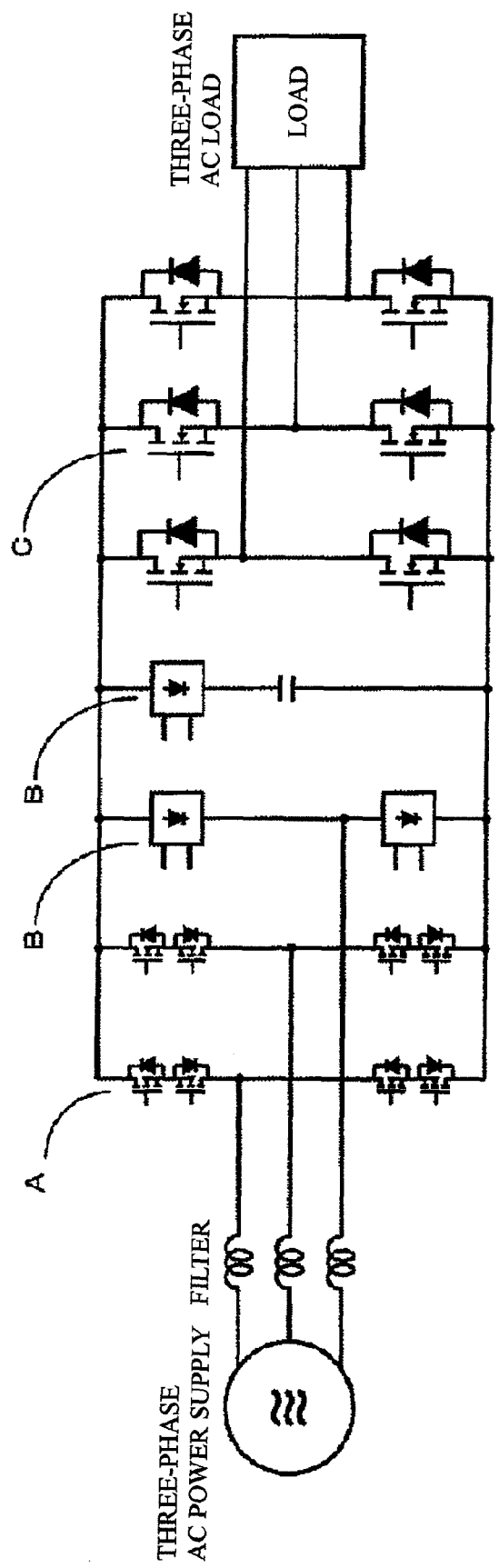
FIG. 67 shows still another power conversion apparatus in which a diode clamping circuit is not required for direct conversion from a three-phase AC power supply to a three-phase AC load.

FIG. 67 shows a power conversion apparatus similar to that of FIG. 64 but the switch sections provided in the two legs in the three-phase full-bridge circuit on the side of the three-phase AC power supply are each a semiconductor device A using the MOSFET of FIG. 13. The switch sections provided in one leg in the three-phase full-bridge circuit on the side of the three-phase AC power supply are each a semiconductor device B. The switch sections provided in every leg in the three-phase full-bridge circuit on the side of the three-phase AC load are each a switch C configured by the MOSFET and the diode of FIG. 56. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, and prevent any short circuit of a capacitor by the switch thereof cutting off a current flow, thereby not requiring a DC link capacitor and a diode clamping circuit for storage of power as they have been conventionally used. The semiconductor device here is the one providing regenerative power and circulating power only in one specific way from the three-phase AC load when any of the components connected thereto is not activated, i.e., a gate power supply, a control power supply, and a gate circuit, or when the three-phase AC power supply suffers from sudden failures, when a momentary (short-time) power failure occurs, and when a momentary voltage drop occurs, or when the motor is with hard braking or is operated under light load, and providing only a current flow only in one specific way when any of the components connected thereto is not activated, i.e., a gate power supply, a control power supply, and a gate circuit.

Figure 68:
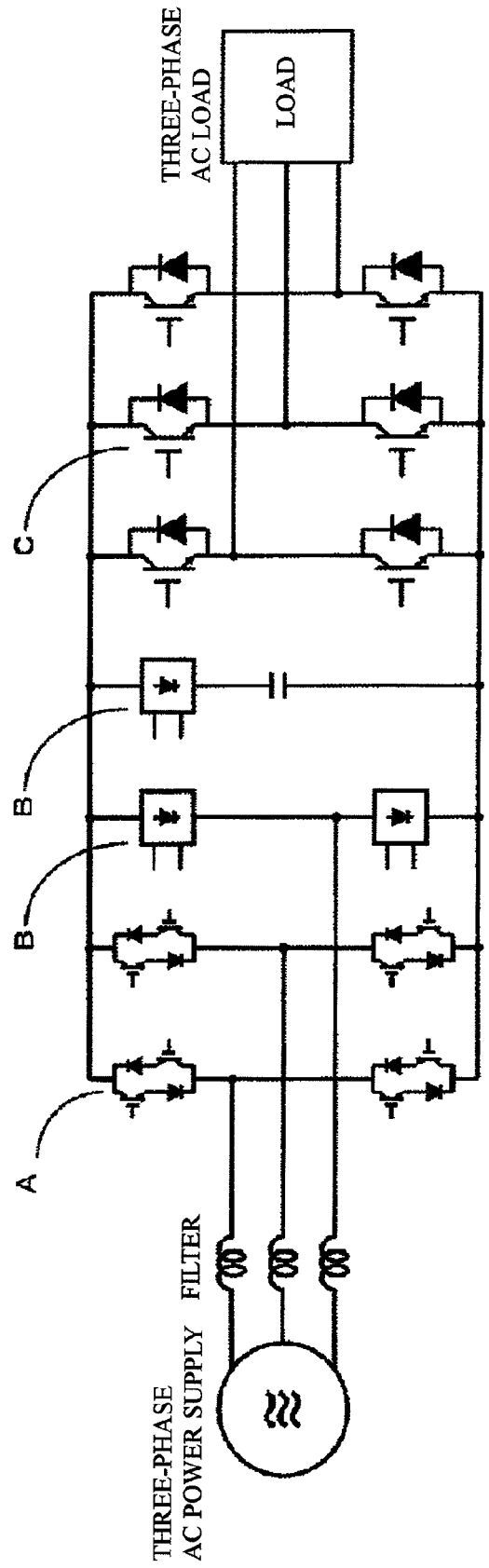
FIG. 68 shows still another power conversion apparatus in which a diode clamping circuit is not required for direct conversion from a three-phase AC power supply to a three-phase AC load.

FIG. 68 shows a power conversion apparatus similar to that of FIG. 64 but the switch sections provided in the two legs in the three-phase full-bridge circuit on the side of the three-phase AC power supply are each a semiconductor device A using the IGBT of FIG. 12. The switch sections provided in one leg in the three-phase full-bridge circuit on the side of the three-phase AC power supply are each a semiconductor device B. The switch sections provided in every leg in the three-phase full-bridge circuit on the side of the three-phase AC load are each a switch C configured by the IGBT and the diode of FIG. 58. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, and prevent any short circuit of a capacitor by the switch thereof cutting off a current flow, thereby not requiring a DC link capacitor and a diode clamping circuit for storage of power as they have been conventionally used. The semiconductor device here is the one providing regenerative power and circulating power only in one specific way from the three-phase AC load when any of the components connected thereto is not activated, i.e., a gate power supply, a control power supply, and a gate circuit, or when the three-phase AC power supply suffers from sudden failures, when a momentary (short-time) power failure occurs, and when a momentary voltage drop occurs, or when the motor is with hard braking or is operated under light load, and providing only a current flow only in one specific way when any of the components connected thereto is not activated, i.e., a gate power supply, a control power supply, and a gate circuit.

Figure 69:
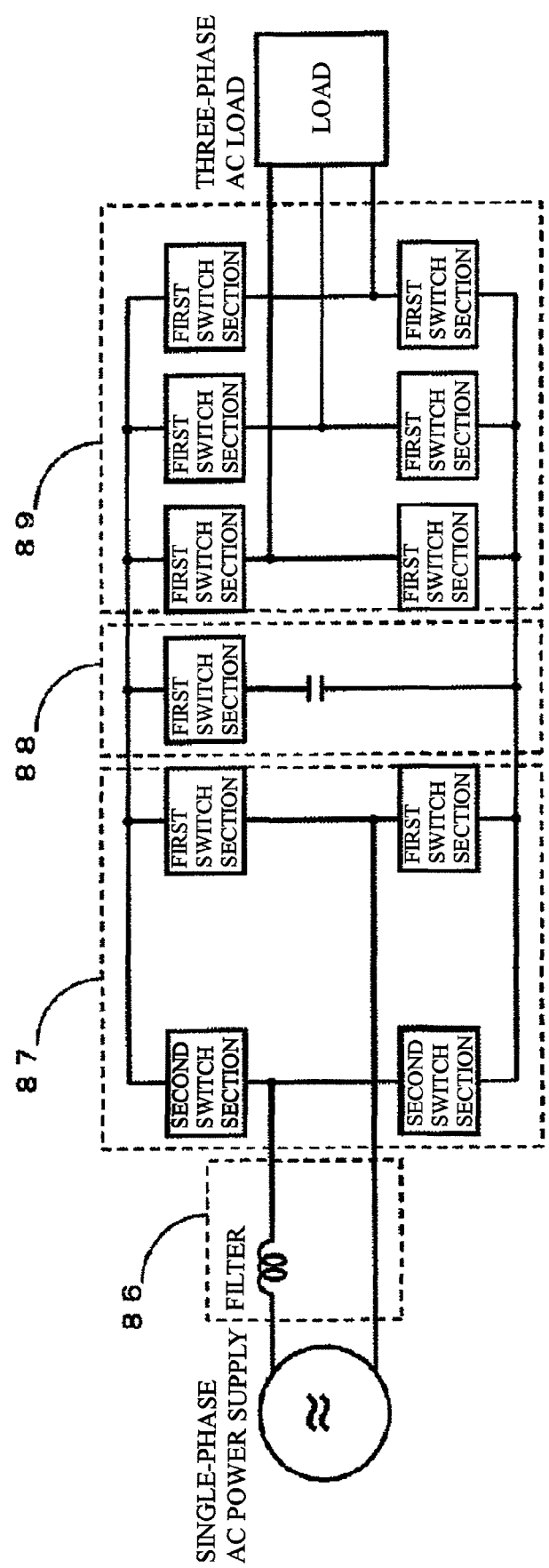
FIG. 69 shows still another power conversion apparatus in which a diode clamping circuit is not required for direct conversion from a single-phase AC power supply to a three-phase AC load.

Fifth Embodiment of Apparatus for Power Conversion from AC Power Supply to AC Load FIG. 69 shows a power conversion apparatus of the invention that drives a three-phase AC load from a single-phase AC power supply. The side of the single-phase AC power supply is connected with a filter 86, which is configured by an inductor. A single-phase full-bridge circuit 87 on the power-supply side is connected with a three-phase full-bridge circuit 89 on the load side via a leg 88 configured by first switch sections and a capacitor. The capacitor here is extremely small in capacity compared with a conventional one because it is not for the conventional use, i.e., storage of power, but for absorbing any surge voltage to be generated at the time of switching of semiconductor device. In a single-phase full-bridge circuit 87 on the side of the single-phase AC power supply, second switch sections provided in one leg are each a bidirectional switch that cuts off a current flow when any of components connected thereto, i.e., semiconductor device, is not activated, i.e., a gate power supply, a control power supply, and a gate circuit. The bidirectional switches are each any of or a combination of the conventional bidirectional switches of FIGS. 8 to 13. In the single-phase full-bridge circuit 87 on the side of the single-phase AC power supply, first switch sections provided in one leg are each a bidirectional switch that provides only a specific unidirectional current flow when any of the components connected thereto, i.e., semiconductor device, is not activated, i.e., a gate power supply, a control power supply, and a gate circuit. This is applicable also to first switch sections provided in every leg in the three-phase full-bridge circuit 89 on the side of the three-phase AC load, and to first switch sections provided in the leg 88 between the single-phase full-bridge circuit and the three-phase full-bridge circuit. Such bidirectional switches are each any of or a combination of the bidirectional switches of FIGS. 16 to 18. With such a configuration, the resulting power conversion apparatus does not require a DC link capacitor and a diode clamping circuit for storage of power as they have been conventionally used.

Figure 70:
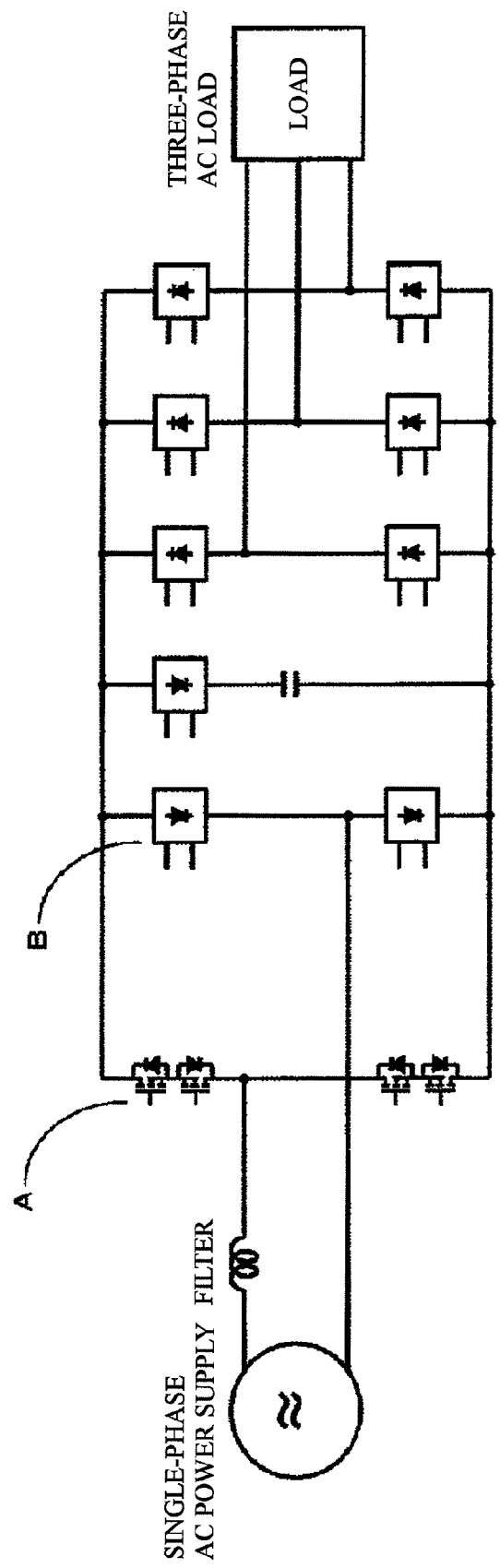
FIG. 70 shows still another power conversion apparatus in which a diode clamping circuit is not required for direct conversion from a single-phase AC power supply to a three-phase AC load.

FIG. 70 shows a power conversion apparatus similar to that of FIG. 69 but the switch sections provided in one leg in the single-phase full-bridge circuit on the side of the single-phase AC power supply are each a semiconductor device A using the MOSFET of FIG. 13. The switch sections provided in one leg in the single-phase full-bridge circuit on the side of the single-phase AC power supply, the switch sections provided in every leg in the three-phase full-bridge circuit on the side of the three-phase AC load, and the switch sections disposed between the single-phase full-bridge circuit and the three-phase full-bridge circuit are each a semiconductor device B. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, and prevent any short circuit of a capacitor by the switch thereof cutting off a current flow, thereby not requiring a DC link capacitor and a diode clamping circuit for storage of power as they have been conventionally used. The semiconductor device here is the one providing regenerative power and circulating power only in one specific way from the three-phase AC load when any of the components connected thereto is not activated, i.e., a gate power supply, a control power supply, and a gate circuit, or when the single-phase AC power supply suffers from sudden failures, when a momentary (short-time) power failure occurs, and when a momentary voltage drop occurs, or when the motor is with hard braking or is operated under light load, and providing a current flow only in one specific way when any of the components connected thereto is not activated, i.e., a gate power supply, a control power supply, and a gate circuit.

Figure 71:
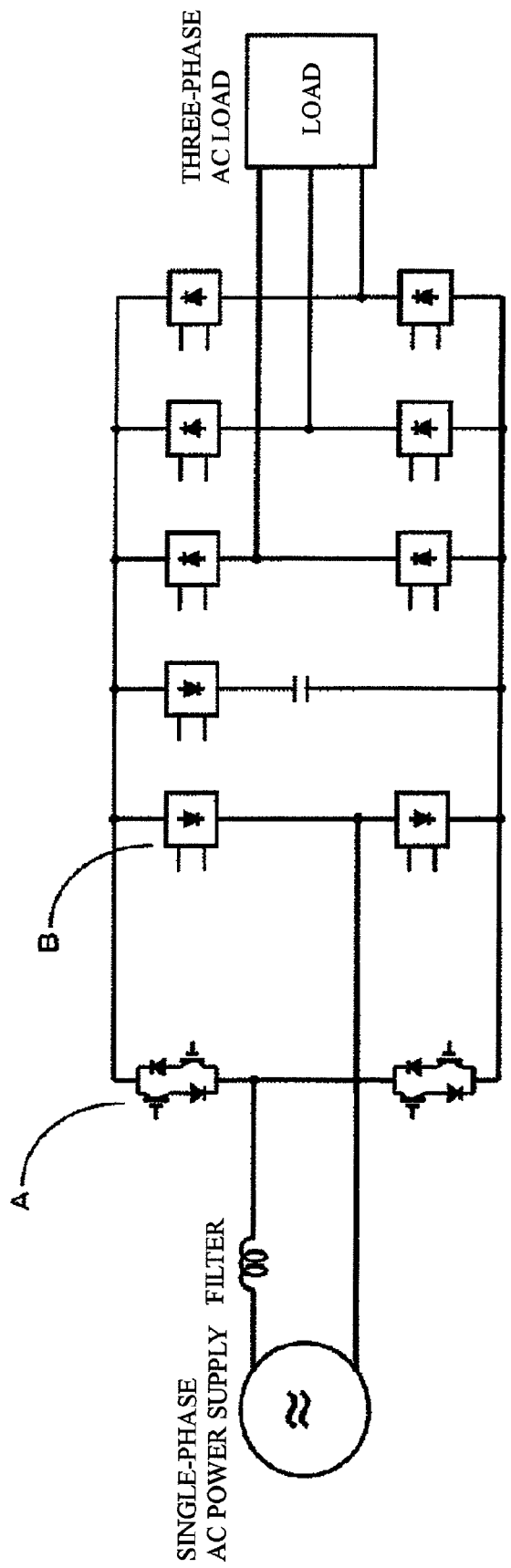
FIG. 71 shows still another power conversion apparatus in which a diode clamping circuit is not required for direct conversion from a single-phase AC power supply to a three-phase AC load.

FIG. 71 shows a power conversion apparatus similar to that of FIG. 69 but the switch sections provided in one leg in the single-phase full-bridge circuit on the side of the single-phase AC power supply are each a semiconductor device A using the IGBT of FIG. 12. The switch sections provided in one leg in the single-phase full-bridge circuit on the side of the single-phase AC power supply, the switch sections provided in every leg in the three-phase full-bridge circuit on the side of the three-phase AC load, and the switch sections disposed between the single-phase full-bridge circuit and the three-phase full-bridge circuit are each a semiconductor device B. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, and prevent any short circuit of a capacitor by the switch thereof cutting off a current flow, thereby not requiring a DC link capacitor and a diode clamping circuit for storage of power as they have been conventionally used. The semiconductor device here is the one providing regenerative power and circulating power only in one specific way from the three-phase AC load when any of the components connected thereto is not activated, i.e., a gate power supply, a control power supply, and a gate circuit, or when the single-phase AC power supply suffers from sudden failures, when a momentary (short-time) power failure occurs, and when a momentary voltage drop occurs, or when the motor is with hard braking or is operated under light load, and providing a current flow only in one specific way when any of the components connected thereto is not activated, i.e., a gate power supply, a control power supply, and a gate circuit.

Figure 72:
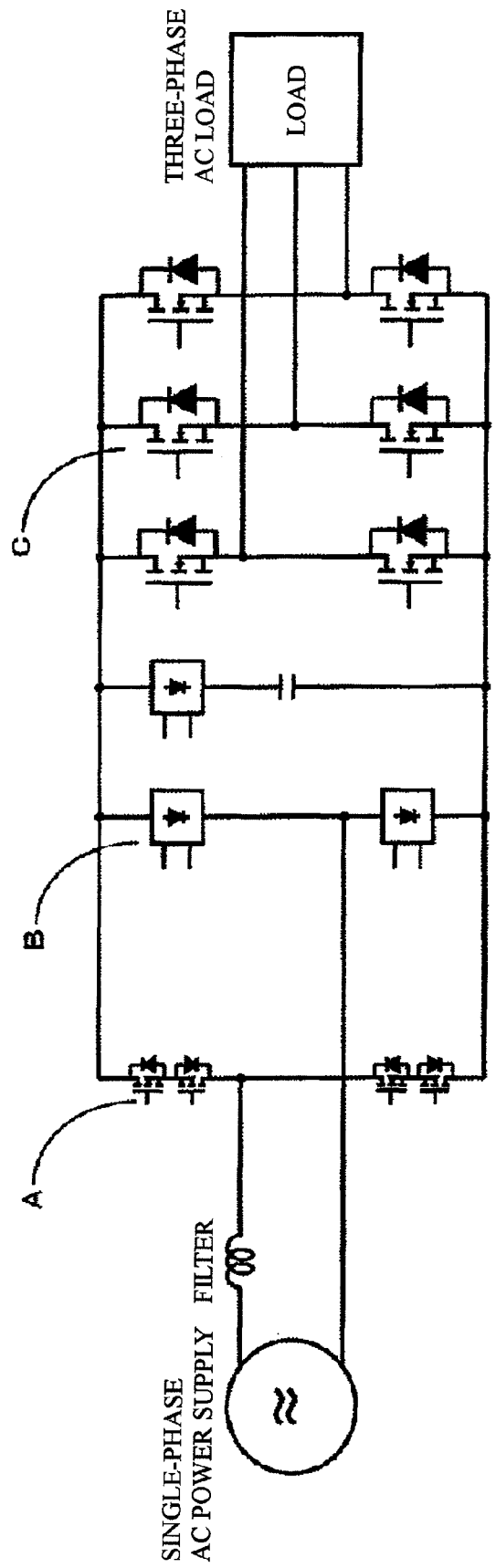
FIG. 72 shows still another power conversion apparatus in which a diode clamping circuit is not required for direct conversion from a single-phase AC power supply to a three-phase AC load.

FIG. 72 shows a power conversion apparatus similar to that of FIG. 69 but the switch sections provided in one leg in the single-phase full-bridge circuit on the side of the single-phase AC power supply are each a semiconductor device A using the MOSFET of FIG. 13. The switch sections provided in one leg in the single-phase full-bridge circuit on the side of the single-phase AC power supply, the switch sections provided in every leg in the three-phase full-bridge circuit on the side of the three-phase AC load, and the switch sections disposed between the single-phase full-bridge circuit and the three-phase full-bridge circuit are each a semiconductor device B. The switch sections provided in every leg in the three-phase full-bridge circuit on the side of the three-phase AC load are each a switch C configured by the MOSFET and the diode of FIG. 56. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, and prevent any short circuit of a capacitor by the switch thereof cutting off a current flow, thereby not requiring a DC link capacitor and a diode clamping circuit for storage of power as they have been conventionally used. The semiconductor device here is the one providing regenerative power and circulating power only in one specific way from the three-phase AC load when any of the components connected thereto is not activated, i.e., a gate power supply, a control power supply, and a gate circuit, or when the single-phase AC power supply suffers from sudden failures, when a momentary (short-time) power failure occurs, and when a momentary voltage drop occurs, or when the motor is with hard braking or is operated under light load, and providing a current flow only in one specific way when any of the components connected thereto is not activated, i.e., a gate power supply, a control power supply, and a gate circuit.

Figure 73:
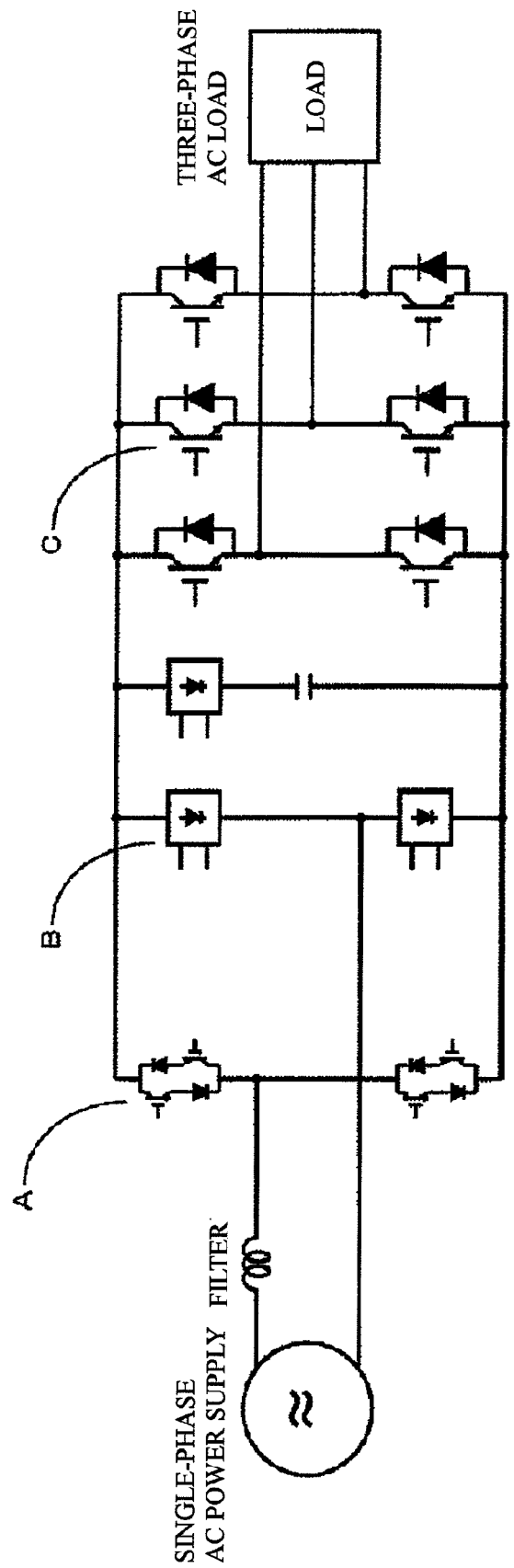
FIG. 73 shows still another power conversion apparatus in which a diode clamping circuit is not required for direct conversion from a single-phase AC power supply to a three-phase AC load.

FIG. 73 shows a power conversion apparatus similar to that of FIG. 69 but the switch sections provided in one leg in the single-phase full-bridge circuit on the side of the single-phase AC power supply are each a semiconductor device A using the IGBT of FIG. 12. The switch sections provided in one leg in the single-phase full-bridge circuit on the side of the single-phase AC power supply, the switch sections provided in every leg in the three-phase full-bridge circuit on the side of the three-phase AC load, and the switch sections disposed between the single-phase full-bridge circuit and the three-phase full-bridge circuit are each a semiconductor device B. The switch sections provided in every leg in the three-phase full-bridge circuit on the side of the three-phase AC load are each a switch C configured by the IGBT and the diode of FIG. 58. The semiconductor device A serves as a bidirectional switch that cuts off a current flow when any of the components connected thereto is not activated, i.e., a gate power supply, a control power supply, and a gate circuit. The semiconductor device B serves to provide only a specific unidirectional current flow when any of the components connected to the semiconductor devices of FIGS. 16 to 18 is not activated, i.e., a gate power supply, a control power supply, and a gate circuit. As such, the resulting power conversion apparatus becomes able to provide a three-phase load current between the switch sections and a motor using a semiconductor device, and prevent any short circuit of a capacitor by the switch thereof cutting off a current flow, thereby not requiring a DC link capacitor and a diode clamping circuit for storage of power as they have been conventionally used. The semiconductor device here is the one providing regenerative power and circulating power only in one specific way from the three-phase AC load when any of the components connected thereto is not activated, i.e., a gate power supply, a control power supply, and a gate circuit, or when the single-phase AC power supply suffers from sudden failures, when a momentary (short-time) power failure occurs, and when a momentary voltage drop occurs, or when the motor is with hard braking or is operated under light load, and providing a current flow only in one specific way when any of the components connected thereto is not activated, i.e., a gate power supply, a control power supply, and a gate circuit.

Figure 74:
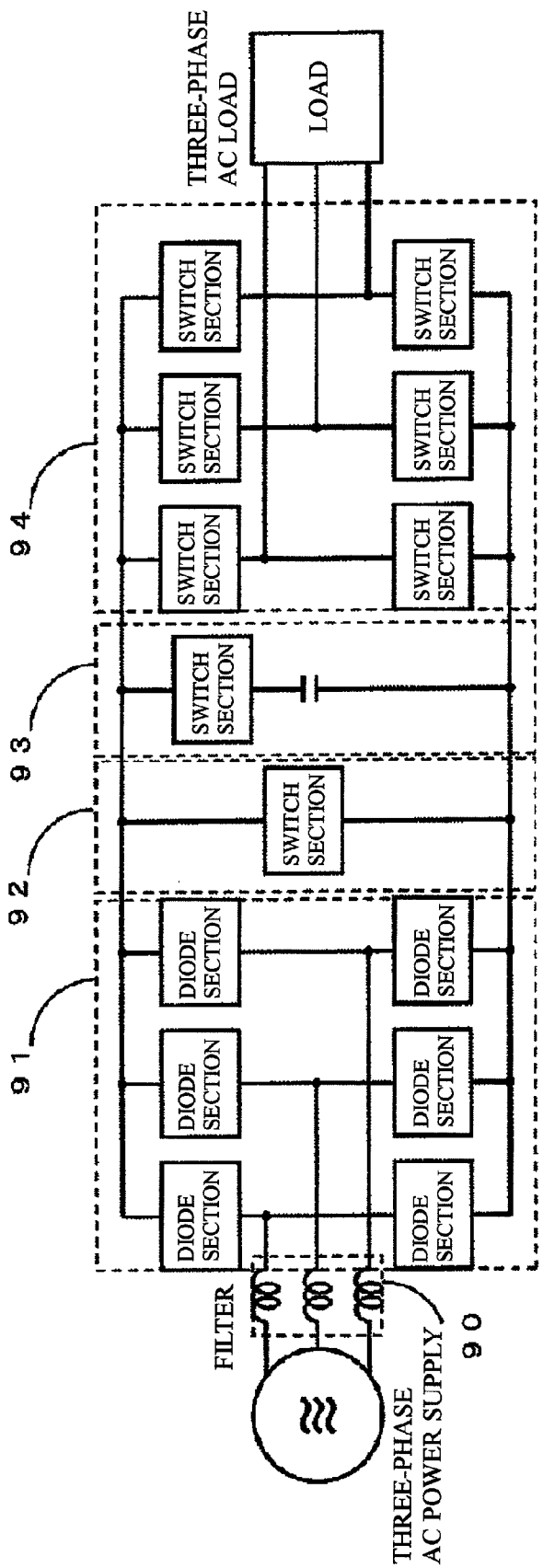
FIG. 74 shows still another power conversion apparatus in which a diode clamping circuit is not required for direct conversion from a three-phase AC power supply to a three-phase AC load.

Sixth Embodiment of Apparatus for Power Conversion from AC Power Supply to AC Load FIG. 74 shows a power conversion apparatus of the invention that drives a three-phase AC load from a three-phase AC power supply. The side of the three-phase AC power supply is connected with a filter 90, which is configured by an inductor. A three-phase diode rectifier circuit 91 on the power-supply side is connected with a three-phase full-bridge circuit 94 on the load side via legs 92 and 93. The leg 92 is the one configured by switch sections, and the leg 93 is the one configured by switch sections and a capacitor. The diode section provided in the three-phase diode rectifier circuit 91 on the side of the three-phase AC power supply is a diode. In the three-phase full-bridge circuit 94 on the side of the three-phase AC load, switch sections provided in every leg are each a bidirectional switch that provides only a specific unidirectional current when any of components connected thereto, i.e., semiconductor device, is not activated, i.e., a gate power supply, a control power supply, and a gate circuit. This is applicable also to switch sections provided in the legs 92 and 93 between the three-phase diode rectifier circuit 91 and the three-phase full-bridge circuit 94. The bidirectional switches are each any of or a combination of the conventional bidirectional switches of FIGS. 16 to 18. The switch sections in the leg 93 are each in a power short-circuited mode when the power conversion apparatus is in the normal operation, and shape a near-sinusoidal waveform of input current, thereby being able to improve the power factor of total input and reduce harmonics of the input current. The switch sections provided in the leg 93 are each a bidirectional switch that provides only a specific unidirectional current when any of components is not activated, i.e., a gate power supply, a control power supply, and a gate circuit, so that the regenerative power and the circulating power from a three-phase AC load can be directed back to the motor when the motor is with hard braking or is operated under light load. The switch sections provided in the leg 93 are operated in cooperation with the switch sections provided in the leg 92, i.e., cut off a current flow bidirectionally, prevent a sudden surge of voltage at a capacitor terminal, and when the components connected to the semiconductor device, i.e., a gate power supply, a control power supply, and a gate circuit, are returned to operation, and direct the stored power back to the load by operating in cooperation with the switch sections in the three-phase full-bridge circuit 94 on the load side. Accordingly, the harmonics of the input current can be reduced, and the resulting power conversion apparatus becomes able to perform power conversion in small capacity.

Figure 75:
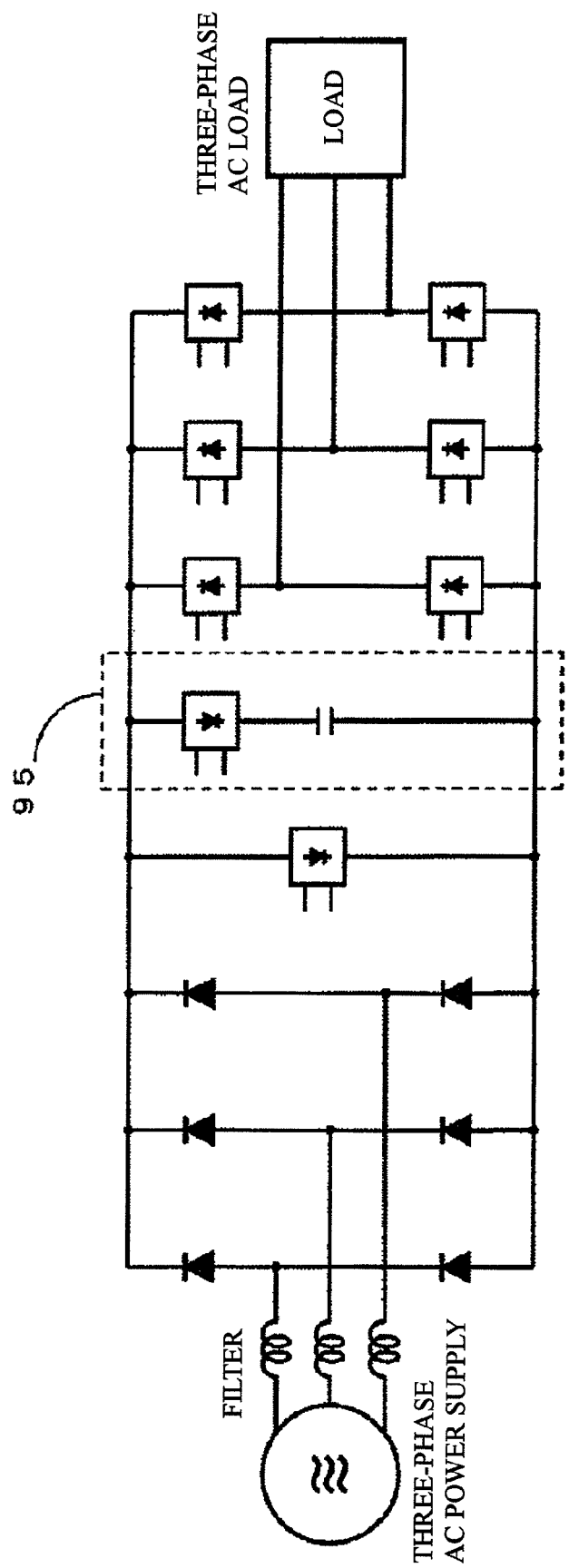
FIG. 75 shows still another power conversion apparatus in which a diode clamping circuit is not required for direct conversion from a three-phase AC power supply to a three-phase AC load.

FIG. 75 shows a power conversion apparatus similar to that of FIG. 74 but the diode section provided in the three-phase diode rectifier circuit on the side of the three-phase AC power supply is a diode, and the switch sections are each a semiconductor device that provides only a specific unidirectional current flow when any of the components connected to the semiconductor devices of FIGS. 16 to 18 is not activated, i.e., a gate power supply, a control power supply, and a gate circuit. The switch sections are those provided in every leg in the three-phase full-bridge circuit on the side of the three-phase AC load, and those disposed between the three-phase diode rectifier circuit and the three-phase full-bridge circuit. The switch sections in a leg 95 are each in a power short-circuited mode when the power conversion apparatus is in the normal operation, improve the power factor of total input, and shape a near-sinusoidal waveform of input current, thereby being able to reduce harmonics of the input current. The regenerative power and the circulating power from a three-phase AC load can be directed back to the motor when any of the components connected to the semiconductor device is not activated, i.e., a gate power supply, a control power supply, and a gate circuit, or when the motor is hard braking or is operated under light load. Accordingly, the harmonics of the input current can be reduced, and the resulting power conversion apparatus becomes able to perform power conversion by a capacitor with small capacity.

Figure 76:
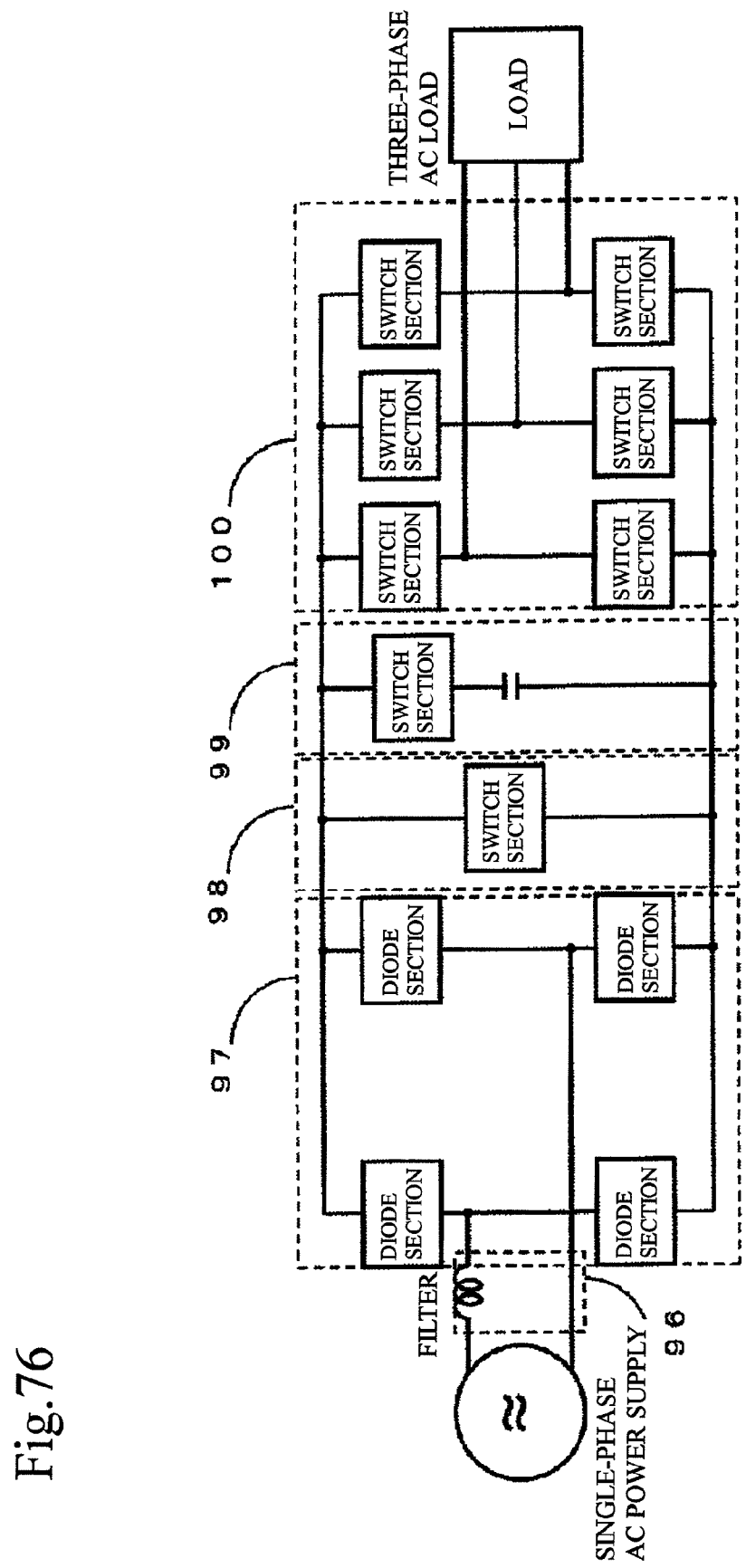
FIG. 76 shows still another power conversion apparatus in which a diode clamping circuit is not required for direct conversion from a single-phase AC power supply to a three-phase AC load.

Seventh Embodiment of Apparatus for Power Conversion from AC Power Supply to AC Load FIG. 76 shows a power conversion apparatus of the invention that drives a three-phase AC load from a single-phase AC power supply. The side of the single-phase AC power supply is connected with a filter 96, which is configured by an inductor. A single-phase diode rectifier circuit 97 on the power-supply side is connected with a three-phase full-bridge circuit 100 on the load side via legs 98 and 99. The leg 98 is the one configured by switch sections, and the leg 99 is the one configured by switch sections and a capacitor. The diode section provided in the single-phase diode rectifier circuit 97 on the side of the single-phase AC power supply is a diode. In the three-phase full-bridge circuit 100 on the side of the three-phase AC load, switch sections provided in every leg are each a bidirectional switch that provides only a specific unidirectional current flow when any of components connected thereto, i.e., semiconductor device, is not activated, i.e., a gate power supply, a control power supply, and a gate circuit. This is applicable also to switch sections disposed between the single-phase diode rectifier circuit and the three-phase full-bridge circuit. The bidirectional switches are each any of or a combination of the bidirectional switches of FIGS. 16 to 22. The switch sections in the leg 99 are each in a power short-circuited mode when the power conversion apparatus is in the normal operation, and shape a near-sinusoidal waveform of input current, thereby being able to improve the power factor of total input and reduce harmonics of the input current. The switch sections provided in the leg 99 are each a bidirectional switch that provides only a specific unidirectional current when any of components is not activated, i.e., a gate power supply, a control power supply, and a gate circuit, so that the regenerative power and the circulating power from a three-phase AC load can be directed back to the motor when the motor is with hard braking or is operated under light load. The switch sections provided in the leg 99 are operated in cooperation with the switch sections provided in the leg 98, i.e., cut off a current flow bidirectionally, prevent a sudden surge of voltage at a capacitor terminal, and when the components connected to the semiconductor device, i.e., a gate power supply, a control power supply, and a gate circuit, are returned to operation, and direct the stored power back to the load by operating in cooperation with the switch sections in the three-phase full-bridge circuit 100 on the load side. Accordingly, the harmonics of the input current can be reduced, and the resulting power conversion apparatus becomes able to perform power conversion by the DC link capacitor with small capacity.

Figure 77:
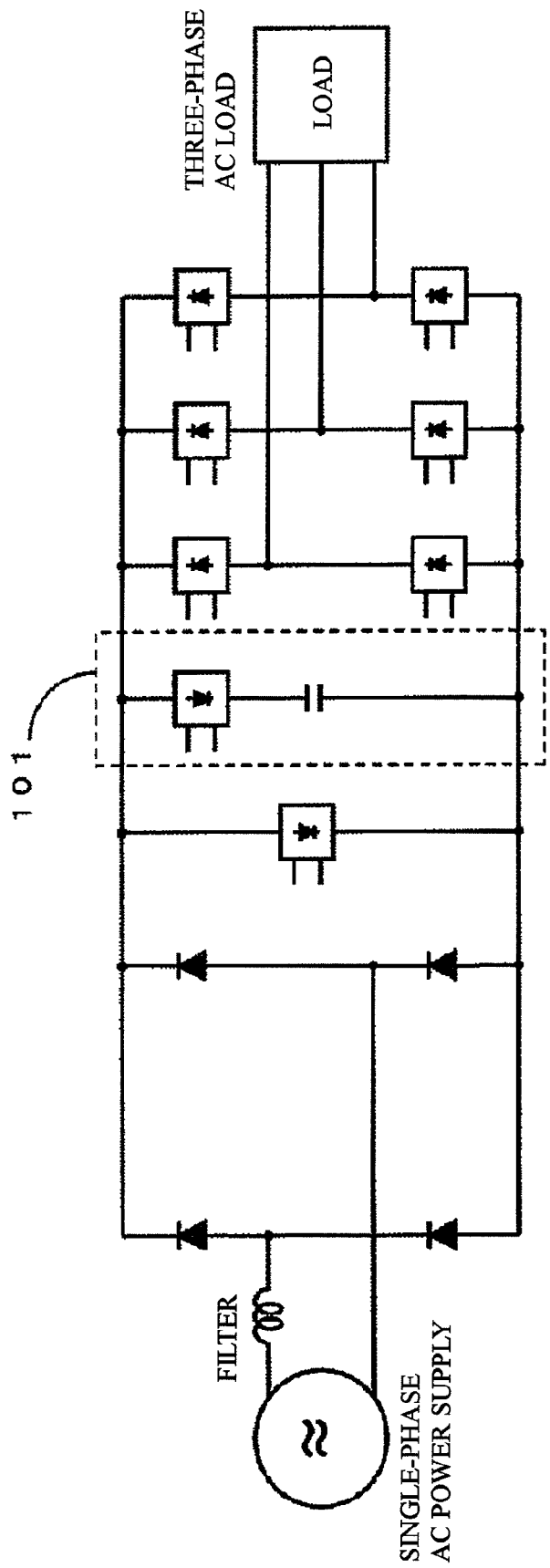
FIG. 77 shows still another power conversion apparatus in which a diode clamping circuit is not required for direct conversion from a single-phase AC power supply to a three-phase AC load.

FIG. 77 shows a power conversion apparatus similar to that of FIG. 76 but the diode section provided in the single-phase diode rectifier circuit on the side of the single-phase AC power supply is a diode, and the switch sections are each a semiconductor device that provides only a specific unidirectional current flow when any of the components connected to the semiconductor devices of FIGS. 16 to 18 is not activated, i.e., a gate power supply, a control power supply, and a gate circuit. The switch sections are those provided in every leg in the three-phase full-bridge circuit on the side of the three-phase AC load, and those disposed between the single-phase diode rectifier circuit and the three-phase full-bridge circuit. The switch sections in a leg 101 are each in a power short-circuited mode when the power conversion apparatus is in the normal operation, and shape a near-sinusoidal waveform of input current, thereby being able to improve the power factor of total input and reduce harmonics of the input current. The regenerative power and the circulating power from a three-phase AC load can be directed back to the motor when any of the components connected to the semiconductor device is not activated, i.e., a gate power supply, a control power supply, and a gate circuit, or the motor is with hard braking or is operated under light load. Accordingly, the harmonics of the input current can be reduced, and the resulting power conversion apparatus becomes able to perform power conversion by a capacitor with small capacity.

Figure 78:
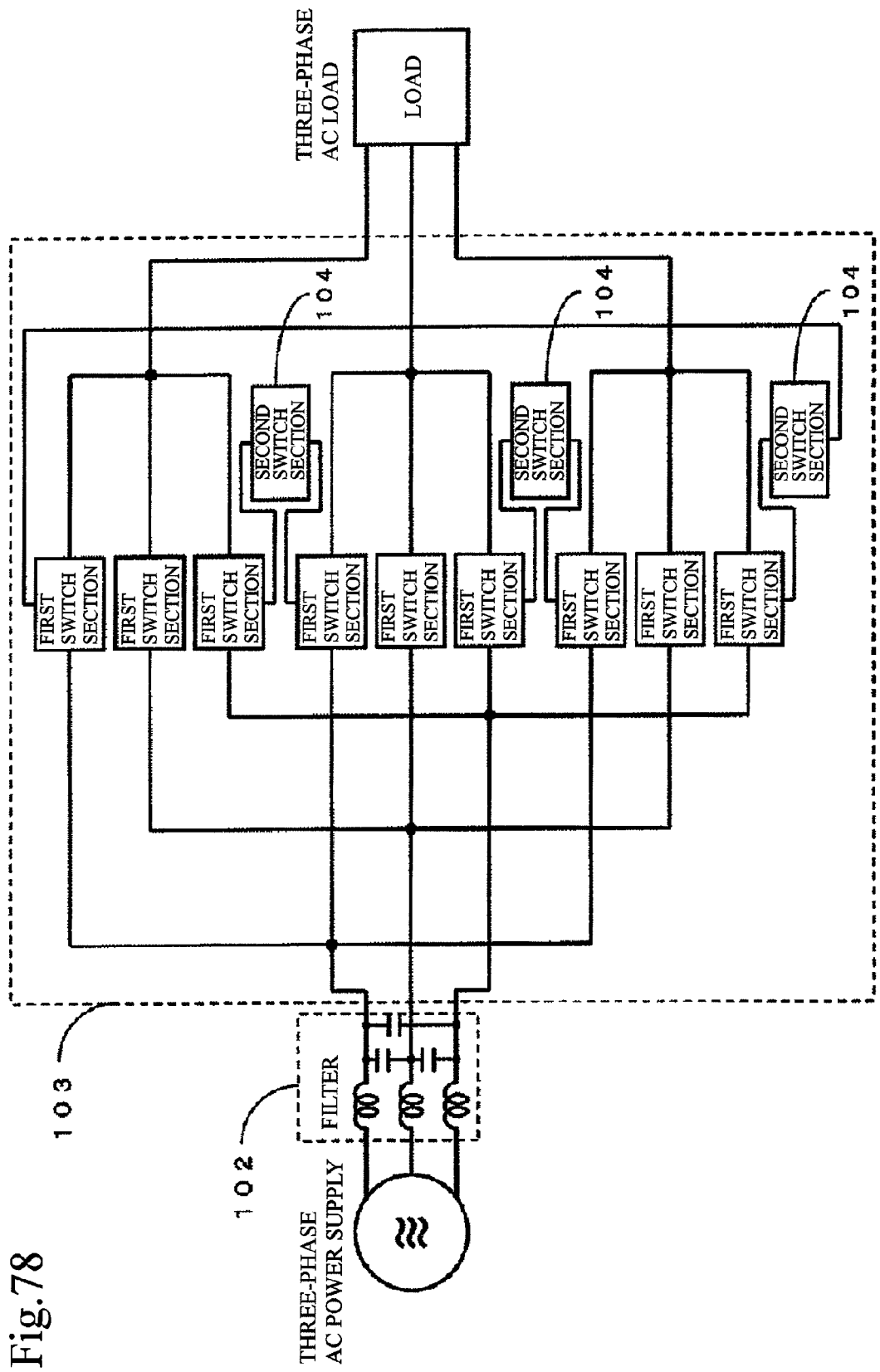
FIG. 78 shows still another power conversion apparatus in which a diode clamping circuit is not required for direct conversion from a three-phase AC power supply to a three-phase AC load.

Eighth Embodiment of Apparatus for Power Conversion from AC Power Supply to AC Load FIG. 78 shows a power conversion apparatus of the invention that drives a three-phase AC load from a three-phase AC power supply. The side of the three-phase AC power supply is connected with a filter 102, which is configured by an inductor and a capacitor. The filter 102 on the side of the three-phase AC power supply is connected with the three-phase AC load by a direct power conversion circuit of a direct type, i.e., direct matrix converter, 103. This direct matrix converter 103 is the one that performs power conversion into a three-phase AC load from a three-phase AC power supply, which includes nine first switch sections and three feed paths. Some of the nine first switches provided to the direct matrix converter 103 are each provided with a drain terminal, and second switch sections 104 are used to connect together the phases. The first switch sections are each a bidirectional switch that provides only a specific unidirectional current flow when any of the components connected thereto, i.e., semiconductor device, is not activated, i.e., a gate power supply, a control power supply, and a gate circuit. The bidirectional switches are each any of or a combination of the conventional bidirectional switches of FIGS. 16 to 18. The second switch sections 104 are each a bidirectional switch that provides a bidirectional current flow when any of the components connected thereto, i.e., semiconductor device, is not activated, i.e., a gate power supply, a control power supply, and a gate circuit. As such, the resulting power conversion apparatus does not require a diode clamping circuit, which has been indispensable in a conventional AC-to-AC direct power conversion apparatus.

Figure 79:
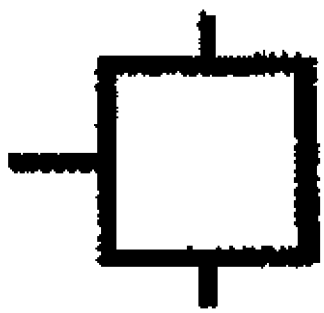
FIG. 79 shows a circuit symbol of a bidirectional switch that provides a bidirectional current flow when any of components connected to a semiconductor device is not activated, i.e., a gate power supply, a control power supply, and a gate circuit.

FIG. 79 shows the circuit symbol of a bidirectional switch that provides a bidirectional current flow when any of the components connected thereto, i.e., semiconductor device, is not activated, i.e., a gate power supply, a control power supply, and a gate circuit. Such a bidirectional switch is used in each of the second switch sections 104 in the direct matrix converter 103 described above. The bidirectional switch is provided with a gate section, and two current paths, i.e., first and second sources. The bidirectional switch has a capability of controlling a current flow into the first and second sources depending on the signal combination provided to the gate section.

Especially when the second switch sections are each provided with the JFET made of silicon carbide, and the MESFET made of gallium nitride, the performance can be favorably improved.

Figure 80:
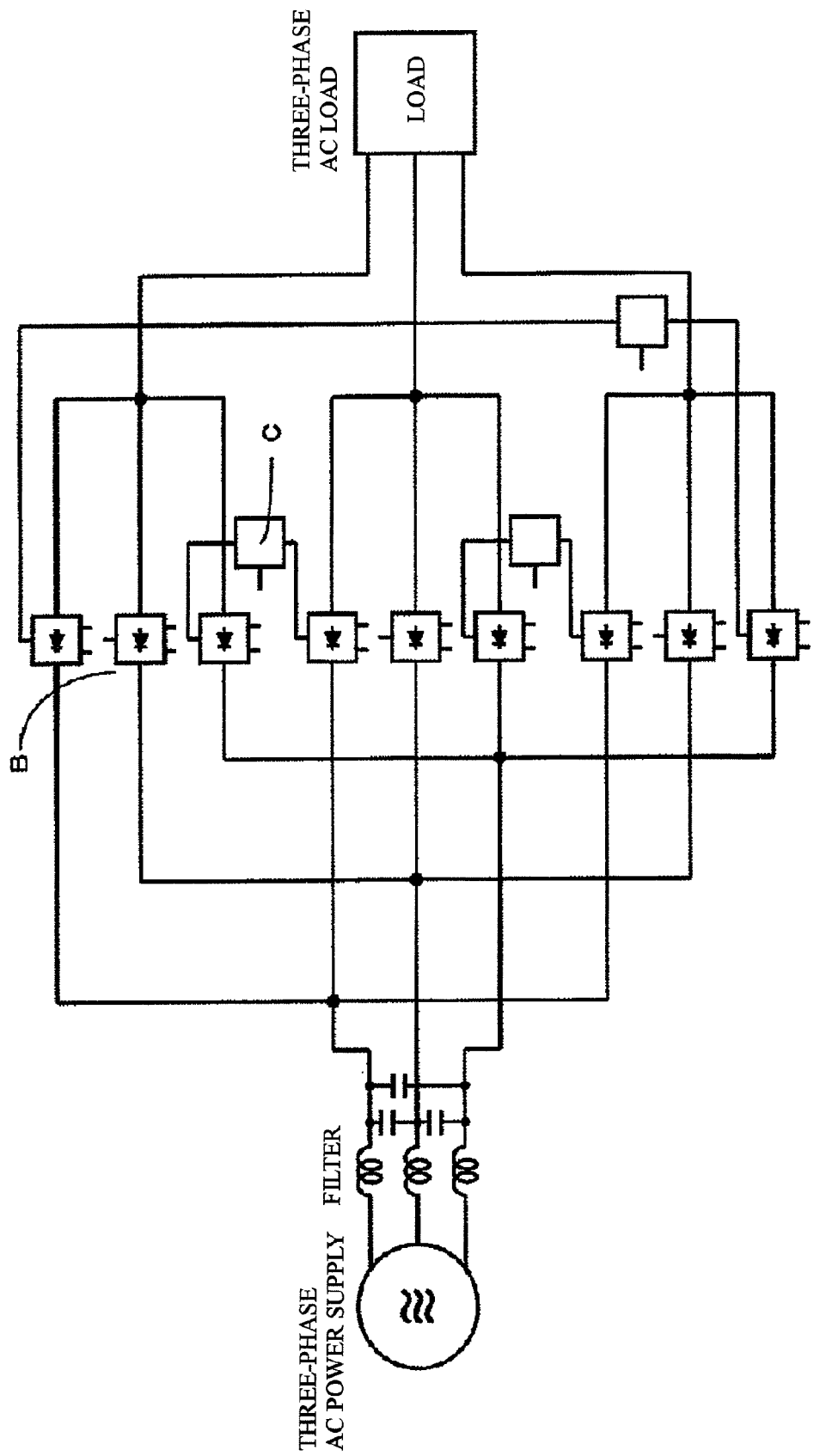
FIG. 80 shows still another power conversion apparatus in which a diode clamping circuit is not required for direct conversion from a three-phase AC power supply to a three-phase AC load.

FIG. 80 shows a power conversion apparatus similar to that of FIG. 78 but the nine switch sections provided in the direct matrix converter are the semiconductor devices B of FIGS. 16 to 18, and the switch sections serving to connect together the phases are each a semiconductor device C. The semiconductor devices B each serve as a bidirectional switch that provides only a specific unidirectional current flow when any of the components connected thereto, i.e., semiconductor device, is not activated, i.e., a gate power supply, a control power supply, and a gate circuit. The semiconductor C serves to provide a bidirectional current flow when any of the components connected to the semiconductor device of FIG. 79 is not activated, i.e., a gate power supply, a control power supply, and a gate circuit. With such a configuration that the switch sections connecting together the phases each provide a bidirectional current flow when any of the components connected thereto, i.e., semiconductor device, is not activated, i.e., a gate power supply, a control power supply, and a gate circuit, the regenerative power from the load can be directed back to the load with safety, and this thus eliminates the need for a diode clamping circuit. Moreover, the regenerative power and the circulating power from the three-phase AC load can be provided between the switch sections and the motor when the three-phase AC power supply suffers from sudden failures, when a momentary (short-time) power failure occurs, and when a momentary voltage drop occurs, or when the motor is with hard braking or is operated under light load. As such, the resulting power conversion apparatus does not require a diode clamping circuit, which has been indispensable in a conventional AC-to-AC direct power conversion apparatus.

Figure 81:
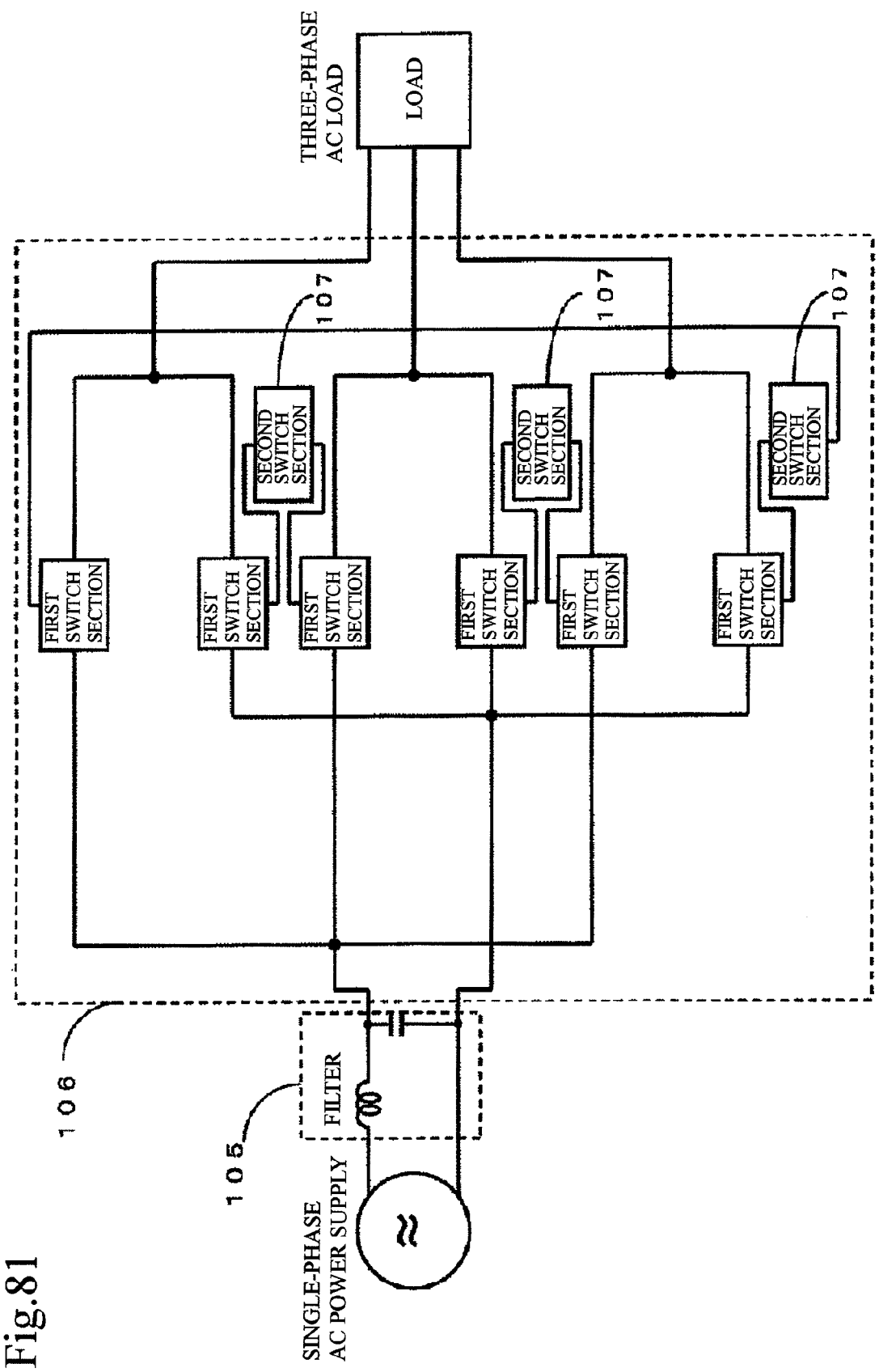
FIG. 81 shows still another power conversion apparatus in which a diode clamping circuit is not required for direct conversion from a single-phase AC power supply to a three-phase AC load.

Ninth Embodiment of Apparatus for Power Conversion from AC Power Supply to AC Load FIG. 81 shows a power conversion apparatus of the invention that drives a three-phase AC load from a single-phase AC power supply. The side of the single-phase AC power supply is connected with a filter 105, which is configured by an inductor and a capacitor. The filter 105 on the side of the single-phase AC power supply is connected with the three-phase AC load by a direct power conversion circuit of a direct type, i.e., direct matrix converter, 106. This direct matrix converter 106 is the one that performs power conversion into a three-phase AC load from a single-phase AC power supply, which includes six first switch sections and three feed paths. Some of the six first switches provided to the direct matrix converter 106 are each provided with a drain terminal, and second switch sections 107 are used to connect together the phases. The first switch sections are each a bidirectional switch that provides only a specific unidirectional current flow when any of the components connected thereto, i.e., semiconductor device, is not activated, i.e., a gate power supply, a control power supply, and a gate circuit. The bidirectional switches are each any of or a combination of the conventional bidirectional switches of FIGS. 16 to 18. The second switch sections 107 are each a bidirectional switch that provides a bidirectional current flow when any of the components connected thereto, i.e., semiconductor device, is not activated, i.e., a gate power supply, a control power supply, and a gate circuit. As such, the resulting power conversion apparatus does not require a diode clamping circuit, which has been indispensable in a conventional AC-to-AC direct power conversion apparatus.

Figure 82:
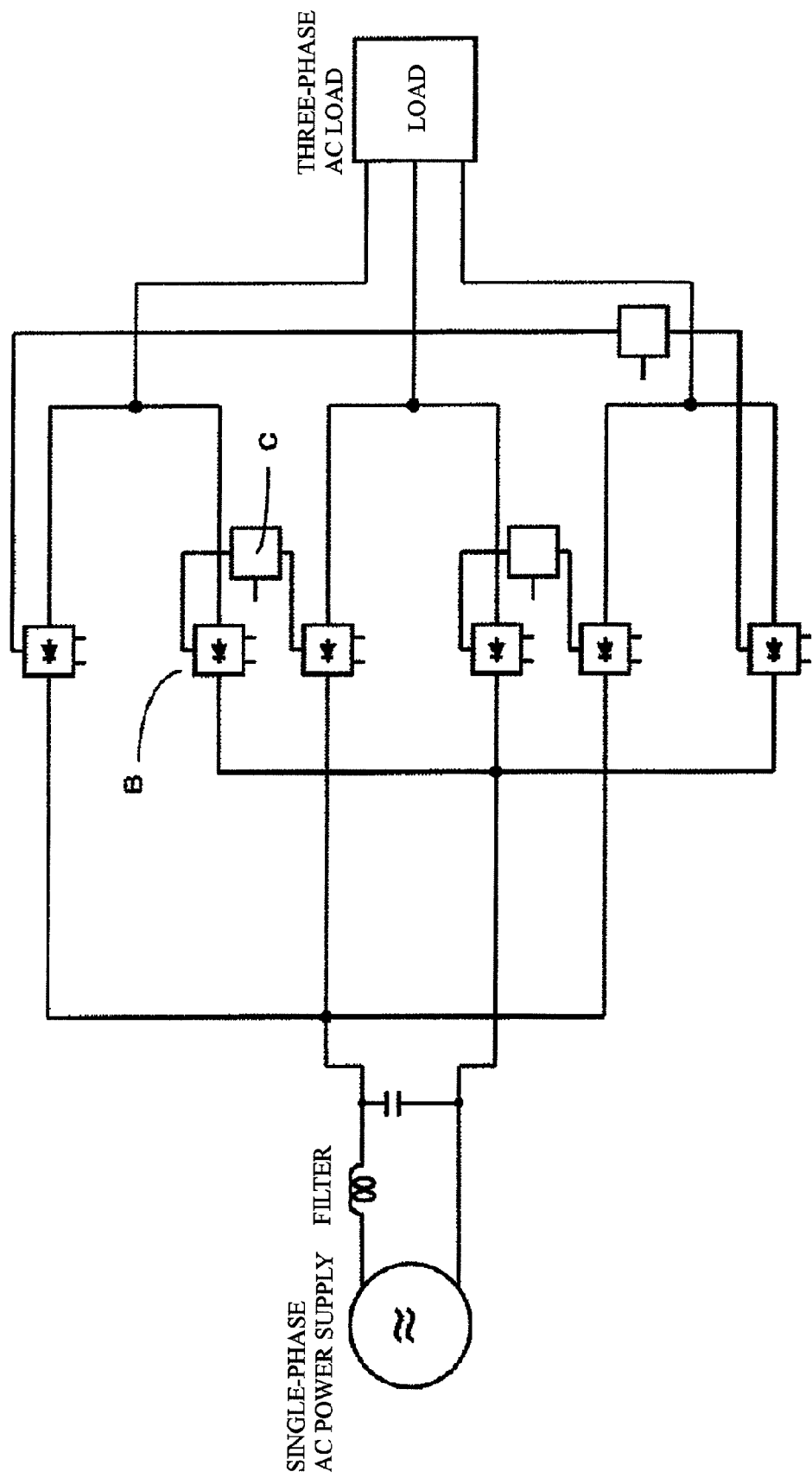
FIG. 82 shows still another power conversion apparatus in which a diode clamping circuit is not required for direct conversion from a single-phase AC power supply to a three-phase AC load.

FIG. 82 shows a power conversion apparatus similar to that of FIG. 81 but the six switch sections in the direct matrix converter are the semiconductor devices B of FIGS. 16 to 18, and the switch sections serving to connect together the phases are each a semiconductor device C. The semiconductor devices B each serve as a bidirectional switch that provides only a specific unidirectional current flow when any of the components connected thereto, i.e., semiconductor device, is not activated, i.e., a gate power supply, a control power supply, and a gate circuit. The semiconductor C serves to provide a bidirectional current flow when any of the components connected to the semiconductor device of FIG. 79 is not activated, i.e., a gate power supply, a control power supply, and a gate circuit. With such a configuration that the switch sections connecting together the phases each provide a bidirectional current flow when any of the components connected thereto, i.e., semiconductor device, is not activated, i.e., a gate power supply, a control power supply, and a gate circuit, the regenerative power from the load can be directed back to the load with safety, and this thus eliminates the need for a diode clamping circuit. Moreover, the regenerative power and the circulating power from the three-phase AC load can be provided between the switch sections and the motor when the single-phase AC power supply suffers from sudden failures, when a momentary (short-time) power failure occurs, and when a momentary voltage drop occurs, or when the motor is with hard braking or is operated under light load. As such, the resulting power conversion apparatus does not require a diode clamping circuit, which has been indispensable in a conventional AC-to-AC direct power conversion apparatus.

Figure 83:
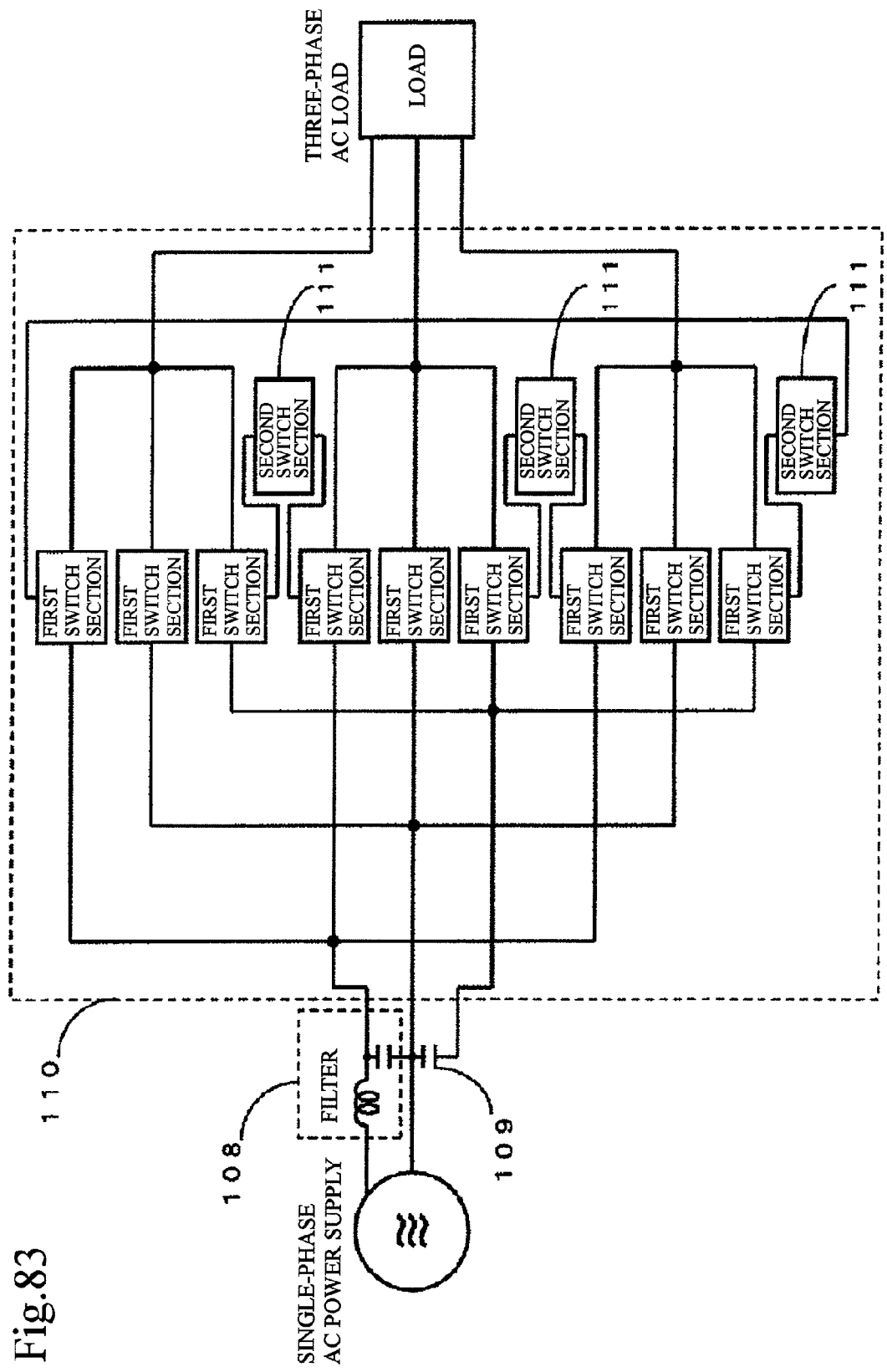
FIG. 83 shows still another power conversion apparatus in which a diode clamping circuit is not required for direct conversion from a single-phase AC power supply to a three-phase AC load.

Tenth Embodiment of Apparatus for Power Conversion from AC Power Supply to AC Load FIG. 83 shows a power conversion apparatus of the invention that drives a three-phase AC load from a single-phase AC power supply. The side of the single-phase AC power supply is connected with a filter 108 and a capacitor 109. The filter 108 is configured by an inductor and a capacitor, and the capacitor 109 is for ripple suppression use in the single-phase AC. These components on the side of the single-phase AC power supply, i.e., the filter 108 and the capacitor 109 for ripple suppression use in the single-phase AC, are connected with the three-phase AC load by a direct power conversion circuit of a direct type, i.e., direct matrix converter, 110. This direct matrix converter 110 is the one that performs power conversion into a three-phase AC load from a three-phase AC power supply, which includes nine first switch sections and three feed paths. Some of the nine first switches provided to the direct matrix converter 110 are each provided with a drain terminal, and second switch sections 111 are used to connect together the phases. The first switch sections are each a bidirectional switch that provides only a specific unidirectional current flow when any of the components connected thereto, i.e., semiconductor device, is not activated, i.e., a gate power supply, a control power supply, and a gate circuit. The bidirectional switches are each any of or a combination of the conventional bidirectional switches of FIGS. 16 to 18. The second switch sections 111 are each a bidirectional switch that provides a bidirectional current flow when any of the components connected thereto, i.e., semiconductor device, is not activated, i.e., a gate power supply, a control power supply, and a gate circuit. As such, the resulting power conversion apparatus does not require a diode clamping circuit, which has been indispensable in a conventional AC-to-AC direct power conversion apparatus.

Figure 84:
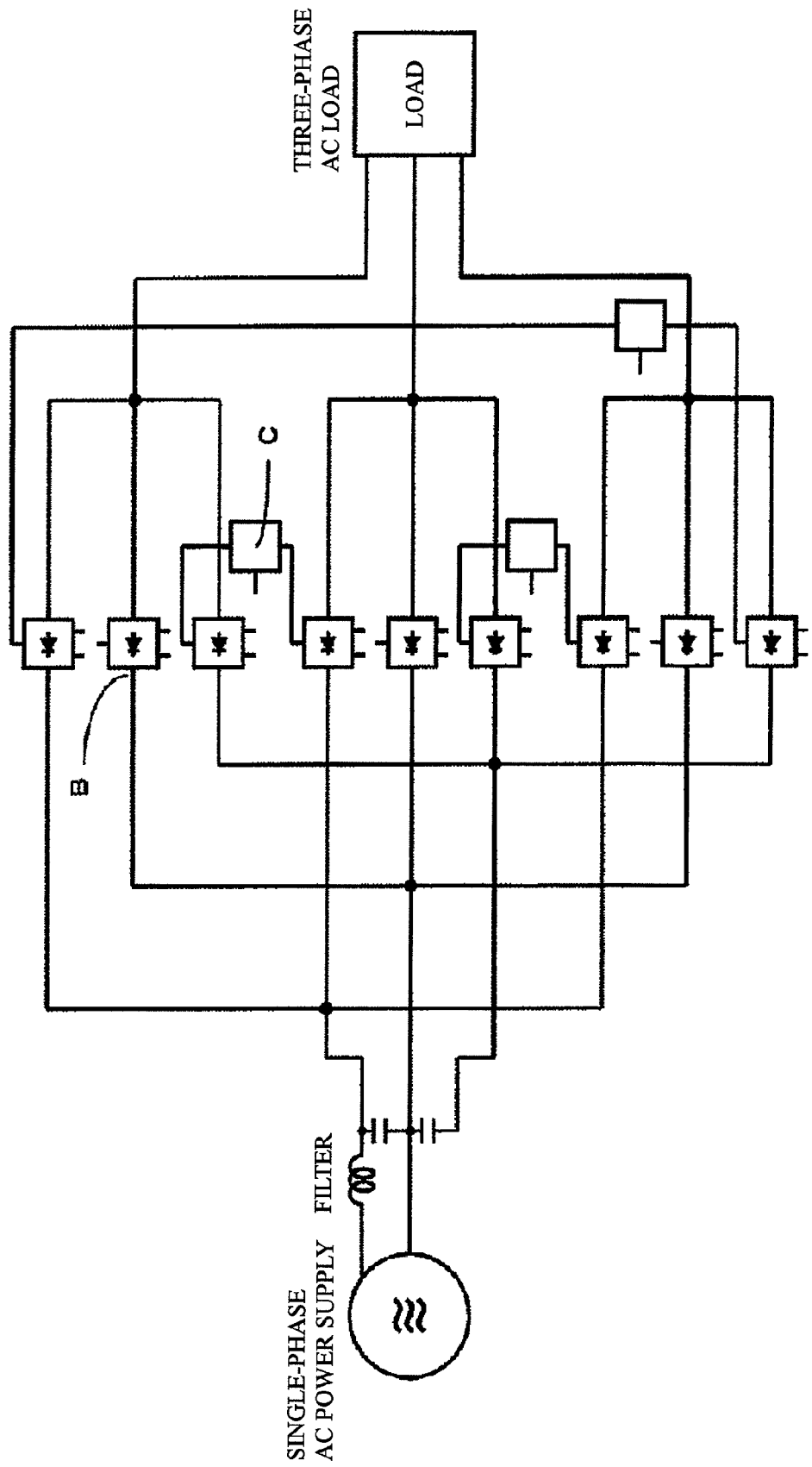
FIG. 84 shows still another power conversion apparatus in which a diode clamping circuit is not required for direct conversion from a single-phase AC power supply to a three-phase AC load.

FIG. 84 shows a power conversion apparatus similar to that of FIG. 83 but the nine switch sections in the direct matrix converter are the semiconductor devices B of FIGS. 16 to 18, and the switch sections serving to connect together the phases are each a semiconductor device C. The semiconductor devices B each serve as a bidirectional switch that provides only a specific unidirectional current flow when any of the components connected thereto, i.e., semiconductor device, is not activated, i.e., a gate power supply, a control power supply, and a gate circuit. The semiconductor C serves to provide a bidirectional current flow when any of the components connected to the semiconductor device of FIG. 79 is not activated, i.e., a gate power supply, a control power supply, and a gate circuit. With such a configuration that the switch sections connecting together the phases each provide a bidirectional current flow when any of the components connected thereto, i.e., semiconductor device, is not activated, i.e., a gate power supply, a control power supply, and a gate circuit, the regenerative power from the load can be directed back to the load with safety, and this thus eliminates the need for a diode clamping circuit. Moreover, the regenerative power and the circulating power from the three-phase AC load can be provided between the switch sections and the motor when the single-phase AC power supply suffers from sudden failures, when a momentary (short-time) power failure occurs, and when a momentary voltage drop occurs, or when the motor is with hard braking or is operated under light load. As such, the resulting power conversion apparatus does not require a diode clamping circuit, which has been indispensable in a conventional AC-to-AC direct power conversion apparatus.

What is claimed is:

1. A power conversion apparatus in which a main circuit is provided with a plurality of switches, and power conversion is performed to generate power for supply to an AC load from a three- or single-phase AC power supply, wherein
at least some of the plurality of switches are configured, using a bidirectional switch including a normally-on device that is turned OFF when a gate circuit is provided with either a positive or negative voltage, and including a normally-off device that is turned ON when the gate circuit is provided with either a positive or negative voltage, to provide only a specific unidirectional current flow when the gate circuit is not activated, and to provide a bidirectional current flow and control the current flow to direct only in an arbitrary unidirectional way when the gate circuit is activated,
the power from the AC load is circulated between the power conversion apparatus and the AC load without using a component element for energy storage inside of the power conversion apparatus,
the main circuit is configured by two three-phase full-bridge circuits,
an input end of the main circuit is provided with a filter configured by a three-phase inductor and a three-phase capacitor,
a first switch section provided in all legs of one of the three-phase full-bridge circuits on a load side and in one of legs of a remaining three-phase full-bridge circuit on a power-supply side is configured, using the normally-off device including a first gate section that turns OFF a channel section when the gate circuit is not activated and the normally-on device including a second gate section that turns ON the channel section when the gate circuit is not activated, to provide only the specific unidirectional current flow when the gate circuit is not activated, and to provide the bidirectional current flow and control the current flow to direct only in an arbitrary unidirectional way when the gate circuit is activated, and a second switch section provided in two of the legs of the three-phase full-bridge circuit on the power-supply side is configured, using a bidirectional switch that cuts off a current flow when the gate circuit is not activated, not to provide the bidirectional current flow when the gate circuit is not activated, and to provide the bidirectional current flow and control the current flow to direct only in an arbitrary unidirectional way when the gate circuit is activated.

2. The power conversion apparatus according to claim 1, wherein the first switch section for use in the three-phase full-bridge circuit on the load side is configured by a switch including a diode with a MOSFET or with an IGBT, and one of the legs of the three-phase full-bridge circuit on the power-supply side is provided with a switch including the normally-off device and the normally-on device.

3. The power conversion apparatus according to claim 1, wherein the two three-phase full-bridge circuits are connected together via a leg configured by a capacitor and a switch section.

* * * * *